US009533297B2

(12) United States Patent
Matyjaszewski et al.

(10) Patent No.: US 9,533,297 B2
(45) Date of Patent: Jan. 3, 2017

(54) LIGANDS DESIGNED TO PROVIDE HIGHLY ACTIVE CATALYST COMPLEXES

(71) Applicant: Carnegie Mellon University, Pittsburgh, PA (US)

(72) Inventors: Krzysztof Matyjaszewski, Pittsburgh, PA (US); Yungwan Kwak, Breinigsville, PA (US); Joanna Burdynska, Pittsburgh, PA (US); Andrea Elsen, Pittsburgh, PA (US); Kristin Schroeder, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/379,418

(22) PCT Filed: Feb. 22, 2013

(86) PCT No.: PCT/US2013/027389
§ 371 (c)(1),
(2) Date: Aug. 18, 2014

(87) PCT Pub. No.: WO2013/126745
PCT Pub. Date: Aug. 29, 2013

(65) Prior Publication Data
US 2015/0087795 A1 Mar. 26, 2015

Related U.S. Application Data

(60) Provisional application No. 61/634,113, filed on Feb. 23, 2012.

(51) Int. Cl.
C08F 4/40 (2006.01)
C08F 4/44 (2006.01)
(Continued)

(52) U.S. Cl.
CPC .............. *B01J 31/2295* (2013.01); *C08F 2/38* (2013.01); *C08F 4/10* (2013.01); *C08F 4/26* (2013.01);
(Continued)

(58) Field of Classification Search
CPC ................ C07F 1/08; C07F 15/02; C08F 4/40
See application file for complete search history.

(56) References Cited

U.S. PATENT DOCUMENTS 3,037,004 A  5/1962 Simone et al.
3,096,312 A  7/1963 Henry
(Continued)

FOREIGN PATENT DOCUMENTS

CA  2209061      2/1998
CN  1084199 A    3/1994
(Continued)

OTHER PUBLICATIONS

Acar et al., Macromolecules 2000, 33, 7700-7706.
(Continued)

*Primary Examiner* — Rip A Lee
(74) *Attorney, Agent, or Firm* — K&L Gates LLP

(57) ABSTRACT

A series of ligands with site specific electron donating substituents that form a catalyst complex with a transition metal and are suitable for catalysis of atom transfer radical reactions, including ATRP are described. Faster catalysis rates were observed allowing for low catalyst concentrations and linear increases in molecular weight with monomer conversion, and narrow molecular weight distributions. Cyclic voltammetry revealed that increasing the strength and number of conjugated electron donating groups resulted in more stable complexes and larger ATRP equilibrium constants.

20 Claims, 10 Drawing Sheets

(51) Int. Cl.
*C08F 4/80* (2006.01)
*B01J 31/22* (2006.01)
*C08F 120/18* (2006.01)
*C08F 2/38* (2006.01)
*C08F 4/10* (2006.01)
*C08F 4/26* (2006.01)
*B01J 31/18* (2006.01)
*C08F 220/18* (2006.01)

(52) U.S. Cl.
CPC .............. *C08F 4/40* (2013.01); *C08F 120/18* (2013.01); *B01J 31/1815* (2013.01); *B01J 31/2243* (2013.01); *B01J 2231/10* (2013.01); *B01J 2231/30* (2013.01); *B01J 2231/42* (2013.01); *B01J 2531/0247* (2013.01); *B01J 2531/16* (2013.01); *B01J 2531/842* (2013.01); *C08F 2220/1825* (2013.01); *C08F 2438/01* (2013.01); *Y02P 20/52* (2015.11)

(56) References Cited

U.S. PATENT DOCUMENTS

| | | | |
|---|---|---|---|
| 3,183,217 A | 5/1965 | Serniuk et al. | |
| 3,350,374 A | 10/1967 | Fetscher et al. | |
| 3,397,186 A | 8/1968 | Edward et al. | |
| 3,472,826 A | 10/1969 | Potts et al. | |
| 3,546,083 A | 12/1970 | Ort et al. | |
| 3,573,180 A | 3/1971 | Hodes et al. | |
| 3,716,550 A | 2/1973 | Gilligan et al. | |
| 3,753,956 A | 8/1973 | Tuites et al. | |
| 3,862,978 A | 1/1975 | Decker et al. | |
| 3,953,305 A | 4/1976 | Connolly | |
| 3,959,225 A | 5/1976 | Kuntz | |
| 3,963,491 A | 6/1976 | Marsh | |
| 4,007,165 A | 2/1977 | MacLeay et al. | |
| 4,073,870 A | 2/1978 | Saji et al. | |
| 4,145,486 A | 3/1979 | Haag et al. | |
| 4,302,553 A | 11/1981 | Frisch et al. | |
| 4,374,751 A | 2/1983 | Dudgeon | |
| 4,384,093 A | 5/1983 | Culbertson et al. | |
| 4,581,429 A | 4/1986 | Solomon et al. | |
| 4,728,706 A | 3/1988 | Farnham et al. | |
| 4,806,605 A | 2/1989 | Hertler | |
| 4,925,765 A | 5/1990 | Madeleine | |
| 4,940,648 A | 7/1990 | Geiger | |
| 4,940,760 A | 7/1990 | Boettcher et al. | |
| 4,954,416 A | 9/1990 | Wright et al. | |
| 4,978,498 A | 12/1990 | Yoshihiro et al. | |
| 5,026,813 A | 6/1991 | Meder | |
| 5,089,135 A | 2/1992 | Yoneyama et al. | |
| 5,102,967 A | 4/1992 | Meder | |
| 5,169,914 A | 12/1992 | Kaszas et al. | |
| 5,210,109 A | 5/1993 | Tateosian et al. | |
| 5,212,043 A | 5/1993 | Yamamoto et al. | |
| 5,248,746 A | 9/1993 | Shimokawa et al. | |
| 5,254,651 A | 10/1993 | Alexanian et al. | |
| 5,281,681 A | 1/1994 | Austin | |
| 5,294,678 A | 3/1994 | Tse et al. | |
| 5,312,871 A | 5/1994 | Mardare et al. | |
| 5,322,912 A | 6/1994 | Georges et al. | |
| 5,324,879 A | 6/1994 | Hawthorne | |
| 5,331,088 A | 7/1994 | Meister et al. | |
| 5,346,954 A | 9/1994 | Wu et al. | |
| 5,362,813 A | 11/1994 | Antonelli et al. | |
| 5,393,903 A * | 2/1995 | Gratzel ................... | C07F 9/005 106/287.18 |
| 5,401,804 A | 3/1995 | Georges et al. | |
| 5,405,913 A | 4/1995 | Harwood et al. | |
| 5,451,647 A | 9/1995 | Faust et al. | |
| 5,459,222 A | 10/1995 | Rodgers et al. | |
| 5,470,928 A | 11/1995 | Harwood et al. | |
| 5,506,312 A | 4/1996 | Arjunan | |
| 5,508,353 A | 4/1996 | Liu et al. | |
| 5,510,212 A | 4/1996 | Delnick et al. | |
| 5,510,307 A | 4/1996 | Narayanan et al. | |
| 5,543,158 A | 8/1996 | Gref et al. | |
| 5,558,954 A | 9/1996 | Morrison | |
| 5,610,250 A | 3/1997 | Veregin et al. | |
| 5,630,906 A | 5/1997 | Boe et al. | |
| 5,656,708 A | 8/1997 | Meister | |
| 5,668,188 A | 9/1997 | Whinnery et al. | |
| 5,700,844 A | 12/1997 | Liao et al. | |
| 5,705,577 A | 1/1998 | Rossi et al. | |
| 5,708,102 A | 1/1998 | Fryd et al. | |
| 5,763,546 A | 6/1998 | Jung et al. | |
| 5,763,548 A | 6/1998 | Matyjaszewski et al. | |
| 5,767,210 A | 6/1998 | Lecomte et al. | |
| 5,773,538 A | 6/1998 | Feiring | |
| 5,789,487 A | 8/1998 | Matyjaszewski et al. | |
| 5,807,937 A | 9/1998 | Matyjaszewski et al. | |
| 5,811,500 A | 9/1998 | Dubois et al. | |
| 5,833,320 A | 11/1998 | Kaneko et al. | |
| 5,854,364 A | 12/1998 | Senninger et al. | |
| 5,886,118 A | 3/1999 | Percec | |
| 5,891,971 A | 4/1999 | Keoshkerian et al. | |
| 5,910,549 A | 6/1999 | Matyjaszewski et al. | |
| 5,945,491 A | 8/1999 | Matyjaszewski et al. | |
| 5,998,537 A | 12/1999 | Good et al. | |
| 6,031,017 A | 2/2000 | Waki et al. | |
| 6,054,507 A | 4/2000 | Funaki et al. | |
| 6,057,042 A | 5/2000 | Shimotsu | |
| 6,083,524 A | 7/2000 | Sawhney et al. | |
| 6,111,022 A | 8/2000 | Matyjaszewski et al. | |
| 6,114,448 A | 9/2000 | Derbes | |
| 6,114,482 A | 9/2000 | Senninger et al. | |
| 6,121,371 A | 9/2000 | Matyjaszewski et al. | |
| 6,124,411 A | 9/2000 | Matyjaszewski et al. | |
| 6,126,919 A | 10/2000 | Stefely et al. | |
| 6,143,848 A | 11/2000 | Lee et al. | |
| 6,162,882 A | 12/2000 | Matyjaszewski et al. | |
| 6,183,866 B1 | 2/2001 | Yamazaki et al. | |
| 6,191,197 B1 | 2/2001 | Wang et al. | |
| 6,235,822 B1 | 5/2001 | Whetten et al. | |
| 6,254,854 B1 | 7/2001 | Edwards et al. | |
| 6,255,448 B1 | 7/2001 | Grimaldi et al. | |
| 6,288,186 B1 | 9/2001 | Matyjaszewski et al. | |
| 6,310,149 B1 | 10/2001 | Haddleton | |
| 6,319,988 B1 | 11/2001 | Barkac et al. | |
| 6,326,455 B2 | 12/2001 | Vassiliou et al. | |
| 6,342,563 B1 | 1/2002 | McGinniss et al. | |
| 6,407,187 B1 | 6/2002 | Matyjaszewski et al. | |
| 6,512,060 B1 | 1/2003 | Matyjaszewski et al. | |
| 6,534,610 B1 | 3/2003 | Wilson et al. | |
| 6,538,091 B1 | 3/2003 | Matyjaszewski et al. | |
| 6,541,580 B1 | 4/2003 | Matyjaszewski et al. | |
| 6,545,095 B1 | 4/2003 | Solomon et al. | |
| 6,565,763 B1 | 5/2003 | Asakawa et al. | |
| 6,592,991 B1 | 7/2003 | Wiesner et al. | |
| 6,620,927 B2 | 9/2003 | Bulpitt et al. | |
| 6,624,262 B2 | 9/2003 | Matyjaszewski et al. | |
| 6,624,263 B2 | 9/2003 | Matyjaszewski et al. | |
| 6,627,314 B2 | 9/2003 | Matyjaszewski et al. | |
| 6,664,312 B2 | 12/2003 | Devonport | |
| 6,670,299 B1 | 12/2003 | Marks et al. | |
| 6,672,717 B2 | 1/2004 | Smith | |
| 6,683,120 B2 | 1/2004 | Munro | |
| 6,686,432 B2 | 2/2004 | Coca et al. | |
| 6,692,914 B1 | 2/2004 | Klaerner et al. | |
| 6,737,488 B2 | 5/2004 | Vanhoorne et al. | |
| 6,759,491 B2 | 7/2004 | Matyjaszewski et al. | |
| 6,784,247 B2 | 8/2004 | Rechenberg et al. | |
| 6,784,248 B2 | 8/2004 | Coca et al. | |
| 6,784,260 B2 | 8/2004 | Yeager et al. | |
| 6,790,919 B2 | 9/2004 | Matyjaszewski et al. | |
| 6,828,025 B2 | 12/2004 | Ali et al. | |
| 6,872,266 B1 | 3/2005 | Ciaramitaro | |
| 6,887,962 B2 | 5/2005 | Matyjaszewski et al. | |
| 6,991,652 B2 | 1/2006 | Burg | |
| 6,992,156 B2 | 1/2006 | Parker et al. | |
| 7,018,655 B2 | 3/2006 | Lele et al. | |
| 7,019,082 B2 | 3/2006 | Matyjaszewski et al. | |
| 7,034,079 B2 | 4/2006 | Visger et al. | |
| 7,037,992 B2 | 5/2006 | Wilson et al. | |

(56) References Cited

U.S. PATENT DOCUMENTS

| | | | |
|---|---|---|---|
| 7,049,373 B2 | 5/2006 | Matyjaszewski et al. |
| 7,049,378 B2 | 5/2006 | Ittel et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,167,354 B2 | 1/2007 | Dietz et al. |
| 7,186,419 B2 | 3/2007 | Petersen |
| 7,241,502 B2 | 7/2007 | Anselmann et al. |
| 7,332,550 B2 | 2/2008 | Matyjaszewski et al. |
| 7,407,995 B2 | 8/2008 | Ok |
| 7,498,456 B2 | 3/2009 | Lai |
| 7,566,410 B2 | 7/2009 | Song et al. |
| 7,572,874 B2 | 8/2009 | Matyjaszewski et al. |
| 7,678,869 B2 | 3/2010 | Matyjaszewski et al. |
| 7,786,213 B2 | 8/2010 | Maynard et al. |
| 7,795,355 B2 | 9/2010 | Matyjaszewski et al. |
| RE41,897 E | 10/2010 | Loveday et al. |
| 7,825,199 B1 * | 11/2010 | Matyjaszewski ......... C08F 2/38 526/111 |
| 7,893,173 B2 | 2/2011 | Matyjaszewski et al. |
| 7,893,174 B2 | 2/2011 | Matyjaszewski et al. |
| 8,048,982 B2 | 11/2011 | Higashimura et al. |
| 8,114,803 B2 | 2/2012 | Yuasa et al. |
| 8,252,880 B2 | 8/2012 | Matyjaszewski et al. |
| 8,273,823 B2 | 9/2012 | Matyjaszewski et al. |
| 8,318,856 B2 | 11/2012 | Oh et al. |
| 8,349,410 B2 | 1/2013 | Huang et al. |
| 8,361,302 B2 | 1/2013 | Grassl et al. |
| 8,367,051 B2 | 2/2013 | Matyjaszewski et al. |
| 8,404,788 B2 | 3/2013 | Matyjaszewski et al. |
| 8,445,610 B2 | 5/2013 | Kwak et al. |
| 8,497,225 B2 | 7/2013 | Zhamu et al. |
| 8,729,173 B2 | 5/2014 | Wang et al. |
| 8,865,797 B2 | 10/2014 | Matyjaszewski et al. |
| 8,962,764 B2 | 2/2015 | Matyjaszewski et al. |
| 9,093,693 B2 | 7/2015 | Zhamu et al. |
| 2003/0004293 A1 | 1/2003 | Dvornic et al. |
| 2003/0216528 A1 | 11/2003 | Matyjaszewski et al. |
| 2004/0044152 A1 | 3/2004 | Matyjaszewski et al. |
| 2004/0152821 A1 | 8/2004 | Saegusa et al. |
| 2004/0171779 A1 | 9/2004 | Matyjaszewski et al. |
| 2005/0090632 A1 | 4/2005 | Matyjaszewski et al. |
| 2006/0008490 A1 | 1/2006 | Russell et al. |
| 2006/0258867 A1 | 11/2006 | Gibson et al. |
| 2007/0106012 A1 | 5/2007 | Matyjaszewski et al. |
| 2007/0155926 A1 | 7/2007 | Matyjaszewski et al. |
| 2007/0287681 A1 | 12/2007 | Jeong et al. |
| 2008/0114128 A1 | 5/2008 | Destarac et al. |
| 2009/0044345 A1 * | 2/2009 | Schlingloff ............. A61L 2/186 8/111 |
| 2009/0169725 A1 | 7/2009 | Zhamu et al. |
| 2009/0171024 A1 | 7/2009 | Jakubowski et al. |
| 2010/0196277 A1 | 8/2010 | DeSimone et al. |
| 2011/0060107 A1 | 3/2011 | Matyjaszewski et al. |
| 2011/0065875 A1 | 3/2011 | Matyjaszewski et al. |
| 2011/0091957 A1 | 4/2011 | Lele et al. |
| 2012/0213986 A1 | 8/2012 | Matyjaszewski et al. |
| 2014/0183055 A1 | 7/2014 | Matyjaszewski et al. |
| 2014/0275420 A1 | 9/2014 | Matyjaszewski et al. |

FOREIGN PATENT DOCUMENTS

| | | |
|---|---|---|
| CN | 1110681 A | 10/1995 |
| CN | 1165828 A | 11/1997 |
| EP | 0265091 A1 | 4/1988 |
| EP | 0329873 B1 | 11/1989 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 0947527 A1 | 6/1999 |
| EP | 0518225 B2 | 10/1999 |
| EP | 1386935 A | 2/2004 |
| EP | 1469020 A | 10/2004 |
| EP | 1555273 A1 | 7/2005 |
| EP | 2147067 | 11/2008 |
| FR | 2777091 A1 | 10/1999 |
| JP | 64-11114 A | 1/1989 |
| JP | 6322171 A | 11/1994 |
| JP | 2003-238609 A | 8/2003 |
| JP | 2011-246620 A * | 12/2011 ............ C08G 2/06 |
| JP | 2011246620 A | 12/2011 |
| WO | WO 88/00603 A3 | 1/1988 |
| WO | WO 94/13706 A | 6/1994 |
| WO | WO 96/30421 A1 | 10/1996 |
| WO | WO 97/18247 | 5/1997 |
| WO | WO 97/47661 A1 | 12/1997 |
| WO | WO 98/01480 | 1/1998 |
| WO | WO 98/06758 A1 | 2/1998 |
| WO | WO 98/20050 A2 | 5/1998 |
| WO | WO 98/40415 A | 9/1998 |
| WO | WO 99/28352 A | 6/1999 |
| WO | WO 00/22051 A1 | 4/2000 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 01/92359 A1 | 12/2001 |
| WO | WO 02/081372 A2 | 10/2002 |
| WO | WO 03/097107 A | 11/2003 |
| WO | WO 2004/041972 A | 5/2004 |
| WO | WO 2004/060928 A | 7/2004 |
| WO | WO 2004/087777 A2 | 10/2004 |
| WO | WO 2005/056621 A1 | 6/2005 |
| WO | WO 2005/087819 A1 | 9/2005 |
| WO | WO 2005/116097 A1 | 12/2005 |
| WO | WO 2007/021142 A1 | 2/2007 |
| WO | WO 2007/025086 A2 | 3/2007 |
| WO | WO 2007/025310 A1 | 3/2007 |
| WO | WO 2007/059350 A2 | 5/2007 |
| WO | WO 2007/075817 A1 | 7/2007 |
| WO | WO 2008/009997 A1 | 1/2008 |
| WO | WO 2008/057163 A2 | 5/2008 |
| WO | WO 2008/148000 A1 | 12/2008 |
| WO | WO 2009/023353 A9 | 2/2009 |
| WO | WO 2009/065077 A1 | 5/2009 |
| WO | WO 2009/108822 A1 | 9/2009 |
| WO | WO 2009/111725 A1 | 9/2009 |
| WO | WO 2009/132206 A1 | 10/2009 |
| WO | WO 2009/132884 A1 | 11/2009 |
| WO | WO 2010/096422 A1 | 8/2010 |
| WO | WO 2010/111708 A1 | 9/2010 |
| WO | WO 2010/131907 A2 | 11/2010 |
| WO | WO 2012/034043 A1 | 3/2012 |
| WO | WO 2012/091965 A1 | 7/2012 |

OTHER PUBLICATIONS

Anderegg et al., "Pyridine Derivatives as Complexing Agents XI. Thermodynamics of Metal Complex Formation with Bis-, Tris- and Tetrakisl(2-pyridyl)methyl]-amines", Helvetica Chimica Acta, 1977, 60(1), pp. 123-140.

Annenkov et al., Poly-C-vinyltetrazoles: A New Type of Polyacid, Journal of Polymer Science Part A: Polymer Chemistry, 1993, pp. 1903-1906, vol. 31(7).

Ashford et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.

(56) References Cited

OTHER PUBLICATIONS

Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.
Bamford, Comprehensive Polymer Science (First Supplement), eds., Pergamon: Oxford vol. 3., p. 123-139 (1991).
Baumann et al., Macromolecular Materials and Engineering (2000), 280/281, 1-6.
Bellus, Pure & Appl. Chem. 57, 1827 (1985).
Bledzki et al., Makromol. Chem. 184, 745 (1983).
Braunecker et al., Macromolecules 2005, 38, 4081.
Braunecker et al., Organometal Chem. 2005, 690, 916.
Brittain et al., Makromol. Chem., Macromol. Symp. 67, pp. 373-386 (1993), "Termination Processes in Group Transfer Polymerization".
Buback et al. (1995) Macromol. Chem. Phys. 196, 3267-80.
Buback et al. (2002) Macromol. Chem. Phys. 203, 2570-2582.
Bywater, Makromol. Chem., Macromol. Symp. 67, pp. 339-350 (1993), "Group Transfer Polymerization—A Critical Overview".
Carnahan et al., Synthesis and Characterization of Poly(glycerol—succinic acid) Dendrimers, Macromolecules, 2001, pp. 7648-7655, vol. 34(22).
Carter et al., Polyimide Nanofoams From Phase-Separated Block Copolymers, Electrochemical Society Proceedings, 1997, pp. 32-43, vol. 97(8), Electrochemical Society, Pennington, NJ, US.
Caruso, Nanoengineering of Particle Surfaces—Adv. Mater. 2001, 13, No. 1, Jan. 5, 11-22—Wiley—VCH Verlag GmbH.D-69469 Weinheim, 2001.
Catala, et al., Macromolecules, 1995, 28, 8441.
Chemical Abstracts, vol. 85, 1976, pp. 20.
Chen et al., Pryolytic Behavior and In-Situ Paramagnetism of Star-like C60(CH3)x(PAN)xcopolymers, European Polymer Journal, 1998, pp. 421-429, vol. 34(3-4), Elsevier Science Ltd., Oxford, GB.
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Cohen et al., Inorg. Chem. 13, 2434 (1974).
Collman et al., "Clicking" Functionality onto Electrode Surfaces, Langmuir, 2004, pp. 1051-1053, vol. 20.
Curran, et al., "Radical Addition Reactions", Comprehensive Organic Synthesis, Pergamon: Oxford vol. 4, p. 715-777 (1991).
Curran et al., J. Am. Chem. Soc. 116, 4279 (1994).
Curran et al., J. Org. Chem., 54, 3140 (1989).
Curran, "The Design and Application of Free Radical Chain Reactions in Organic Synthesis Part 2," Synthesis, pp. 489-513 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries et al., "The Effect of Reducing Monosaccharides on the Atom Transfer Radical Polymerization of Butyl Methacrylate," Macromol. Chem. Phys., 2001, 202, 1645-1648.
Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2002, pp. 2113-2116, vol. 41(12).
Desmarquest et al., Electrochim. Acta (1968), 13, 1109-1118.
Dreezen et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, Macromolecules, 24, 6079-6082 (1991).
Endo et al., Macromolecules, 25, 5554-5556 (1992).
Feng, "Synthesis and Free Radical Polymerization of 2-oxo-3-methylene-5-phenyl-1,4-dioxan", Chinese Journal of Polymer Science, 1993, 11, 2, pp. 153-157.

Fischer et al., Acc. Chem. Res. 20, 200-206 (1987).
Fischer, H., Chem. Rev. 2001, 101, 3581-3610.
Frackowiak et al., "Supercapacitor electrodes from multiwalled carbon nanotubes", Applied Physics Letters, 77, pp. 2421-2423 (2000).
Fukuda et al, Chem. Letters, 1996, 4, 293.
Fukuda et al., Macromolecules, 1996, 29, 3050.
Gabaston et al., "Synthesis of water soluble homopolymers and block copolymers by living free-radical polymerization", Polymr Preprints (American Chemical Society, Division of Polymer Chemistry), 38(1), pp. 719-720 (1997).
Gaynor et al., Polym. Prep. (Am. Chem. Soc. Polym. Chem. Div.), 36(1), 467 (1995).
Georges et al., Macromolecules 1993, 26, 2987.
Georges et al., Macromolecules 1994, 27, 7228.
Georges et al., Macromolecules 1993, 26, 5316.
Gilbert & Williams, Reactivity Ratios of Conjugated Dienes Copolymerized in Emulsion at 5°, J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta et al., Macromolecules, 27, 638-644 (1994).
Gromada et al., Simultaneous Reverse and Normal Initiation in Atom Transfer Radical Polymerization, Macromolecules, 2001, pp. 7664-7671, 34(22).
Haddleton et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker et al., Macromolecules, 1996, 29, 2686.
Hayes et al., J. Am. Chem. Soc. 110, 5533 (1988).
Hedrick et al., (Dendrimer-like Star Block and Amphiphlic Copolymers by Combination of Ring Opening and Atom Transfer Radicat Polymerization. Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, 1380-1385.
Hirao et al., J. Synth. Org. Chem. (Japan), 52(3), 197 (1994).
Hirao et al., Syn. Lett. 217 (1990).
Hong et al., "Synthesis of water-soluble fluorine-containing block copolymers by atom transfer radical polymerization", 25(4), 302 (2001).
Hovestad et al., Macromolecules 2000, 33, 4048-4052.
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal et al., Chem. Rev. 94, 519 (1994).
Jakubowski et al., "Activators Regenerated by Electron Transfer for Atom Transfer Radical Polymerization of Styrene," Macromolecules, 2006, 39, 39-45.
J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.

(56) References Cited

OTHER PUBLICATIONS

Jian et al., Mesoporous carbons with self-assembled high-activity surfaces, Air Force Research Laboratory [Report], Jul. 7, 2006. [Retrieved from http://www.dtic.mil, Search ADA461480].
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato et al., Macromolecules, 28, 1721 (1995).
Kawaguchi et al., "Dispersion Polymerization", in Polymer Particles, Masayoshi Okubo, ed., Adv. Polym. Sci., 2005, 175, 299-328.
Kizhnyaev et al., Vinyltetrazoles: Synthesis and Properties, Russian Chemical Reviews, 2003, pp. 143-164, vol. 72(2).
Kolb et al., Click Chemistry: Diverse Chemical Function from a Few Good Reactions, Angewandte Chemie, International Edition, 2001, pp. 2004-2021, vol. 40(11).
Kosower, E.M., Acc Chem. Res. (1971), 4, 193-198.
Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Lazzari et al., Macromolecular Chemistry and Physics (2005), 206, 1382-1388.
Leduc et al., Dendritic initiators for "Living" Radical Polymerizations: A Versatile Approach to the Synthesis of Dendritic-Linear Block Copolymers, J. Am. Chem. Soc. Jun. 26, 1996, 118, 11111.
Lee et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).
Lewis et al., Copolymerization VII, Copolymerization of Some Further Monomer Pairs, Apr. 1948, pp. 1527-1529.
Li et al., "Highly ordered carbon nanotube arrays for electronics applications", Applied Physics Letters, 75 pp. 367-369 (1999).
Li et al., ASC Polym. Preprints, 1995, 36(1), 469.
Lingane, "Interpretation of the Polarographic Waves of Complex Metal Ions," Chem. Rev. 1941, 29, 1.
Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.
Majoral et al., Dendrimers Containing Heteroatoms (Si, P, B, Ge, or Bi), Chemical Reviews, 1999, pp. 845-880, vol. 99(3).
Makino et al., Controlled Atom Transfer Radical Polymerizations of Methyl Methacrylate Under Micellar Conditions, Polymer Preprints, 1988, pp. 288-289, vol. 39(1).
Mao et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).
Maraval et al., "Lego" Chemistry for the Straightforward Synthesis of Dendrimer, Journal of Organic Chemistry, 2003, pp. 6043-6046, vol. 68(15).
Mardare et al., ACS Polymer Preprints 35(1), 778 (1994).
Mardare et al., Macromolecules, 27, 645 (1994).
Mardare et al., Polym. Prep. (ACS), 36(1), 700-701 (1995).
Marestin et al., Nitroxide Mediated Living Radical Polymerization of Styrene in Emulsion, Macromolecules, 1998, pp. 4041-4044, vol. 31(12).
Matsumoto et al., Synth. Commun. (1985) 15, 515.
Matthews et al., Dendrimers-Branching out from Curiosites into New Technologies, Progress in Polymer Science, 1998, pp. 1-56, vol. 23.
Wang et al., Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.
Shinoda et al., (Structural Control of Poly(Methyl Methacrylate)-g-poly(Lactic Acid) Graft Copolymers by Atom Transfer Radical Polymerization (ATRP). Macromolecules 2001, 34, 6243-6248.
Matyjaszewski et al., "Controlled/Living Radical Polymerization. Kinetics of the Homogeneous Atom Transfer Radical Polymerization of Styrene," J. Am. Chem. Soc., 1997, 119, 674-680.
Matyjaszewski et al., "Atom transfer radical polymerization", *Chemical Reviews*, 2001, 101, (9), 2921-2990.
Matyjaszewski et al., Controlled/"Living" Radical Polymerization of Styrene and Methly Methacrylate Catalyzed by Iron Complexes1, Macromolecules, 1997, pp. 8161-8164, vol. 30(26).
Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.
Matyjaszewski et al., Controlled/Living Radical Polymerization: State of the Art in 2005, in Controlled Radical Polymerization: From Synthesis to Materials, American Chemical Society Division of Polymer Chemistry, 2006, Chapter 1, pp. 2-12, vol. 944.
Matyjaszewski et al., Zerovalent Metals in Controlled/"Living" Radical Polymerization, Macromolecules, 1997, pp. 7348-7350, vol. 30(23).
Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.
Matyjaszewski, "Radical Nature of Cu-Catalyzed Controlled Radical Polymerizations (Atom Transfer Radical Polymerization)," Macromolecules, 1998, 31, 4710-4717.
Matyjaszewski, K., "Overview: Fundamentals of Controlled/Living Radical Polymerization," American Chemical Society, publication date: Jan. 8, 1998, pp. 2-30, downloaded on Sep. 2, 2009, http://pubs.acs.org.
Matyjaszewski et al., Macromolecules 34, 5125 (2001).
Matyjaszewski et al., Tetrahedron (1997), 53, 15321-15329.
McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.
Min et al, "Atom Transfer Radical Dispersion Polymerization of Styrene in Ethanol", Macromolecules, ACS, Washington, DC, US, vol. 40, No. 20, (Oct. 2, 2007), pp. 7217-7221.
Mitani et al., J. Am Chem. Soc. 105, 6719 (1983).
Nagashima, J. Org. Chem. 57, 1682 (1992).
Nagashima, J. Org. Chem. 58, 464 (1993).
Navon et al., Inorg. Chem. 1999, 38, 3484.
Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).
Odell et al., Macromolecules, 1995, 28, 8453.
Odian, Principles of Polymerization, Third Edition, John Wiley & Sons, p. 205-233 (1991).
Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.
Orochov et al., J. Chem. Soc., Perkin II, 1000 (1973).
Orr, Thermochemical Aspects of Butadiene-Styrene Copolymerization, 1960, pp. 74-82.
Otsu et al., Chem. Express 5(10), 801 (1990).
Otsu et al., Synthesis, Reactivity, and Role of—Vinylbenzyl N,N-Diethyldithiocarbamate as a Monomer-Iniferter in Radical Polymerization, Macromolecules, 1986, pp. 287-290, vol. 19(2).

(56) References Cited

OTHER PUBLICATIONS

Pakula et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.
Paoletti et al., Inorg. Chem. 1967, 6, 64.
Paoletti et al., Inorg. Chim. Acta Rev. 1973, 7, 43.
Patten et al., Atom Transfer Radical Polymerization and the Synthesis of Polymeric Materials, Advanced Materials, 1998, pp. 901-915, vol. 10(12).
Patten et al., "Polymers with very low polydispersities from atom transfer radical polymerization", *Science* (Washington, D. C.), 1996, 272, (5263), 866-868.
Percec et al., "Living" Radical Polymerization of Styrene Initiated by Arenesulfonyl Chlorides and Cu1(bpy)nCl, Macromolecules, 1995, pp. 7970-7972, vol. 28(23).
Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).
Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.
Punna et al., Click Chemistry in Polymer Synthesis, Polymer Preprints, 2004, pp. 778-779, vol. 45(1).
Puts et al., Macromolecules, 1996, 29, 3323.
Qiu et al., Cyclic Voltammetric Studies of Copper Complexes Catalyzing Atom Transfer Radical Polymerization, Macromolecular Chemistry and Physics, 2000, pp. 1625-1631, vol. 201(14).
Queffelec et al., Optimization of Atom Transfer Radical Polymerization Using Cu(1)/Tris(2-(dimethylannino)ethyl)amine as a Catalyst, Macromolecules, 2000, pp. 8629-8639, vol. 33.
Quirk et al., Makromol. Chem., Macromol. Symp. 67, pp. 351-363 (1993), "Mechanistic Aspects of Group Transfer Polymerization".
Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.
S.A.F. Bon et al., Controlled Radical Polymerization in Emulsion, Macromolecules, 1997, pp. 324-326, vol. 30(2).
Samuni et al., "On the cytotoxicity of vitamin C and metal ions," European Journal of Biochemistry, 1983, 137. 119-124.
Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.
Schulz & Milkovich, Relative Reactivities and Graft Distributions of Polystyrene Macromers in Vinyl Chloride Copolymerization, Polymer International, 1994, pp. 141-149, Great Britain.
Seijas et al., Tetrahedron, 48(9), 1637 (1992).
Shen et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.
Srivastava et al., J. Inorg. Nucl. Chem. (1980), 42, 47.
Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).
Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.
Takeichi et al., Preparation of Porous Carbon Films by the Pyrolysis of Poly(Urethane-imide) Films and Their Pore Characteristics, Carbon, 2001, pp. 257-265, vol. 39(2).
Tang, et al., J. Am. Chem. Soc., 128, 1598-1604.
Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.
Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).
Udding et al., J. Org. Chem. 59, 1993 (1994).
Van Gaal et al., "Trends in Redox Potentials of Transition Metal Complexes," Coord. Chem. Rev. 1982, 47, 41.
Veregin et al., Macromolecules, 1996, 29, 4161.
Vidts et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).
Vlcek, "Ligand Based Redox Series," Coord. Chem. Rev. 1982, 43, 39.
Von Werne et al., Preparation of Structurally Well-Defined Polymer—Nanoparticle Hybrids with Controlled/living Radical Polymerizations—J. Am. Chem. Soc. 1999, 121, 7409-7410.
Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.
Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).
Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).
Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.
Wang et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.
Wang et al., J. Am. Chem. Soc. (1992), 114, 248-255.
Wang et al., Polym. Prep. (Am. Chem. Soc. Polym. Chem. Div.), 36(1), 465 (1995).
Wayland et al., Am. Chem. Soc., 116, 7943 (1994).
Webster, Living Polymerization Methods, Science, 1991, pp. 887-893, vol. 25.
Webster, Makromol. Chem., Macromol. Symp. 67, pp. 365-371 (1993), "Mechanism of GTP: Can all of the Available Data be Accommodated?".
Wei et al., Atom Transfer Radical Polymerization of Styrene in the Presence of Iron Complexes, Polymer Preprints, 1997, pp. 231, vol. 38(2).
Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).
Xia et al., Controlled/"Living" Radical Polymerization. Homogenous Reverse Atom Transfer Radical Polymerization Using AIBN as the Initiator, Macromolecules, 1997, pp. 7692-7696, vol. 30.
Xia et al., "Atom Transfer Radical Polymerization of 4-Vinylpyridine", Macromolecules, pp. 3531-3533 (1999).
Zeng et al., "Synthesis and Characterization of Comb-Branched Polyelectrolytes. 1. Preparation of Cationic Macromonomer of

(56) References Cited

OTHER PUBLICATIONS 2-(Dimethylamino)ethyl Methacrylate by Atom Transfer Radical Polymerization", Macromolecules, 33(5), pp. 1628-1635 (2000).
Gaynor et al., Macromolecules 1998, 31, 5951-5954.
Chambard et al., Macromol. Symp. 2000, 150, 45-51.
Li et al., Macromolecules 2004, 37, 2106-2112.
Min et al., J. Am. Chem. Soc. 2005, 127, 3825-3830.
Min et al., J. Polym. Sci., Part A: Polym. Chem. 2005, 43, 3616-3622.
Antonietti et al., Macromolecules, 1991, 24: 6636-6643.
Feng et al., "The Preparation of Micropolystyrene Particles by Controlled Microemulsion Polymerization", Polymer Materials Science and Engineering, Jul. 2005, vol. 21, No. 4, 117-120.
Feng, et al., J. Appl. Polym. Sci., 2006, 99 1093-1099.
Min et al., Macromolecules 2005, 38, 8131-8134.
Nicolas et al., Macromolecules 2005, 38, 9963-9973.
Ferguson et al., Macromolecules 2005, 38, 2191-2204.
Sprong et al., Macromolecular Symposia 2006, 231, 84-93.
Chow et al., Adv. Polym. Sci. 2005, 175, 257-298.
Chow et al., Langmuir 1999, 15, 3202-3205.
El-Safty et al., Chem. Mater. 2005, 17, 3137-3145.
Stoffer et al., J. Polym. Sci. Polym. Chem. Ed. 1980, 18, 2641-2648.
Ferrick et al., Macromolecules 1989, 22, 1515-1517.
Kuo et al., Photoinitiated Polymerization of Styrene in Microemulsions, Macromolecules, 1987, 20, pp. 1216-1221.
Jakubowski et al., Macromolecules 2005, 38, 4139-4146.
Antonietti et al., Macromol. Chem. Phys. 1995, 196, 441-466.
Guo et al., J. Polym. Sci., Part A: Polym. Chem. 1989, 27, 691-710.
Cramer, W. Proc. Chem. Soc. 1914, 30, 293.
Reiner et al., Baskerville Chemical Journal 1953, 4, 15-17.
Singh et al., Zeitschrift fuer Physikalische Chemie (Leipzig) 1957, 207, 198-204.
Parris et al., Discussions of the Faraday Society 1960, 240-247.
Weiss et al., Inorg. Chem. 1964, 3, 1344-1348.
Maeda et al., J. Adv. Polym. Sci. 2006, 193, 103-121.
Brown et al., Nature Rev. Cancer 2004, 4, 437-447.
Khelfallah et al., "Synthesis of New PHEMA/PEO Enzymatically Biodegradable Hydrogel", Macromolecular Rapid Communications, 2006, 27, 1004-1008.
Huang, X and T. L. Lowe, "Biodegradable Thermoresponsive Hydrogels for Aqueous Encapsulation and Controlled Release of Hydrophilic Model Drugs", Biomacromolecules, 2005, 6, 2131-2139.
Houk, J. and G. M. Whitesides, "Structure-Reactivity Relations for Thiol-Disulfide Interchance", J. Am. Chem. Soc., 1987, 109, 6825-6836.
Tsarevsky et al., Chapter VI: Synthesis of Well-Defined Polymeric Materials with Diuslfide and Thiol Groups, Their Further Functionalization, and Reversible Cleavage/Coupling Via Redox Processes: Towards functional (Bio)Degradable Materials, Thesis, Carnegie Mellon University, pp. 249-311 (2005).
Li et al., Angew Chem. Int. Ed. 2006, 45, 3510-3513.
Li et al., "Synthesis of Reversible Shell Cross-Linked Micelles for Controlled Release of Bioactive Agents", Macromolecules, 2006, 39, 2726-2728.
Gao et al., "Synthesis of Degradable Miktoarm Star Sopolymers via Atom Transfer Radical Polymerization", Macromolecules, vol. 38, pp. 5995-6004 (2005).
Schafer et al., Free Radical Biol. Med. 2001, 30, 1191-1212.
Medicinal Research Reviews, 2002, 22, 225-250.
Tsarevsky et al., "Combining Atom Transfer Radical Polymerization and Disulfide/Thiol Redox Chemistry: A Route to Well-Defined (Bio)degradable Polymeric Materials", Macromolecules, 2005, 38, 3087-3092.
Oh et al., "Inverse Miniemulsion ATRP: A New Method for Synthesis and Functionalization of Well-Defined Water-Soluble/Cross-Linked Polymeric Particles", Journal of the American Chemical Society, 2006, 128, 5578-5584.
Oh et al., "Biodegradable Nanogels Prepared by Atom Transfer Radical Polymerization as Potential Drug Delivery Carriers: Synthesis, Biodegradation, in Vitro Release, and Bioconjugation", Journal of the American Chemical Society, 2007, 129 (18): 5939-5945.
Barrett, K.E. et al., J. Polym. Sci., Polym. Chem. Ed. 1969, 7, 2621.
Tseng, C.M. et al., J. Polym. Sci., Part A: Polym. Chem. 1986, 24, 2995.
El-Aasser, M.S. et al., J. Polym. Sci., Part A: Polym. Chem. 1996, 34, 2633.
Kawaguchi et al., Adv. Polym. Sci., 2005, 175, 299.
LaMer, V.K. et al., J. Am. Chem. Soc. 1950, 72, 4847.
Yang, W. et al., J. Polym. Sci., Part A: Polym. Chem. 2001, 39, 555.
Song, J. et al., J. Am. Chem. Soc. 2004, 126, 6562.
Song, J. and M. A. Winnik, "Cross-Linked, Monodisperse, Micro-Sized Polystyrene Particles by Two-Stage Dispersion Polymerization," Macromolecules, vol. 38, pp. 8300-8307 (2005).
Song, J. et al., 2006, 39, 8318-8325.
Hölderle, M. et al., Macromolecules 1997, 30, 3420.
Gabaston et al., Macromolecules 1998, 31, 2883.
Shim, S.E. et al., S. Polymer 2003, 44, 5563.
Min, K. et al., "Development of an *ab Initio* Emulsion Atom Transfer Radical Polymerization: From Microemulsion to Emulson." J. Am. Chem. Soc. 2006, 128(32), 10521-10526.
Min, K. et al., "Atom Transfer Radical Dispersion Polymerization of Styrene in Ethanol" Polymer Preprints, 2007, 48 (2), 260-261.
Patil et al., Surface-modified and Internally cationic polyamidoamine dendrimers for efficient siRNA delivery, 2008, Bioconjugate Chemistry, vol. 19, pp. 1396-1403.
Akhtar et al., "Toxicogenomics of non-viral drug delivery systems for RNAi: Potential impact on siRNA-mediated gene silencing activity and specificity", Adv. Drug Delivery Rev., 2007, 59, (2-3), 164-182.
Bencherif et al., "End-group effects on the properties of PEG-co-PGA hydrogels", Acta Biomater, 2009, 5(6): 1872-1883.
Bencherif et al., "Influence of cross-linker chemistry on release kinetics of PEG-co-PGA hydrogels", J. Biomed. Mater. Res., Part A, 2009, 90A(1): 142-153.
Bencherif et al., "Cell-Adhesive Star Polymers Prepared by ATRP", Biomacromolecules, 2009, (10), 1795-1803.
Bencherif et al., "Influence of the degree of methacrylation on hyaluronic acid hydrogels properties", Biomaterials, 2008, 29, (12), 1739-1749.
Bencherif et al., "Nanostructured hybrid hydrogels prepared by a combination of atom transfer radical polymerization and free radical polymerization", Biomaterials, 2009, 30, (29), 5270-5278.
Bencherif et al., "Synthesis by AGET ATRP of Degradable Nanogel Precursors for In Situ Formation of Nanostructured Hyaluronic Acid Hydrogel", Biomacromolecules, 2009, 10, (9), 2499-2507.
Bober et al., "Delivery of siRNA using cationic star polymers to suppress runt related transcription factor 2 and osterix in vitro", 34th Annual Meeting of the Society for Biomaterials 2010, Giving Life to a World of Materials, Seattle, Washington, USA, Apr. 21-24, 2010, vol. 2 of 2, 579.
Braunecker, W. A. and K. Matyjaszewski, "Controlled/living radical polymerization: Features, developments, and perspectives", Progress in Polymer Science, 2008, 33, (1), 165.
Braunecker, W. and K. Matyjaszewski, "Controlled/living radical polymerization: Features, developments, and perspectives", Progress in Polymer Science, 2007, 32, (1), 93-146.
Brekke, J. H., and Kipling Thacker, "Hyaluronan as a Biomaterial", An Introduction to Biomaterials, The Biomedical Engineering Series, 2006, 219-240.
Cho et al., "Synthesis of Biocompatible PEG-Based Star Polymers with Cationic and Degradable Core for siRNA Delivery", Biomacromolecules: 12(10): 3478-3486.
Cho et al., "Preparation of Poly(ethylene glycol) Star Copolymers with a Cationic Core for siRNA Delivery by ATRP", Polym. Prepr., (Am. Chem. Soc., Div. Polym. Chem.), 2011, 52(2): 608-609.
Cho et al., "Rapid Cellular Internalization of Multifunctional Star Polymers Prepared by Atom Transfer Radical Polymerization", Biomacromolecules, 2010, 11 (9): 2199-2203.
Coessens et al., "Functional polymers by atom transfer radical polymerization", Progress in Polymer Science, 2001, 26, (3), 337-377.

(56) References Cited

OTHER PUBLICATIONS

Dong, Hongchen and Krzysztof Matyjaszewski, "ARGET ATRP of 2-(Dimethylamino)ethyl Methacrylate as an Intrinsic Reducing Agent", Macromolecules, 2008, 41, 6868-6870.
Duncan et al., "Dendrimer biocompatibility and toxicity", Adv. Drug Delivery Rev., 2005, 57, (15), 2215-2237.
Duncan et al., "Polymer therapeutics: polymers as drugs, drug and protein conjugates and gene delivery systems: past, present and future opportunities", Adv. Polym. Sci., 2006, 192, (Polymer Therapeutics I), 1-8.
El-Aneed, A., "An overview of current delivery systems in cancer gene therapy", J. Controlled Release, 2004, 94, (1), 1-14.
Gao, H. and K. Matyjaszewski, "Synthesis of functional polymers with controlled architecture by CRP of monomers in the presence of cross-linkers: From stars to gels", Prog. Polym. Sci., 2009, 34, (4), 317-350.
Gilmore et al., "The design and exogenous delivery of siRNA for post-transcriptional gene silencing", Journal of Drug Targeting, 2004, 12, (6), 315-340.
Gupta et al., "Hydrogels: from controlled release to pH-responsive drug delivery", Drug Discov Today, 2002, 7, (10), 569-579.
Hartwell, R. et al., "A Novel Nydrogel-Collagen Composite Improves Functionality of an Injectable Extracellular Matrix", Acta Biomaterialia, 7, 2011, 3060-3069.
Hawker et al., "New polymer synthesis by nitroxide mediated living radical polymerizations", Chem Rev, 2001, 101, (12), 3661-3688.
Heath et al., "Charged polymers via controlled radical polymerization and their implications for gene delivery", Macromol. Chem. Phys., 2007, 208, (12), 1243-1249.
Heggli et al., "Michael-type addition as a tool for surface functionalization", Bioconjugate Chem., 2003, 14, (5), 967-973.
Hiemstra et al., "Rapidly in situ-forming degradable hydrogels from dextran thiols through michael addition", Biomacromolecules, 2007, 8, (5), 1548-1556.
Hong, et al., "Post-transcriptional gene silencing using siRNA delivered from star nanostructured polymer", Abstracts/Bone, 46, S9-S83, accepted for society for Biomaterials, Seattle, WA, Apr. 21-24, 2010, S49-S50.
Li et al., "A New Class of Biochemically Degradable, Stilumus-Responsive Triblock Copolymer Gelators", Agnew. Chem. Int. Ed., 2006, 45, 3510-3513.
Lowe, A. and C. McCormick, "Reversible addition-fragmentation chain transfer (RAFT) radical polymerization and the synthesis of water-soluble (co)polymers under homogeneous conditions in organic and aqueous media", Prog. Polym. Sci., 2007, 32, (3), 283-351.
Matyjaszewski et al., "Simple and Efficient Synthesis of Various Alkoxyamines for Stable Free Radical Polymerization", Macromolecules, 1998, 31, (17), 5955-5957.
Merkel et al., "Stability of siRNA polyplexes from poly(ethylenimine) and poly(ethylenimine)-g-poly(ethylene glycol) under in vivo conditions: Effects on pharmacokinetics and biodistribution measured by Fluorescence Fluctuation Spectroscopy and Single Photon Emission Computed Tomography (SPECT) imaging", J. Controlled Release, 2009, 138, (2), 148-159.
Oh et al., "Synthesis and Biodegradation of Nanogels as Delivery Carriers for Carbohydrate Drugs", Biomacromolecules, 2007, 8, (11), 3326-3331.
Oh et al., "The development of microgels/nanogels for drug delivery applications", Progress in Polymer Science, 2008, 33, (4), 448-477.
Park et al., "Photo-Cross-Linkable Thermoresponsive Star Polymers Designed for Control of Cell-Surface Interactions", Biomacromolecules, 2010, 11(10): 2647-2652.
Parkinson et al., "Radiation therapy in the prevention of heterotopic ossification after total hip arthroplasty", Hip, 1982, 211-227.
Shen, Y., "Advances in the development of siRNA-based therapeutics for cancer", IDrugs, 2008, 11(8): 572-578.
Siegwart et al., "Solvent induced morphologies of poly(methyl methacrylate-b-ethylene oxide-b-methyl methacrylate) triblock copolymers synthesized by atom transfer radical polymerization," Polymer, 2007, 48(25): 7279-7290.
Siegwart et al., "Biotin-, Pyrene-, and GRGDS-functionalized polymers and nanogels via ATRP and end group modification", Macromol. Chem. Phys., 2008, 209, (21), 2179-2193.
Siegwart et al., "Cellular uptake of functional nanogels prepared by inverse miniemulsion ATRP with encapsulated proteins, carbohydratesmand gold nanoparticles, Biomacromolecules", 2009, 10, (8), 2300-2309.
Siegwart et al., "Synthesis, characterization, and in vitro cell culture viability of degradable poly(N-isopropylacrylamide-co-5,6-benzo-2- methylene-1,3-dioxepane)-based polymers and crosslinked gels", Journal of Biomedical Materials Research, Part A, 2008, 87 A, (2), 345-358.
Srinivasan et al., "Delivery of siRNA Using Cationic Nanostructured Star Polymers to Prevent Myoblast Cell Differentiation to Bone", Carnegie Mellon University, Pittsburgh, Pennsylvania, Dec. 2010, 1 page.
Zelikin et al., "Disulfide Cross-Linked Polymer Capsules: En Route to Biodeconstructible Systems", Biomacromolecules, 2006, 7, 27-30.
Pyun et al., "Synthesis of Well-Defined Block Copolymers Tethered to Polysilsequioxane Nanoparticles and their Nanoscale Morphology on Surfaces", J. Am. Chem. Soc. 123, 9445-9446 (2001).
Pyun et al., Supporting Information, J. Am. Chem. Soc., 51-58 (2001).
Pyun et al., "Synthesis of Nancomposite Organic/Inorganic Hybrid Materials Using Controlled/'Living' Radical Polymerization," Chem. Mater. 13, 3436-3448 (2001).
Pyun et al., "Synthesis of Polymer Brushes Using Atom Transfer Radical Polymerization", Macromol. Rapid Commun. 24, 1043-1059 (2003).
Pyun et al., "Synthesis and Characterization of Organic/Inorganic Hybrid Nanoparticles: Kinetics of Surface-Initiated Atom Transfer Radical Polymerization and Morphology of Hybrid Nanoparticle Ultrathin Films", Macromolecules 36, 5094-5104 (2003).
Matyjasewski et al., Chapter 17 Organic-Inorganic Hybrid Polymers from Atom Transfer Radical Polymerization and Poly(dimethylsiloxane), Am. Chemical Soc. Symposia. 270-283 (2000).
Pyun et al. "Organic/Inorganic Hybrid Materials from Polysiloxanes and Polysilsesquioxanes Using Controlled/Living Radical Polymerization", Manuscript submitted for Publication 1-12 (2007).
Bombalski et al., "Quasi-transparent Hybrid Particles Using Atom Transfer Radical Polymerization", Polymeric Materials: Science & Engineering 97, 327 (2007).
Bockstaller et al., "Block Copolymer Nanocomposites: Perspectives for Tailored Functional Materials", Adv. Mater. 17, 1331-1349 (2005).
Bombalski et al., "Null-Scattering Hybrid Particles Using Controlled Radical Polymerization", Adv. Mater. 19, 4486-4490 (2007).
Bouvier-Fontes et al., "Seeded Semicontinuous Emulsion Copolymerization of Butyl Acrylate with Cross-Linkers", Macromolecules 38, 1164-1171 (2005).
Kirsch et al., "Control of Particle Morphology and Film Structures of Carboxylated Poly(Methyl Methacrylate)/Poly(n-Butylacrylate) Composite Latex Particles", Journal of Appliled Polymer Science, vol. 91, 2610-2623 (2004).
Kirsch et al., "Control of Particle Morphology and Film Structures of Carboxylated Poly(N-Butylacrylate)/Poly(methyl) Composite Latex Particles", Colloids and Surfaces, A Physicochemical and Engineering Aspects, 183-185, 725-737 (2001).
Baysal, et al., Styrene Polymerization with a Macroinitiator Having Siloxane Units, Journal of Applied Polymer Science, May 31, 1996, vol. 60, 1369-1378.
Gaynor et al., "Synthesis of Branched and Hyperbranched Polystyrenes", Macromolecules, 1996, 29, 1079-1081.
Ando et al., "Living Radical Polymerization of Methyl Methacrylate with Ruthenium Complex: Formation of Polymers with Controlled Molecular Weights and Very Narrow Distributions", Macromolecules, 1996, 29, 1070-1072.
Ishizu et al., "Synthesis of star polymers by organized polymerization of macromonomers", *Polymer*, vol. 36, pp. 4155-4157 (1995).

(56) References Cited

OTHER PUBLICATIONS

Mirica et al., "Structure and Spectroscopy of Copper-Dioxygen Complexes", Chem. Rev. 2004, 104, 1013-1045.
Bouix et al., "Synthesis of amphiphilic polyelectrolyte block copolymers using "living" radical polymerization, Application as stabilizers in emulsion polymerization", Macromol. Rapid Commun., 1998, 19, 209-213.
Burguiere et al., "Amphiphilic Block Copolymers Prepared via Controlled Radical Polymerization as Surfactants for Emulsion Polymerization", Macromol. Symp. 2000, 150, 39-44.
Nicolay et al., "Dibromotrithiocarbonate Iniferter for Concurrent ATRP and RAFT Polymerization. Effect of Monomer, Catalyst, and Chain Transfer Agent Structure on the Polymerization Mechanism," Macromolecules, 2008, 41, 4585-4596.
Nicolay et al., "Synthesis of poly(vinyl acetate) block copolymers by successive RAFT and ATRP with a bromoxanthate iniferter," Chem. Commun., 2008, 5336-5338.
Kwak, et al., "Effect of Initiator and Ligand Structures on ATRP of Styrene and Methyl Metacrylate Initiated by Alkyl Dithiocarbamate," Macromolecules, 2008, 41, 6627-6635.
Kwak, et al., "Concurrent ATRP/RAFT of Strene and Methyl Methacrylate with Dithioesters Catalyzed by Copper(I) Complexes," Macromolecules, 2008, 41, 6602-6604.
Wager et al., "A simple method to convert atom transfer radical polymerization (ATRP) Initiators into reversible addition fragmentation chain-transfer (RAFT) mediators." Eur. Polym. J., 2004, 40, 641-645.
Kabachii, et al., "Dithioesters in Atom-Transfer Radical Polymerization," Polym. Sci, Ser. B, 2006, 48, 32-36.
Zhang, et al., "Atom Transfer Radical Polymerizations of Methyl Methacrylate and Styrene with an Iniferter Reagent as the Initiator," J. Appl. Polym. Sci., 2007, 106, 230-237.
Zhang, et al., "Synthesis of Well-Defined Naphthalene and Photolabile Group-Labeled Polystyrene via ATRP," J. Polym. Sci.: Part A: Polym. Chem., 2006, 44, 510-518.
Kwak, et al., "Photoirradiated Atom Transfer Radical Polymerization with an Alkyl Dithiocarbamate at Ambient Tempterature", Macromolecules, 2010, 43, 5180-5183.
Matsuzaki et al., "Stereoregularity of Polystyrene and Mechanism of Polymerization", Die Makromolekulare Chemie, 1975, 176, 3051-3064.
Haddleton et al., "Identifying the Nature of the Active Species in the Polymerization of Methacrylates: Inhibition of Methyl Methacrylate Homopolymerizations and Reactivity Ratios for Copolymerization of Methyl Methacrylate/n-Butyl Methacrylate in Classical Anionic, Alkyllithium/Trialkylaluminum-Initiated, Group Transfer Polymerization, Atom Transfer Radical Polymerization, Catalytic Chain Transfer, and Classical Free Radical Polymerization", Macromolecules, 1997, 30, 3992-3998.
Webster, Owen W., "Group Transfer Polymerization: Mechanism and Comparison with Other Methods for Controlled Polymerization of Acrylic Monomers", Adv Polym Sci, 2004, 167, 1-34.
Zilliox et al., "Preparation of star-shaped macromolecules by anionic copolymerization," Journal of Polymer Science, Polymer Symposia, No. 22 (Pt. 1): 145-56, (1968).
Kanaoka et a., "Synthesis of star-shaped poly-vinyl ethers by living cationic polymerization: pathway for formation of star-shaped polymers via polymer linking reactions," Polymer Bulletin (Berlin) 44(5-6): 485-492, (2000).
Shibata, et al., "Quantitative Synthesis of Star-Shaped Poly(vinyl ether)s with a Narrow Molecular Weight Disribution by Living Cationic Polymerization," Journal of the American Chemical Society, 128(23): 7497-7504, (2006).
Qiu et al., "Controlled/Living Radical Polymerization in Aqueous Media: Homogeneous and Heterogeneous Systems," *Prog. Polym. Sci.*, vol. 26, pp. 2083-2134 (2001).
Ohno, S. and K. Matyjaszewski, "Controlling Grafting Density and Side Chain Length in Poly(n-butyl acrylate) by ATRP (Co)polymerization of Macromonomers," Journal of Polymer Chem. Ed., 2006, 44, 5454-5467 (2006).

Matyjaszewski, K. and J. Xia, "Fundamentals of Atom Transfer Radical Polymerization," Handbook of Radical Polymerization, Chapter 11; John Wiley & Sons, Inc., pp. 523-628 (2002).
Kamigaito et al., Chem. Rev., 101, 3689 (2001).
Gao, H. and K. Matyjaszewski, "Low Polydispersity Star Polymers with Core Functionality by Cross-linking Macromonomers Using Functional ATRP Intiators," Macromolecules, 40, 399-401 (2007).
Gao et al., J. Am. Chem. Soc., Low Polydispersity Star Polymers via Cross-linking Macromonomers by ATRP, 128, 15111-15113 (2006).
Davis, K. A. and K. Matyjaszewski, "Statistical, Gradient, Block, and Graft Copolymers by Controlled/Living Radical Polymerizations," *Adv. Polym. Sci.*, vol. 159 pp. 1-168 (2002).
Furukawa, T. and K. Ishizu, Journal of Colloid and Interface Science, 253(2), 465-469, (2002).
Matyjaszewski, K.,"Comparison and Classification of Controlled/Living Radical Polymerizations," American Chemical Society, publication date: Aug. 15, 2000, pp. 2-26, downloaded on Sep. 2, 2009, http://pubs.acs.org.
Le Droumaguet, B. and K. Velonia, "In Situ ATRP-Mediated Hierarchical Formation of Giant Amphiphile Bionanoreactors", Angew. Chem. Int. Ed., 2008, 47(33), pp. 6263-6266.
Tsarevsky et al., "Factors Determining the Performance of Copper-Based Atom Transfer Radical Polymerization Catalysts and Criteria for Rational Catalyst Selection", ACS Symposium Series, 2006, 944, pp. 56-70.
Li et al., "Thermoresponsive Block Copolymer-Protein Conjugates Prepared by Grafting-from via RAFT Polymerization", Macromol. Rapid Commun., 2011, 32, pp. 354-359.
Li et al., "Thermoresponsive Block Copolymer-Protein Conjugates Prepared by Grafting-from via RAFT Polymerization" Supporting Information for Macromol. Rapid Commun., 2011, 32, pp. 354-359.
Lele et al., "Synthesis of Uniform Protein—Polymer Conjugates", Biomacromolecules, 2005, 6, pp. 3380-3389.
Peschke et al., "C-Terminally PEGylated hGH-derivatives", Bioorganic & Medicinal Chemistry, 15, 2007, pp. 4382-4395.
De Paoli et al., "New insights into the mechanism of activation of atom transfer radical polymerization by Cu(I) complexes", Chem. Commun., 2011, 47, pp. 3580-3582.
Pintauer et al., "Atom Transfer radical addition and polymerization reactions catalyzed by ppm amounts of copper complexes", Chem. Soc. Rev., 2008, 37, pp. 1087-1097.
Grover, G. and H. Maynard, "Protein-polymer conjugates: synthetic approaches by controlled radical polymerizations and interesting applications", Current Opinion in Chemical Biology, 2010, 14(6), pp. 818-827.
Peeler et al., "Genetically Encoded Initiator for Polymer Growth from Proteins", JACS Communications, 2010, 132, pp. 13575-13577.
Tang et al., "Understanding atom Transfer Radical Polymerization: Effect of Ligan and Initiator Structures on the Equilibrium Constants", J. Am. Chem. Soc., 2008, 130, pp. 10702-10713.
Bontempo, D. and H. Maynard, "Streptavidin as a Macroinitiator for Polymerization: In Situ Protein-Polymer Conjugate Formation", J. Am. Chem. Soc., 2005, 127, pp. 6508-6509.
Bontempo et al., "Cysteine-Reactive Polymers Synthesized by Atom Transfer Radical Polymerization for Conjugation to Proteins", J. Am. Chem. Soc., 2004, 126, pp. 15372-15373.
Abuchowski et al., "Alteration of Immunological Properties of Bovine Serum Albumin by Covalent Attachment of Polyethylene Glycol", The Jounal of Biological Chemistry, 1977, 252, pp. 3578-3581.
Abuchowski et al., "Effect of Covalent Attachment of Polyethylene Glycol on Immunogenicity and Circulating Life of Bovine Liver Catalase", The Jounal of Biological Chemistry, 1977, 252, pp. 3582-3586.
Duncan, Ruth, "The Dawning Era of Polymer Therapeutics", Nature Reviews, Drug Discovery, 2003, 2, pp. 347-360.
Tsarevsky et al., "Deactivation Efficiency and Degree of Control over Polymerization in ATRP in Protic Solvents", Macromolecules, 2004, 37, pp. 9768-9778.
Lutz et al., "Biocompatible, Thermoresponsive, and Biodegradable: Simple Preparation of "All-in-One" Biorelevant Polymers," Macromolecules, 2007, 40, pp. 8540-8543.

(56) References Cited

OTHER PUBLICATIONS

Braunecker et al., "Thermodynamic Components of the Atom Transfer Radical Polymerization Equilibrium: Quantifying Solvent Effects", Macromolecules, 2009, 42, pp. 6348-6360.
Bortolamei et al., "Thermodynamic Properties of Copper Complexes Used as Catalysts in Atom Transfer Radical Polymerization", Macromolecules, 2010, 43, pp. 9257-9267.
Al-Abboodi et al., "Three-Dimensional Nanocharacterization of Porous Hydrogel With Ion and Electron Beams", Biotechnology and Bioengineering, vol. 110, No. 1, Jan. 2013, pp. 318-326.
Mathur et al., "Methods for Synthesis of Hydrogel Networks: A Review", 1996, Journal of Macromolecular Science, Part C, 36:2, pp. 405-430.
Dimitrov et al., "Continuous Convective Assembling of Fine Particles into Two-Dimensional Arrays on Solid Surfaces", Langmuir, 1996, 12, pp. 1303-1311.
Salerno et al. "Pore Structure and Swelling Behavior of Porous Hydrogels Prepared via a Thermal Reverse-Casting Technique", Journal of Applied Polymer Science, 2011, vol. 122, pp. 3651-3660.
Simakova et al., "Aqueous ARGET ATRP", Macromolecules, 2012, 45, pp. 6371-6379.
Gates et al., "Fabrication and Characterization of Porous Membranes with Highly Ordered Three-Dimensional Periodic Structures", Chem. Mater., 1999, 11, pp. 2827-2836.
Lange et al., "Functional 3D photonic films from polymer beads", phys. stat. sol. (a) 204, No. 11, 2007, pp. 3618-3635.
Shu et al., "Rational Design of Affinity Ligand for the Oriented Immobilization of Trypsin", Acta Phys. Chim. Sin., 2013, 29 (2), pp. 439-448.
Hwang et al., "Fabrication of three-dimensional porous cell-laden hydrogel for tissue engineering", Biofabrication 2 (2010) 12 pages.
Chen et al., "Macroporous Hydrogel Scaffolds and Their Characterization by Optical Coherence Tomography", Tissue Engineering: Part C vol. 17, No. 1, 2011, pp. 101-112.
Seliktar, Dror, "Designing Cell-Compatible Hydrogels for Biomedical Applications", Science, 336, (2012), pp. 1124-1128.
Behravesh et al., "Evaluation of the in Vitro Degradation of Macroporous Hydrogels Using Gravimetry, Confined Compression Testing, and Microcomputed Tomography", Biomacromolecules, 2002, 3, 1263-1270.
Li et al., "Colloidal Assembly: The Road from Particles to Colloidal Molecules and Crystals", Angew. Chem. Int. Ed. 2011, 50, pp. 360-388.
Oxley et al., "Macroporous hydrogels for biomedical applications: methodology and morphology", Biomaterials, 1993, vol. 14, No. 14, pp. 1064-1072.
Savina, Irina, "Macroporous hydrogels by cryogelation: biomedical and environmental applications", abstract, School of Pharmacy and Biomolecular Sciences, University of Brighton, 2012, 1 page.
Savina et al., "Biomimetic Macroporous Hydrogels: Protein Ligand Distribution and Cell Response to the Ligand Architecture in the Scaffold", Journal of Biomaterials Science, 20 (2009), pp. 1781-1795.
Shepard et al., "Hydrogel macroporosity and the prolongation of transgene expression and the enhancement of angiogenesis", Biomaterials, 33 (2012) pp. 7412-7421.
Duan et al., "Versatile fabrication of arbitrarily shaped multi-membrane hydrogels suitable for biomedical applications", J. Mater. Chem. B, 2013, 1, pp. 485-492.
Kopeček, Jindřich, "Hydrogel biomaterials: A smart future?", Biomaterials, 28, 2007, pp. 5185-5192.
Pal et al., "Polymeric Hydrogels: Characterization and Biomedical Applications—A mini review", Designed Monomers and Polymers, 12, 2009, pp. 197-220.
Liu et al., "Hydrogels from Biopolymer Hybrid for Biomedical, Food, and Functional Food Applications", Polymers, 2012, 4, pp. 997-1011.
Dainiak et al., "Biomimetic Macroporous Hydrogel Scaffolds in a High-Throughput Screening Format for Cell-Based Assays", Biotechnol. Prog., 2008, 24, pp. 1373-1383.
Ford et al., "A macroporous hydrogel for the coculture of neural progenitor and endothelial cells to form functional vascular networks in vivo", PNAS, Feb. 21, 2006, vol. 103, No. 8, pp. 2512-2517.
Peppas et al., "Hydrogels in pharmaceutical formulations", European Journal of Pharmaceutics and Biopharmaceutics, 50, 2000, pp. 27-46.
Annabi et al., "Controlling the Porosity and Microarchitecture of Hydrogels for Tissue Engineering", Tissue Engineering: Part B, vol. 16, No. 4, 2010, pp. 371-383.
Davis et al., "Modular enzymatically crosslinked protein polymer hydrogels for in situ gelation", Biomaterials, 31, 2010, pp. 7288-7297.
Jiang et al., "Template-Directed Preparation of Macroporous Polymers with Oriented and Crystalline Arrays of Voids", J. Am. Chem. Soc., 1999, 121, pp. 11630-11637.
Schroden et al., "Hybrid macroporous materials for heavy metal ion adsorption", J. Mater. Chem., 2002, 12, pp. 3261-3267.
Zhao et al., "Horseradish Peroxidase Immobilized in Macroporous Hydrogel for Acrylamide Polymerization", Journal of Polymer Science: Part A: Polymer Chemistry, 2008, vol. 46, pp. 2222-2232.
Pernites et al., "Patterned Surfaces Combining Polymer Brushes and Conducting Polymer via Colloidal Template Electropolymerization", Adv. Mater., 2011, 23, pp. 1287-1292.
Johnson et al., "Ordered Mesoporous Polymers of Tunable Pore Size from Colloidal Silica Templates", Science, vol. 283, Feb. 12, 1999, pp. 963-965.
Owen et al., "Design of three-dimensional biomimetic scaffolds",Journal of Biomedical Materials Research A, Sep. 15, 2010, vol. 94A, Issue 4, pp. 1321-1331.
Park et al., "Macroporous Membranes with Highly Ordered and Three-Dimensionally Interconnected Spherical Pores", Adv. Mater. 1998, 10, No. 13, pp. 1045-1048.
Park et al., "Fabrication of Three-Dimensional Macroporous Membranes with Assemblies of Microspheres as Templates", Chem. Mater., 1998, 10, pp. 1745-1747.
Park et al., "Assembly of Mesoscale Particles over Large Areas and Its Application in Fabricating Tunable Optical Filters", Langmuir, 1999, 15, pp. 266-273.
Ronel et al., "Macroporous hydrogel membranes for a hybrid artificial pancreas. I. Synthesis and chamber fabrication", Journal of Biomedical Materials Research, vol. 17, 1983, pp. 855-864.
Hollister, Scott J., "Porous scaffold design for tissue engineering", Nature Materials, vol. 4, Jul. 2005, 518-524.
Gulrez et al., "Hydrogels: Methods of Preparation, Characterisation and Applications", Progress in Molecular and Environmental Bioengineering—From Analysis and Modeling to Technology Applications, Aug. 2011, pp. 117-150.
Keskar et al., "In Vitro Evaluation of Macroporous Hydrogels to Facilitate Stem Cell Infiltration, Growth, and Mineralization", Tissue Engineering, Part A vol. 15, No. 7, 2009, pp. 1695-1707.
Wu et al., "Design and Preparation of Porous Polymers", Chem. Rev., 2012, 112, pp. 3959-4015.
Wu et al., "A novel organic-inorganic hybrid monolith for trypsin immobilization", Sci China Life Sci, Jan. 2011, vol. 54, No. 1, pp. 54-59.
Zhao et al., "Templating methods for preparation of porous structures", J. Mater. Chem., 2006, 16, pp. 637-648.
Zhang et al., "Gaseous infiltration method for preparation of three-dimensionally ordered macroporous polyethylene", Polymer, 49, 2008, pp. 5446-5451.
Zhang et al., "Inverted-Colloidal-Crystal Hydrohel Matrices as Three-Dimensional Cell Scaffolds", Adv. Funct. Mater., 2005, 15, No. 5, pp. 725-731.
Chung-li et al., "Studies on the preparation and characterisation of monodisperse polystyrene latices", Progr. Colloid & Polymer Sci., 60, 1976, pp. 163-175.
Huang et al., "A novel immobilized cobalt(II)/copper(II) bimetallic catalyst for atom transfer radical polymerization (ATRP) of methyl methacrylate", Applied Catalysis A: General, vol. 332, Issue 2, Nov. 20, 2007, pp. 192-199.

(56) References Cited

OTHER PUBLICATIONS

Nasser-Eddine et al., "Copper removal in atom transfer polymerization through electrodeposition", Macromol. Mater. Eng., 2004, 289, pp. 204-207.
Coullerez et al., "Understanding Copper-Based Atom-Transfer Radical Polymerization in Aqueous Media", The Journal of Physical Chemistry A, Sep. 2, 2004, vol. 108, No. 35, pp. 7129-7131.
Hong et al., "An Immobilized/Soluble Hybrid Catalyst System for Atom Transfer Radical Polymerization", Macromolecules, 2001, vol. 34, No. 15, pp. 5099-5102.
Matyjaszewski, Krzysztof, "Mechanistic Aspects of Atom Transfer Radical Polymerization", ACS Symp. Ser., 1998, Chapter 16, 685, pp. 258-283.
Matyjaszewski, Krzysztof, "Bulk Atom Transfer Radical Polymerization", ACS Symp. Ser., 1998, Chapter 6, 713, pp. 96-112.
Matyjaszewski et al. "The Preparation of Wel-Defined Water Soluble-Swellable (Co)Polymers by Atom Transfer Radical Polymerization", ACS Symp. Ser., 2000, Chapter 4, 765, pp. 52-71.
Matyjaszewski, Krzysztof, "Controlled Radical Polymerization: State of the Art in 2008", ACS Symp. Ser., 2009, Chapter 1, 1023, pp. 3-13.
Konkolewicz et al, "Tuning Polymer Properties through Competitive Processes", ACS Symp. Ser. 2012, 1100, pp. 145-170.
Hansch et al., "A Survey of Hammett Substituent Constants and Resonance and Field Parameters", Chem. Rev. 1991, 91, pp. 165-195.
Tsarevsky et al., ""Green" Atom Transfer Radical Polymerization: From Process Design to Preparation of Well-Defined Environmentally Friendly Polymeric Materials", Chem. Rev. 2007, 107, pp. 2270-2299.
Xia et al., "Controlled/"Living" Radical Polymerization Atom Transfer Radical Polymerization of Acrylates at Ambient Temperature", Macromolecules, 1998, 31, pp. 5958-5959.
Xia et al., "Controlled/"Living" Radical Polymerization. Atom Transfer Radical Polymerization Catalyzed by Copper(I) and Picolylamine Complexes", Macromolecules, 1999, 32, pp. 2434-2437.
Braunecker et al., "Origin of Activity in Cu-, Ru-, and Os-Mediated Radical Polymerization", Macromolecules, 2007, 40, pp. 8576-8585.
Seeliger et al., "Temperature Effect on Activation Rate Constants in ATRP: New Mechanistic Insights into the Activation Process", Macromolecules, 2009, 42, pp. 6050-6055.
Magenau et al. "ATRP of Methacrylates Utilizing Cu"X2/L and Copper Wire", Macromolecules, 2010, 43, pp. 9682-9689.
Kwak et al., "ARGET ATRP of Methyl Acrylate with Inexpensive Ligands and ppm Concentrations of Catalyst", Macromolecules, 2011, 44, pp. 811-819.
Zhang et al., "Copper-Mediated CRP of Methyl Acrylate in the Presence of Metallic Copper: Effect of Ligand Structure on Reaction Kinetics", Macromolecules, 2012, 45, pp. 78-86.
Morick et al., "Activation-Deactivation Equilibrium of Atom Transfer Radical Polymerization of Styrene up to High Pressure", Macromol. Chem. Phys., 2011, 212, pp. 2423-2428.
di Lena et al., "Transition metal catalysts for controlled radical polymerization", Progress in Polymer Science, 35, 2010, pp. 959-1021.

Pintauer et al., "Atom Transfer Radical Polymerization (ATRP) and Addition (ATRA) and Applications", Encyclopedia of Radicals in Chemistry, Biology and Materials, 2012, 4, 1851-1894.
Malkov et al., "Synthesis of New Chiral 2,2'-Bipyridyl-Type Ligands, Their Coordination to Molybdenum(0), Copper(II), and Palladium(II), and Application in Asymmetric Allylic Substitution, Allylic Oxidation, and Cyclopropanation", Organometallics, 2001, 20, pp. 673-690.
Montalti et al., "Luminescent Ruthenium(II) Bipyridyl-Phosphonic Acid Complexes: pH Dependent Photophysical Behavior and Quenching with Divalent Metal Ions", Inorg. Chem., 2000, 39, pp. 76-84.
Nitadori et al., "Enhanced Photocatalytic Activity of α-Methylstyrene Oligomerization through Effective Metal-to-Ligand Charge-Transfer Localization on the Bridging Ligand", Inorg. Chem., 2012, 51, pp. 51-62.
Pintauer et al., "Structural aspects of copper catalyzed atom transfer radical polymerization", Coordination Chemistry Reviews, 249, 2005, pp. 1155-1184.
Ding et al., "Atom Transfer Radical Polymerization of N,N-Dimethylacrylamide", Macromol. Rapid Commun., 2004, 25, pp. 632-636.
Kickelbick et al., "Structural comparison of Cu" complexes in atom transfer radical polymerization", New J. Chem., 2002, 26, pp. 462-468.
Magenau et al., "Highly Active Bipyridine-Based Ligands for Atom Transfer Radical Polymerization", ACS Macro Lett., 2012, 1, pp. 508-512.
Schröder et al., "Substituted Tris(2-pyridylmethyl)amine Ligands for Highly Active ATRP Catalysts", ACS Macro Lett., 2012, 1, 1037-1040.
Abreu et al., "Inorganic Sulfites: Efficient Reducing Agents and Supplemental Activators for Atom Transfer Radical Polymerization", ACS Macro Lett., 2012, 1, pp. 1308-1311.
Eckenhoff et al., "Structural characterization and investigation of iron(III) complexes with nitrogen and phosphorus based ligands in atom transfer radical addition (ATRA)", Inorganica Chimica Acta, 382, 2012, pp. 84-95.
Matyjaszewski et al., "Diminishing catalyst concentration in atom transfer radical polymerization with reducing agents", PNAS, Oct. 17, 2006, vol. 103, No. 42, pp. 15309-15314.
Jakubowski et al. "Activators Regenerated by Electron Transfer for Atom-Transfer Radical Polymerization of (Meth)acrylates and Related Block Copolymers", Angew. Chem., 2006, 118, pp. 4594-4598.
Yasuda, et al., "Stereospecific Polymerization of Acetaldehyde by $R_2AlOR'$ Catalyst," Journal of Polymer Science, vol. 11, 1973, pp. 1421-1434.
Poli, et al., "Iron-mediated reversible deactivation controlled radical polymerization," Progress in Polymer Science 39 (2014), pp. 1827-1845.
Saikia, et al., "Reverse Atom Transfer Radical Polymerization of Stearyl Methacrylate Using 2,2'-Azobisisobutyronitrile as the Initiator," Journal of Applied Polymer Science, vol. 85 (2002), pp. 1236-1245.

\* cited by examiner

Fig. 9A  FeL1Cl
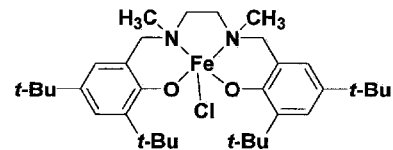
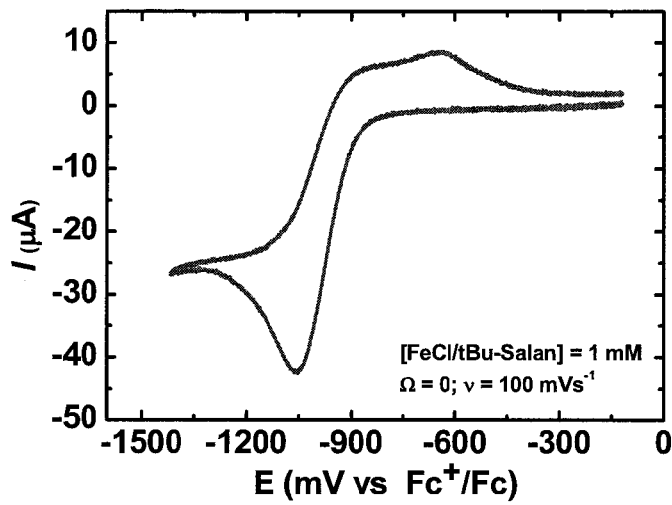
Fig. 9B  FeL2Cl
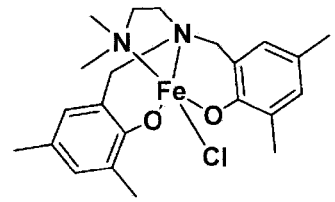
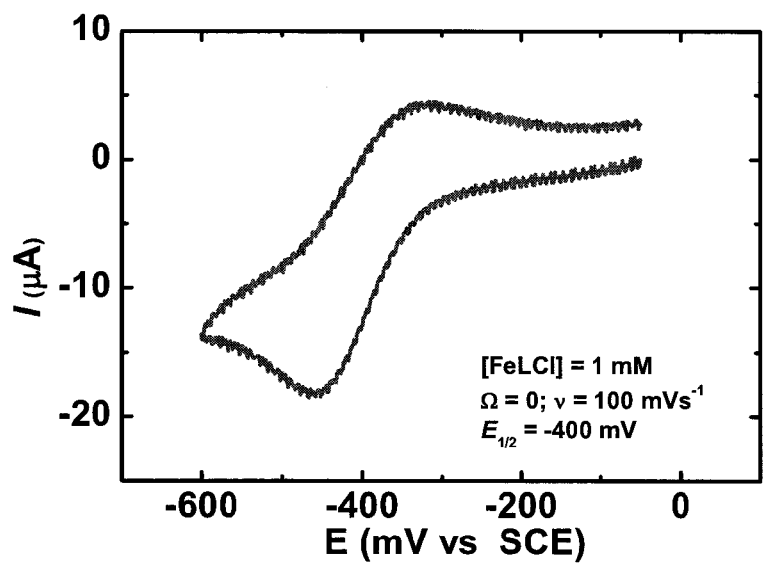

LIGANDS DESIGNED TO PROVIDE HIGHLY ACTIVE CATALYST COMPLEXES

CROSS REFERENCE TO RELATED APPLICATIONS

This application is a U.S. national stage of International Patent Application No. PCT/US13/27389 filed on Feb. 22, 2013, which claims priority U.S. Provisional Application No. 61/634,113, filed Feb. 23, 2012, the disclosure of which is incorporated in its entirety by this reference.

STATEMENT REGARDING FEDERALLY SPONSORED RESEARCH OR DEVELOPMENT

This invention was made with United States government support under NSF Contract Number CHE1026060, awarded by the National Science Foundation (NSF), United States. The United States government has certain rights in the invention.

TECHNICAL FIELD OF THE INVENTION

The present disclosure relates to the design of ligands that provide highly active catalyst systems comprising said ligands. The ligands comprise site specific electron donating substituents which greatly enhance the catalytic activity of the transition metal/ligand complex, including in atom transfer reactions and processes for polymerization of olefinic monomers using said catalyst systems at ppm levels. This application incorporates the text of two published papers based on the provisional application; Matyjaszewski et al.; ACS Macro Lett. 2012, 1, 508-512 and 1037-1040, each of which is hereby incorporated by reference.

BACKGROUND TO THE INVENTION

As disclosed herein the rational design of ligands provides a powerful tool to manipulate and improve transition metal catalyzed atom transfer radical polymerization (ATRP). ATRP is considered to be one of the most successful controlled radical polymerization processes with significant commercial potential for production of many specialty materials including coatings, sealants, adhesives, dispersants, materials for health and beauty products, electronics and biomedical applications. The process, including suitable transition metals and state of the art ligands, range of polymerizable monomers and materials prepared by the process, has been thoroughly described in a series of co-assigned U.S. Patents and Applications including U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314; 6,759,491; 6,790,919; 6,887,962; 7,019,082; 7,049,373; 7,064,166; 7,125,938; 7,157,530; 7,332,550; 7,572,874; 7,678,869; 7,795,355; 7,825,199; 7,893,173; 7,893,174, 8,252,880, 8,273,823; and 8,349,410 and U.S. patent application Ser. Nos. 10/548,354; 12/311,673; 12/921,296; 12/877,589; 12/949,466; 13/026,919; 13/260504 and 13/390,470 all of which are herein incorporated by reference. These prior art patents describe the range of (co) polymerizable monomers and procedure to control the topology, architecture and ability to incorporate site specific functionality into copolymers prepared by ATRP in addition to detailing a range of composite structures that can be prepared by "grafting from" or "grafting to" a broad range of organic or inorganic materials.

ATRP has also been discussed in numerous publications with Matyjaszewski as co-author and reviewed in several book chapters: Matyjaszewski, K. et al. ACS Symp. Ser. 1998, 685, 258-283; ACS Symp. Ser. 1998, 713, 96-112; ACS Symp. Ser. 2000, 729, 270-283; ACS Symp. Ser. 2000, 765, 52-71; ACS Symp. Ser. 2000, 768, 2-26; ACS Symposium Series 2003, 854, 2-9; ACS Symp. Ser. 2009, 1023, 3-13; ACS Symp. Ser. 2012, 1100, 145-170; Chem. Rev. 2001, 101, 2921-2990; Chem Rev 2007, 107, 2270-2299 and Prog. Polym. Sci., 2007, 32, 93-146. These publications are incorporated by reference to provide additional information on the range of suitable transition metals that can participate in the redox reaction, whose generally accepted mechanism is shown in Scheme 1, and provide a prior art list of suitable ligands for the different transition metals to form transition metal complexes suitable for polymerizing a broad range of radically polymerizable (co)monomers.

Scheme 1: General mechanism for the ATRP process

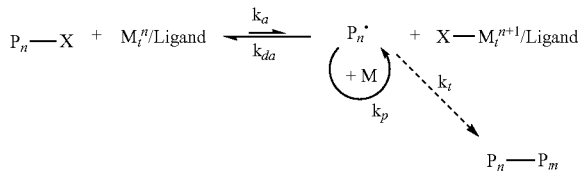

Any transition metal complex ($M_t^n/L$) capable of maintaining the dynamic equilibrium through participation in a redox reaction comprising the transferable atom or group present on each initiator or dormant polymer chain ($P_n$-X) to form an active radical ($P_n^*$) and higher oxidation state transition metal complex (X-$Mt_n^{+1}$/L) that acts as the deactivator, may be used as the catalyst in ATRP. The creation and maintenance of a low concentration of active species, ($P_n^\bullet$), reduces the probability of bimolecular termination reactions, ($k_t$), which leads to a radical polymerization process that behaves as a "living" system through retention of the stable transferable atom or group (—X) on the vast majority of growing dormant chain ends. The most frequently used ATRP procedure is based on a simple reversible halogen atom transfer catalyzed by redox active transition metal compounds, most frequently copper or iron, that form a catalyst complex with a ligand, most frequently nitrogen based ligands that modify the solubility and activity of the catalyst. The rate of the polymerization, $K_{ATRP}$, is defined by the ratio of activation ($k_a$) and deactivation ($k_d$) rate constants and the catalyst complex should be selected to favor the dormant state ensuring concurrent growth of each polymer chain and minimizing the [$P_n^\bullet$], Scheme 1. In this equilibrium, $P_n^\bullet$ can deactivate by reaction with X—$Cu^{II}/L$, propagate with monomer ($k_p$), or terminate ($k_t$) with other radicals proportional to their corresponding rate constants. The ATRP equilibrium is also heavily dependent on four main reaction process variables: temperature, [Macromolecules 2009, 42, 6050-6055] pressure, [Macromol. Chem. Phys. 2011, 212, 2423-2428.] solvent, [Macromolecules 2009, 42, 6348-6360.] and selected alkyl halide/catalyst. [J. Am. Chem. Soc. 2008, 130, 10702-10713]. Of these four variables, the strongest influences reside with the polymerization solvent and catalyst, each spanning values over a range of $1 \times 10^8$. The procedure is a simple procedure which may be carried out in bulk, in the presence of organic solvents or in water, under homogeneous or heterogeneous conditions, in ionic liquids, and in supercritical $CO_2$.

Early ATRP procedures employed catalyst complexes that are now recognized to be low activity [*J. Am. Chem. Soc.* 2008, 130, 10702-10713], and required addition of a sufficiently high concentration of the transition metal complex to overcome the effect of unavoidable increased concentration of the deactivator in the reaction medium due to radical-radical termination reactions while still driving the reaction to the desired degree of polymerization in a reasonable time frame while retaining chain end functionality. Recently novel approaches were developed that allowed regeneration of the lower oxidation state transition metal complex resulting in a significant reduction in the concentration of added catalyst. [PCT Int. Appl. WO 2005/087819] The driving force for this advance was the economic penalty associated with purification procedures, resulting from early procedures with less active catalyst complexes resulting in high concentrations of catalyst in the final product, coupled with a deeper understanding of the ATRP rate law, equation (1), which shows that $R_p$, the polymerization rate, depends only on the ratio of the concentration of [$Cu^I$] to [$X—Cu^{II}$], and does NOT depend on the absolute concentration of the copper complexes, therefore in principle, one could reduce the absolute amount of copper complex to ppm levels without affecting the polymerization rate.

$$R_p = k_p[M][P^*] = k_p[M]K_{eq}[I]_o \frac{[Cu^I]}{[X - Cu^{II}]} \quad (1)$$

As discussed in the above incorporated references, ATRP is one of the most powerful controlled/living radical polymerization (CLRP) techniques available for the synthesis of well-defined macromolecules under versatile, industrially scalable, experimental conditions. With such a technique the synthetic polymer chemist may precisely design macromolecular architectures with predetermined molecular weights ($M_n$) and narrow molecular weight distributions ($M_w/M_n$). ATRP's utility encompasses a vast library of functional monomers, from radically copolymerizable (methyl)acrylates to styrenics and acrylamides, that can be conducted in a range of solvents (i.e. aqueous to organic), generating products with multiple potential macromolecular architectures (e.g. stars and brushes), in a range of reaction media (e.g. dispersions, emulsions, and homogenous systems).

Despite these successes, a need exists to further improve the efficiency and versatility of ATRP through optimization and development of novel catalysts [*Prog. Polym. Sci.* 2010, 35, 959-1021]. As described herein, the development of more active catalyst complexes may also provide an opportunity to reduce the concentration of catalyst required to drive the reaction to completion, allow one to run the reaction under milder conditions in aqueous solutions [*Macromolecules* 2012, 45, 6371-6379], and expand the scope of radically copolymerizable monomers to include less active monomers such as N-vinylpyrolidone, vinyl acetate and acid containing monomers such as (meth)acrylic acid. Likewise it may also expand the rage of molecules that can participate in atom transfer radical addition (ATRA) reactions and atom transfer radical coupling (ATRC) reactions [*Encycl. Radicals Chem., Biol. Mater.* 2012, 4, 1851-1894 sections 1.2 and 8.2].

The preparation of transition metal catalyst complexes provides a certain degree of synthetic freedom in ligand design that can manipulate and tune catalytic properties. However, as disclosed herein, the scope of designed catalyst complexes had not yet been truly exploited in ATRP. Prior to the present disclosure some of the most commonly employed and effective ligands in ATRP were tris(2-(dimethylamino)ethyl)amine (Me$_6$TREN) [*Macromolecules* 1998, 31, 5958-5959] and tris(2-pyridylmethyl)amine (TPMA) [*Macromolecules* 1999, 32, 2434-2437], each of which are a thousand times more active than the originally used copper based catalyst complex utilizing 2,2'-bipyridine (bpy) ligands [*J. Am. Chem. Soc.* 1995, 117, 5614-15 and *Macromolecules* 1995, 28, 7901-10.].

A variety of strategies exist to manipulate catalytic activity and properties through ligand design. Indeed ligand modifications are prevalent with bpy type ligands, the class of ligands first successfully employed in copper-mediated ATRP, to provide unique properties for complexes used in asymmetric catalysis such as use of chiral 2,2'-bipyridyl ligands coordinated to Mo, Cu and Pd for allylic oxidation, [*Organometallics* 2001, 20, 673-690] luminescence and pH sensitivity, [*Inorg. Chem.* 2000, 39, 76-84] and enhanced photocatalytic activity for Ru based catalysts. [*Inorg. Chem.* 2012, 51, 51-62]. However, despite the vast array of modifications available to these bpy ligands, limited examples [*J. Am. Chem. Soc.* 2008, 130, 10702-10713] of structure-reactivity relationships exist with regard to substituents present in ligands for copper or iron based catalyst complexes suitable for an ATRP.

BRIEF DESCRIPTION

The present disclosure describes ligands for forming catalyst complexes suitable for use in atom transfer radical addition, atom transfer radical coupling and controlled radical polymerization reaction processes.

According to a first embodiment, the present disclosure provides a catalyst complex for a redox-based atom transfer radical addition reaction, an atom transfer radical coupling reaction or a controlled radical polymerization reaction, the catalyst comprising a transition metal and a ligand comprising 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents.

In other embodiments, the present disclosure provides a ligand for forming a transition metal catalyst capable of catalyzing a redox-based atom transfer radial addition reaction, an atom transfer radical coupling reaction, or a controlled radical polymerization reaction, the ligand comprising from 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents, wherein the ligand forms a ligand/metal catalyst complex with the transition metal.

Still other embodiments of the present disclosure provide a system for conducting a controlled radical polymerization reaction comprising radically (co)polymerizable monomers, an initiator comprising one or more radically transferable atoms or groups, less than or equal to 500 ppm of a catalyst complex and optionally, a solvent. The catalyst complex comprises a transition metal, and a ligand comprising 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents. In other embodiments, the system may comprise less than or equal to 250 ppm, less than or equal to 100 ppm, less than or equal to 50 ppm or even less than or equal to 10 ppm of the catalyst complex.

Further embodiments of the present disclosure provide a transition metal mediated controlled polymerization process comprising polymerizing radically (co)polymerizable monomer(s) in the presence of an initiator comprising one or more radically transferable atoms or groups, less than 500 ppm of a catalyst complex, and optionally, a solvent. The catalyst complex comprises a transition metal and a ligand comprising 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents. In other embodiments, the system may comprise less than or equal to 250 ppm, less than or equal to 100 ppm, less than or equal to 50 ppm or even less than or equal to 10 ppm of the catalyst complex.

DESCRIPTION OF THE DRAWINGS

The various embodiments of the present disclosure may be better understood when read in conjunction with the following Figures in which:

FIG. 1.

FIG. 2.

FIG. 3: Shows the electrochemical characterization of the Cu/TPMA*-3 catalyst.

FIG. 6. Kinetic plots for of ICAR runs with: 10 ppm, 20 ppm, 50 ppm and 100 ppm Cu/TPMA*-3 catalyst.

FIG. 7.

FIG. 8.

FIG. 9. FIGS. 9A and 9B show CVs conducted vs Fc$^I$/Fc after conversion vs SCE for [FeL1Cl] (FIG. 9A) and [FeL2Cl] (FIG. 9B); conditions: T=25° C., MeCN, [FeL2Cl]=[1 mM]; Electrolyte: [TBAPF6]=0.1M, RE: Ag/AgI, WE: Pt 1, CE: Pt mesh.

DETAILED DESCRIPTION

Figure 1A:
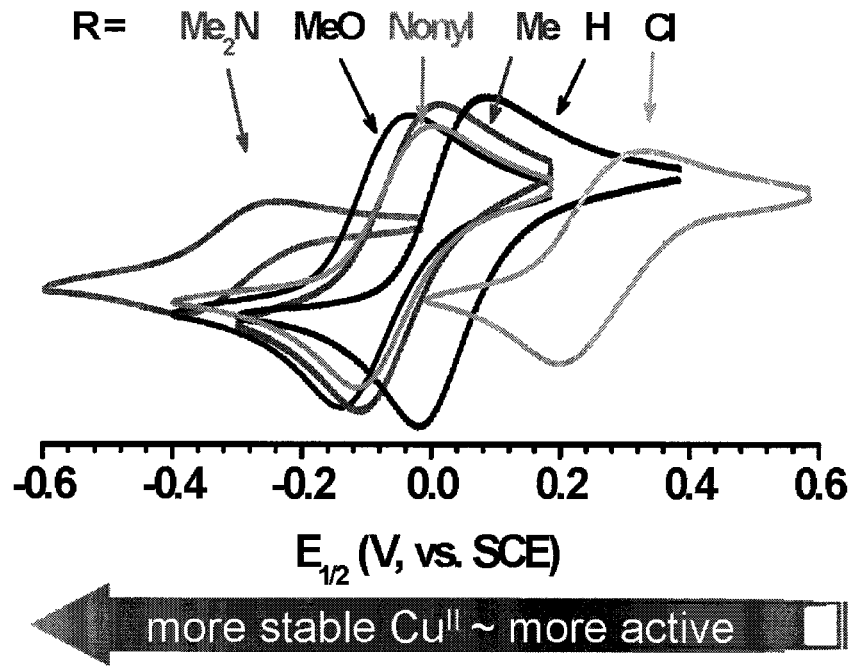
FIG. 1A illustrates CVs of copper complexes formed with substituted bpy ligands.

The present disclosure provides new ligands for transition metal mediated redox-based atom transfer radical addition reactions (ATRA), atom transfer radical coupling reactions (ATRC), and controlled radical polymerization reactions, such as those based on Atom Transfer Radical Polymerization (ATRP) processes. The ligands have a structure comprising 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents. The ligands may form complexes with a transition metal to form a transition metal catalyst complex for catalyzing the reaction process. The catalyst complexes are significantly more reactive that conventional transition metal catalyst complexes utilized in these reaction processes, allowing for the use of lower catalyst concentrations while maintaining or improving reaction product characteristics, such as polydispersity.

Cyclic voltammetry (CV) has been used for over a decade as an analytical tool to study the redox behavior of numerous transition metal complexes used in an ATRP. One of the earliest studies [Macromol. Chem. Phys. 2000, 201, 1625-1631] determined that the half-sum of the oxidation and reduction peak, the $E_{1/2}$ value, of the formed transition metal complex strongly depends on the nature of the ligand and the halogen and the measured value provided an estimate for the activity of the catalyst complex (as described herein, the $Cu^I L/Cu^{II} L$ redox couple) in an ATRP, and that this value strongly depends on the nature of the ligand (L) and the halogen. The general trend agreed with the kinetic features of ATRP catalyzed by the corresponding transition metal complex, and a correlation between the measured redox potential and the apparent equilibrium constant of ATRP was observed. The more negative the redox potential of the complex, as measured by CV, the faster the polymerization indicating that, in most cases, the catalytic activity of the transition metal complexes in an ATRP can be predicted from the redox potential of the transition metal complex. Two more recent studies by the primary author, K. Matyjaszewski, on a broader spectrum of transition metal/ligand complexes in a number of different solvents confirmed the conclusion that excellent correlation existed between the equilibrium constants with the $Cu^{II}/Cu^I$ redox potential and the carbon-halogen bond dissociation energies. [Matyjaszewski; et al. Macromolecules 2007, 40, 8576-8585 and J. Am. Chem. Soc. 2008, 130, 10702-10713].

As used herein, the word "control" and/or "controlled" means that in the polymerization process conditions are defined whereby the contributions of the chain breaking processes are insignificant compared to chain propagation, so that polymers with predeterminable molecular weights, low polydispersity and levels of high site specific functionalities are achievable.

As used herein, "polymer" refers to a macromolecule formed by the chemical union of monomers, typically five or more monomers units. The term polymer includes homopolymers and copolymers; including random copolymers, statistical copolymers, alternating copolymers, gradient copolymers, periodic copolymers, telechelic polymers and polymers of any topology including linear polymers, block copolymers, graft polymers, star polymers, bottle-brush copolymers, comb polymers, branched or hyperbranched polymers, and such polymers tethered to particle surfaces or flat surfaces as well as other natural or synthetic polymer structures.

It must be noted that, as used in this specification and the appended claims, the singular forms "a," "and," and "the" include plural referents unless the context clearly dictates otherwise. Thus, for example, reference to "a polymer" includes more than one polymer.

When a word comprises parentheses, such as substituent(s) or (co)polymer, the word can mean either the singular or plural or describe a polymer or copolymer.

When a compound is encapsulated in a square bracket, e.g. [$Cu^{II}$] this signified the concentration of the encapsulated compound; in the case of [$Cu^{II}$] it means the concentration of the higher oxidation state cupric complex.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

It is to be understood that this invention is not limited to specific compositions, components or process steps disclosed herein, as such may vary, as exemplified n incorporated references. It is also to be understood that the terminology used herein is for the purpose of describing particular embodiments only, and is not intended to be limiting.

According to various embodiments, the present disclosure provides for a catalyst complex for a redox-based atom transfer radical addition reaction, an atom transfer radical coupling reaction or a controlled radical polymerization reaction, the catalyst comprising: a transition metal; and a ligand comprising from 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents, wherein the ligand forms a ligand/metal catalyst complex with the transition metal.

In certain embodiments, the one or more electron donating substituents may be located on a ring atom in the ligand where the ring atom is meta- or para- to the anionic heteroatomic donor substituent or the nitrogen of the heteroaromatic ring. For example, in those embodiments comprising a nitrogen containing heteroaromatic ring, such as a pyridine ring, the one or more electron donating substituents may be located on a ring atom on the pyridine that is meta- or para- to the nitrogen of the pyridine ring. Alternatively, in those embodiments comprising an anionic heteroatomic donor substituent, the one or more electron donating substituents may be located on a ring atom on the pyridine that is meta- or para- to the anionic heteroatomic donor substituent attached to the ring.

In specific embodiments, the heteroatom containing groups may comprise an anionic heteroatomic donor substituent, where the anionic the anionic heteroatomic donor substituent is selected from —$O^-$, —$S^-$, —$CO_2^-$, —$SO_3^-$, —$NR''^-$, where R'' is —H or ($C_1$-$C_6$)alkyl. In specific embodiments, the anionic heteroatomic donor substituent is selected from —$O^-$. It will be understood by one of skill in the art that the anionic heteroatomic donor substituent may be in the anionic form or in the protonated nonionic form, on the conditions, such as the pH of the solution or whether the ligand is complexed to a transition metal.

According to various embodiments, the one or more electron donating substituents may be independently selected from straight chain ($C_1$-$C_{20}$)alkyl, branched ($C_1$-$C_{20}$)alkyl, —$NR_2$, hydroxylamine, hydrazine, —N(R)C(=O)R, —NHC(=O)$NR_2$, —OR, —OC(=O)R, —OC(=O)OR, —$CH_2$CH(OR)$CH_3$, —$CH_2NR_2$, —NHC(=O)OR, —OC(=O)$NR_2$, —$CH_2Si(CH_3)_3$, —$OCH_2CH_2OR$, or —$NHCH_2SO_3R$, where R is selected from —H, straight chain ($C_1$-$C_{20}$)alkyl, or branched ($C_1$-$C_{20}$)alkyl. In specific embodiments, the one or more electron donating substituents may be independently selected from straight chain ($C_1$-$C_{20}$)alkyl, branched ($C_1$-$C_{20}$)alkyl, —$NR_2$, and —OR. According to various embodiments, the one or more electron donating substituents may exhibit a negative Hammett substitution constant for the ligand, as described herein.

The ligand of the various embodiments of the catalyst complex where the ligand comprises at least one nitrogen containing heteroaromatic ring, the ligand may comprise a base structure selected from N-(alkyl)pyridylmethanimine, 2,2'-bipyridine, N',N'''-dimethyl-N',N'''-bis(pyridine-2-yl)methyl)ethane-1,2-diamine, 2,2':6',2''-terpyridine, N,N,N',N'-tetra[(2-pyridyl)methyl]ethylenediamine, tris(2-pyridylmethyl)amine, bis[2-(4-methoxy-3,5-dimethyl)pyridylmethyl]octadecylamine, N,N'-bis(pyridine-2-ylmethyl-3-hexoxo-3-oxopropyl)ethane-1,2-diamine, or bis(2-quinolylmethyl)pyridyl-2-methylamine, wherein at least one pyridine ring comprises one or more electron donating substituents in a position meta- or para- to the pyridine nitrogen atom. According to other embodiments of the catalyst complex where the ligand comprises at least one anionic heteroatomic donor substituent, the ligand may comprise a base structure comprising a phenol, a thiophenol, a benzene carboxylic acid, a benzene sulfonic acid, and an aniline, where the ring may further comprise one or more electron donating substituents in a position meta- or para- to the donor substituent group.

The ligands described according to the various embodiments of the present disclosure may have a structure:

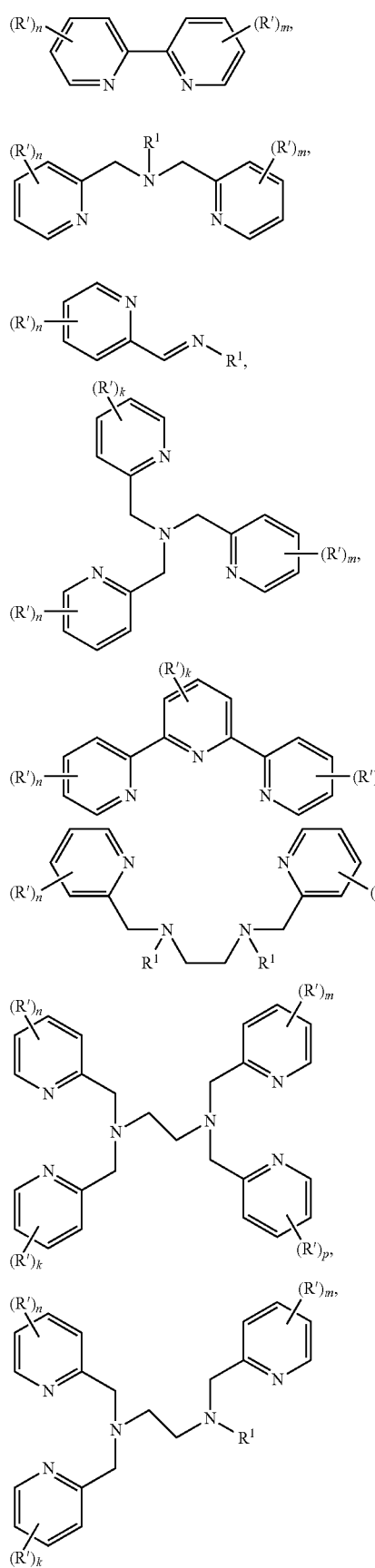
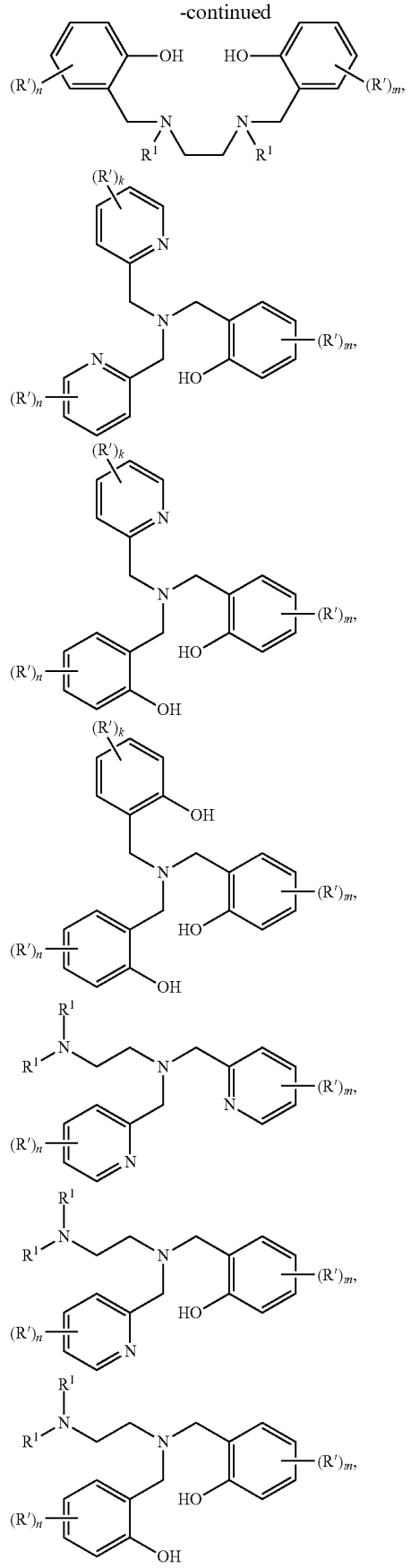

-continued

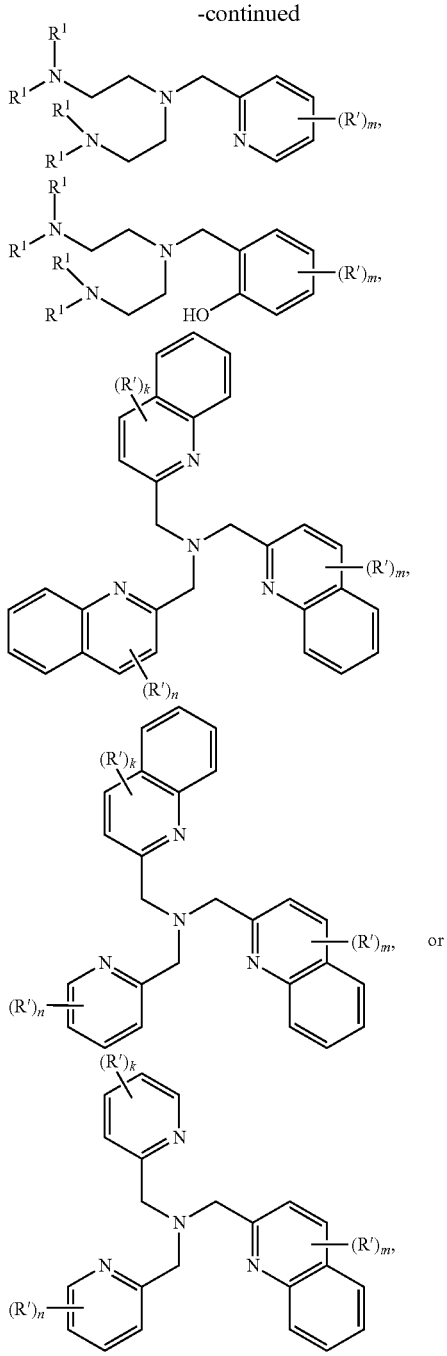

wherein each R' may be independently an electron donating substituent selected from straight chain $(C_1-C_{20})$alkyl, branched $(C_1-C_{20})$alkyl, $-NR_2$, hydroxylamine, hydrazine, $-N(R)C(=O)R$, $-NHC(=O)NR_2$, $-OR$, $-OC(=O)R$, $-OC(=O)OR$, $-CH_2CH(OR)CH_3$, $-CH_2NR_2$, $-NHC(=O)OR$, $-OC(=O)NR_2$, $-CH_2Si(CH_3)_3$, $-OCH_2CH_2OR$, or $-NHCH_2SO_3R$; where each R may independently be selected from $-H$, straight chain $(C_1-C_{20})$ alkyl, or branched $(C_1-C_{20})$alkyl; each $R^1$ may independently be selected from $-H$, straight chain $(C_1-C_{20})$alkyl, or branched $(C_1-C_{20})$alkyl; and k, m, n and p are each independently an integer from 0 to 3 provided that at least one of k, m, n, and p is not zero.

In specific embodiments, the catalyst complex described herein may comprise one or more ligand having a structure selected from (4-methoxy-3,5-dimethyl-pyridin-2-ylmethyl)-bis(pyridin-2-ylmethyl)-amine (TPMA*-1), bis(4-methoxy-3,5-dimethyl-pyridin-2-ylmethyl)-pyridin-2-ylmethyl-amine (TPMA*-2), tris[(4-methoxy-3,5-dimethyl)-pyrid-2-ylmethyl]amine (TPMA*-3), (4-methoxy-pyridin-2-ylmethyl)-bis(pyridin-2-ylmethyl)-amine (TPMA-OMe), bis(4-methoxy-pyridin-2-ylmethyl)-pyridin-2-ylmethyl-amine (TPMA-OMe-2), tris((4-methoxy)-pyridin-2-yl)methy)l-amine (TPMA-OMe-3), (4-(N,N-dimethylamino)-pyridin-2-ylmethyl)-bis(pyridin-2-ylmethyl)-amine (TPMA-NMe$_2$), bis(4-(N,N-dimethylamino)-pyridin-2-ylmethyl)-pyridin-2-ylmethyl-amine (TPMA-NMe$_2$-2), tris(4-(N,N-dimethylamino)-pyridin-2-yl)methyl)-amine (TPMA-NMe$_2$-3), bis((4-methoxy-3,5-dimethyl)-pyrid-2-ylmethyl)-octadecylamine (BPMODA*), N,N'-bis((4-methoxy-3,5-dimethyl)-pyrid-2-yl)methyl-octadecyl)ethylenediamine (BPED*-OD), N,N,N',N'-tetra[(4-methoxy-3,5-dimethyl)-pyrid-2-yl)methyl]ethylenediamine (TPEN*), N-methyl-N,N',N'-tris[(4-methoxy-3,5-dimethyl)-pyrid-2-yl)methyl]ethylenediamine (TPMEN*), N,N-dimethyl-N',N'-bis(2-hydroxy-3,5-dimethylbenzyl)ethylenediamine, 2,4-dimethyl-6-bis(2-(diethylamino)-ethyl)aminomethylphenol, and tris(2-quinolinylmethyl)amine (TQMA).

According to other embodiments, the catalyst complex described herein may comprise a bipyridine (bpy) ligand comprising a straight chain $(C_1-C_{20})$alkyl, a branched $(C_1-C_{20})$alkyl, an alkoxy group, or an N,N-dialkylamino group at a position para- to or meta- to one or both of the bipyridine nitrogen atoms. For example, one or both of the pyridine rings in the bipyridine ligand may comprise one or more alkyl groups, alkoxy groups or amino group in the positions meta- and para- to the pyridine nitrogen atoms. In one specific embodiment, the catalyst may comprise a ligand having a bipyridine group having N,N-dimethylamino groups in the positions para to each pyridine nitrogen atom.

According to other embodiments of the catalyst complexes, the ligand may further comprise one or more electron withdrawing groups on one or more of the aromatic ring or the heteroaromatic ring of the ligand. Non-limiting examples of electron withdrawing groups include, for example, halogens, such as $-F$, $-Cl$, $-Br$, nitro ($-NO_2$), carboxylic ester ($-C(=O)OR^1$), or amide ($-C(=O)NR^1{}_2$). In certain embodiments, electron withdrawing groups positioned on the ligand may help to tune the reactivity of the catalyst complex. For example, in embodiments where the ligand described herein may be too reactive for the reaction or polymerization system, the inventors have discovered that the catalytic activity may be tuned by modifying the ligand with one or more electron withdrawing groups.

According to various embodiments of the catalyst complexes described herein, the catalyst complex may comprise a transition metal selected from any of the transition metals in the columns 3-12 of the periodic table. In specific embodiments, the transition metal may be Cu, Fe, Mo, Mn, Cr, Co, and Ru. In specific embodiments, the transition metal may be Cu or Fe. The transition metal may be in various oxidation states and may be added to the reaction medium as a salt and oxidized or reduced as necessary to form the active metal complex. For example, in one embodiment the transition metal may be Cu and may be added to the reaction in one of the Cu(0), Cu(I) or Cu(II) oxidation state. In another embodiment, the transition metal may be Fe and may be added to the reaction in one of the Fe(0), Fe(I), Fe(II), Fe(III) or Fe(IV) oxidation state. According to various embodiments, the transition metal may be able to form a catalyst complex with one or more of the ligand molecules.

For example, depending on the number of complexing atoms on the ligand, the catalyst complex may comprise one, two, three or more ligand molecules complexed to the transition metal. In specific embodiments, the catalyst complex may comprise a transition metal complexed to one or two ligands.

In specific embodiments, the catalyst complex may catalyze a controlled radical polymerization reaction process. Examples of controlled radical polymerization processes that may be catalyzed by the catalyst complexes described herein include, conventional Atom Transfer Radical Polymerization (ATRP) processes, reverse ATRP processes, simultaneous reverse and normal initiation (SR&NI) ATRP, initiators for continuous activator regeneration (ICAR) ATRP, reversible addition fragmentation chain transfer (RAFT) polymerization, supplemental activator and reducing agent (SARA) ATRP, electrochemical ATRP (e-ATRP), activator generation by electron transfer (AGET) ATRP, or activator regenerated by electron transfer (ARGET) ATRP.

According to various embodiments, the catalyst complexes described herein may have a high catalytic activity, due to the presence of the one or more electron donating substituent on the ligand of the catalyst complex. For example, in certain embodiments, the catalyst activity of the complexes described herein may be greater than or equal to 100 times the activity of a catalyst complex comprising a transition metal and a ligand where the ligand comprises an aromatic ring or heteroaromatic ring that does not comprise an electron donating substituent. Because the catalyst complex is more reactive that conventional catalyst complexes, significantly reduced catalyst amounts are necessary for effective catalysis of reaction processes described herein. For example, for ATRP polymerization processes, the catalyst complex concentrations may be reduced to less than 500 ppm, in certain embodiments less than or equal to 250 ppm, less than or equal to 100 ppm, less than or equal to 50 ppm or even less than or equal to 10 ppm, relative to other reaction components. Reduced catalyst complex may result in easier and more economic purification protocols and less expensive reaction processes, compared to reaction processes with less reactive conventional catalyst complexes.

According to various embodiments, the catalyst complex may comprise a ligand that is compatible with various reaction environments. For example, in certain embodiments, the ligand may be designed or selected so that the catalyst complex is at least partially soluble in a liquid reaction medium. For example, the liquid reaction medium may be a bulk medium (i.e., where the monomer/reactants comprise the solvent), a hydrophilic liquid reaction medium, or a hydrophobic liquid reaction medium. In specific embodiments, the liquid reaction medium may be a hydrophilic reaction medium, such as an aqueous reaction medium. In other embodiments, the liquid reaction medium may be a hydrophobic reaction medium, such as an organic solvent medium. In specific embodiments, the liquid reaction medium may be a biphasic liquid reaction medium, for example an emulsion, a miniemulsion, a nanoemulsion or a microemulsion, where the medium comprises a hydrophobic liquid phase and a hydrophilic liquid phase. According to these embodiments, the ligand may be designed or selected so that the catalyst complex may be at least partially soluble in a dispersed hydrophilic phase or in the dispersed hydrophobic phase of the biphasic reaction. According to various embodiments, the catalyst may selectively partition into one of the hydrophobic phase and hydrophilic phase according to, for example, the ligand structure, the transition metal oxidation state, etc.

According to other embodiments, the present disclosure provides a ligand for forming a transition metal catalyst capable of catalyzing a redox-based atom transfer radial addition reaction, an atom transfer radical coupling reaction, or a controlled radical polymerization reaction, the ligand comprising 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents, wherein the ligand has a structure selected from

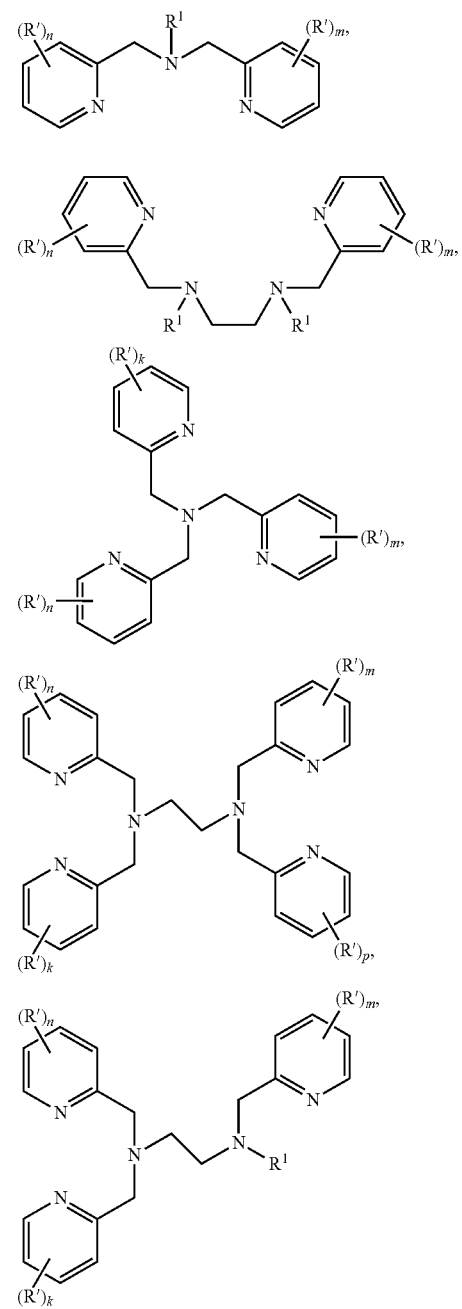

-continued

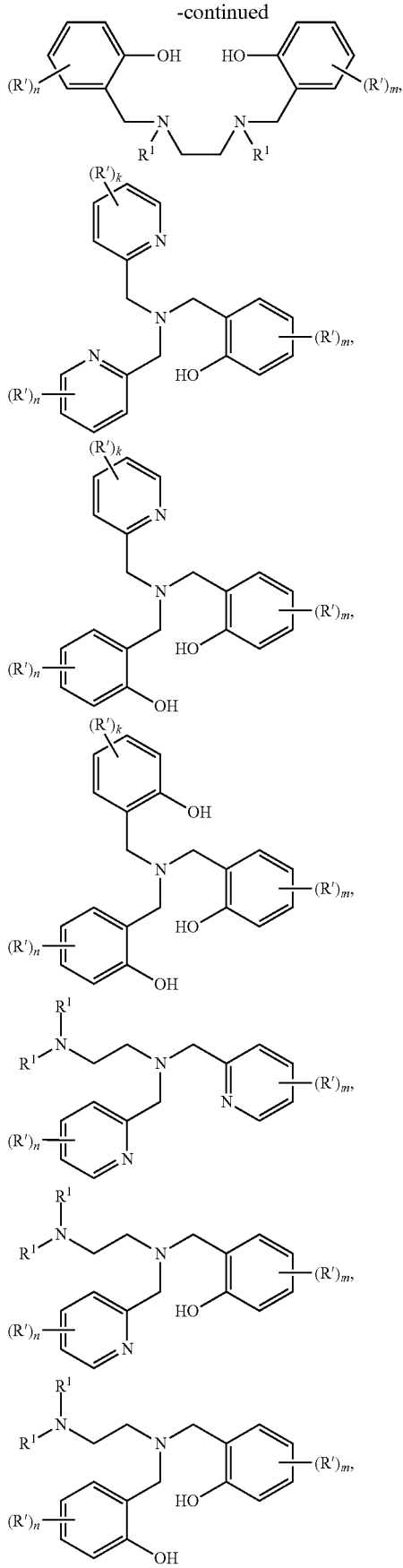

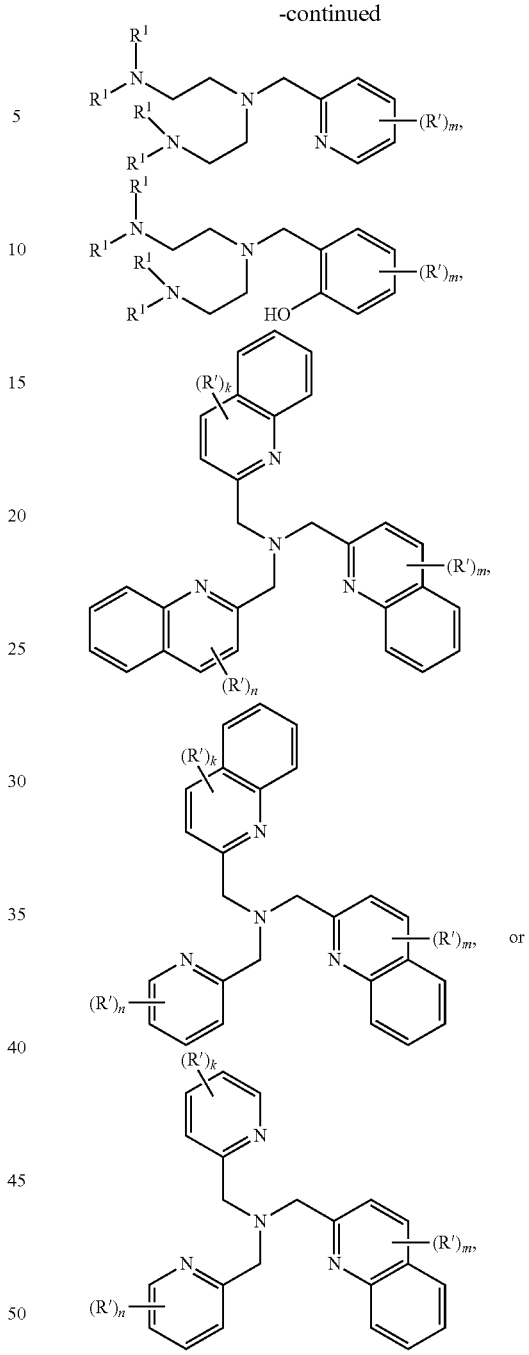

wherein each R' may be independently an electron donating substituent selected from straight chain $(C_1\text{-}C_{20})$alkyl, branched $(C_1\text{-}C_{20})$alkyl, —$NR_2$, hydroxylamine, hydrazine, —N(R)C(=O)R, —NHC(=O)$NR_2$, —OR, —OC(=O)R, —OC(=O)OR, —$CH_2$CH(OR)$CH_3$, —$CH_2NR_2$, —NHC(=O)OR, —OC(=O)$NR_2$, —$CH_2$Si$(CH_3)_3$, —$OCH_2CH_2OR$, or —$NHCH_2SO_3R$; where each R may be independently selected from —H, straight chain $(C_1\text{-}C_{20})$alkyl, or branched $(C_1\text{-}C_{20})$alkyl; each $R^1$ is independently selected from —H, straight chain $(C_1\text{-}C_{20})$alkyl, or branched $(C_1\text{-}C_{20})$alkyl; and k, m, n and p are each independently an integer from 0 to 3 provided that at least one of k, m, n, and p is not zero.

According to specific embodiments, the ligand may have a structure selected from the group consisting of (4-methoxy-3,5-dimethyl-pyridin-2-ylmethyl)-bis(pyridin-2-ylmethyl)-amine (TPMA*-1), bis(4-methoxy-3,5-dimethyl-pyridin-2-ylmethyl)-pyridin-2-ylmethyl-amine (TPMA*-2), tris[(4-methoxy-3,5-dimethyl)-pyrid-2-ylmethyl]amine (TPMA*-3), (4-methoxy-pyridin-2-ylmethyl)-bis(pyridin-2-ylmethyl)-amine (TPMA-OMe), bis(4-methoxy-pyridin-2-ylmethyl)-pyridin-2-ylmethyl-amine (TPMA-OMe-2), tris((4-methoxy)-pyridin-2-yl)methyl]-amine (TPMA-OMe-3), (4-(N,N-dimethylamino)-pyridin-2-ylmethyl)-bis(pyridin-2-ylmethyl)-amine (TPMA-NMe$_2$), bis(4-(N,N-dimethylamino)-pyridin-2-ylmethyl)-pyridin-2-ylmethyl-amine (TPMA-NMe$_2$-2), tris(4-(N,N-dimethylamino)-pyridin-2-yl)methyl)-amine (TPMA-NMe$_2$-3), bis((4-methoxy-3,5-dimethyl)-pyrid-2-ylmethyl)-octadecylamine (BPMODA*), N,N'-bis((4-methoxy-3,5-dimethyl)-pyrid-2-yl)methyl-octadecyl)ethylene diamine (BPED*-OD), N,N,N',N'-tetra[(4-methoxy-3,5-dimethyl)-pyrid-2-yl)methyl]ethylenediamine (TPEN*), N-methyl-N,N',N'-tris[(4-methoxy-3,5-dimethyl)-pyrid-2-yl)methyl]ethylenediamine (TPMEN*), N,N-dimethyl-N',N'-bis(2-hydroxy-3,5-dimethylbenzyl)ethylenediamine, 2,4-dimethyl-6-bis(2-(diethylamino)-ethyl)amino methylphenol, and tris(2-quinolinylmethyl)amine (TQMA). In various embodiments of the ligands described herein, the ligand may further comprise one or more electron withdrawing groups on one or more of the aromatic ring or heteroaromatic ring, such as an electron withdrawing group selected from —F, —Cl, —Br, —NO$_2$, —C(=O)OR$^1$, or —C(=O)NR$^1_2$, where R$^1$ is as defined herein.

Still further embodiments of the present disclosure provide for a system for conducting a controlled radical polymerization reaction. According to certain embodiments, the system may comprise a) radically (co)polymerizable monomer(s); b) an initiator comprising one or more radically transferable atoms or groups; c) less than or equal to 500 ppm of a catalyst complex; and d) optionally, a solvent. According to certain these embodiments, the catalyst complex may have a structure according to any of the various catalyst complexes described herein. For example, the catalyst complex may comprise a transition metal; and a ligand comprising 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents, such as described herein. In certain embodiments, the system may comprise reduced amounts of the catalyst complex, such as less than or equal to 500 ppm, compared to conventional systems for conducting a controlled radical polymerization reaction. In specific embodiments, the system may comprise less than or equal to 100 ppm of the catalyst complex, or in certain embodiments, less than or equal to 50 ppm, or even less than or equal to 10 ppm of the catalyst complex.

The transition metal utilized in the catalyst complex in the system may be any of the transition metals described herein as useful in catalyst complexes and, in certain embodiments, may be Cu or Fe. The ligand utilized in the catalyst complex in the system may be any of the ligands having one or more electron donating substituents according to the various embodiments described in detail herein.

According to the various embodiments of the system, the radically (co)polymerizable monomers may be any monomer suitable for or reactive in a controlled radical polymerization as are known in the art. In specific embodiments, the monomers may comprise vinyl monomers, (meth)acrylate based monomers, and/or styrenyl monomers, such as but not limited to styrene, methyl acrylate (MA), methyl methacrylate (MMA), ethyl acrylate, ethyl methacrylate, n-butyl acrylate (nBA), butyl methacrylate (BMA), N-vinylpyrrolidone, etc. According to the various embodiments of the system, the initiator comprising one or more radically transferable atoms or groups may comprise ATRP initiators and macroinitiators known in the art, including but not limited to initiators and macroinitiators having one or more halogen atoms, such as one or more Cl or Br. One of skill in the art would recognize that a variety of (co)monomers and ATRP-type initiators may be suited and are incorporated herein.

According to various embodiments, the system for conducting a controlled radical polymerization reaction may be a system for conducting an atom transfer radical polymerization, such as a conventional ATRP, a reverse ATRP, an SR&NI ATRP, an ICAR ATRP, a RAFT polymerization, a SARA ATRP, an e-ATRP, an AGET ATRP or an ARGET ATRP.

Still other embodiments of the present disclosure provide for a process for conducting a transition metal mediated controlled radical polymerization process. According to these embodiments, the process may comprise polymerizing radically (co)polymerizable monomer(s) in the presence of an initiator comprising one or more radically transferable atoms or groups, less than 500 ppm of a catalyst complex, and optionally, a solvent. According to certain these embodiments, the catalyst complex may have a structure according to any of the various catalyst complexes described herein. For example, the catalyst complex may comprise a transition metal; and a ligand comprising 2 to 6 heteroatom containing groups capable of bonding to or chelating with a transition metal, wherein at least one of the heteroatom containing groups comprises a structure selected from an aromatic ring comprising an anionic heteroatomic donor substituent or a nitrogen containing heteroaromatic ring, wherein the aromatic ring or heteroaromatic ring further comprises one or more electron donating substituents, such as described herein. In certain embodiments, the system may comprise reduced amounts of the catalyst complex, such as less than or equal to 500 ppm, compared to conventional systems for conducting a controlled radical polymerization reaction. In specific embodiments, the system may comprise less than or equal to 100 ppm of the catalyst complex, or in certain embodiments, less than or equal to 50 ppm, or even less than or equal to 10 ppm of the catalyst complex.

The transition metal utilized in the catalyst complex in the system may be any of the transition metals described herein as useful in catalyst complexes and, in certain embodiments, may be Cu or Fe. The ligand utilized in the catalyst complex in the system may be any of the ligands having one or more electron donating substituents according to the various embodiments described in detail herein.

According to various embodiments, the system for conducting a controlled radical polymerization reaction may be a system for conducting an atom transfer radical polymerization, such as a conventional ATRP, a reverse ATRP, an SR&NI ATRP, an ICAR ATRP, a RAFT polymerization, a SARA ATRP, an e-ATRP, an AGET ATRP or an ARGET ATRP.

Studies on the reactivity of Cu-catalysts with N-based ligands have shown that activity of the formed catalyst complex can be correlated with the number of coordinating N-atoms (4>3>2), the nature of N-atoms (alkyl amine≈pyridine>imine>aromatic amine), the distance between N-atoms ($C_2>C_3>C_4$), and ligand topology (branched>cyclic>linear) [*Coord. Chem. Rev.* 2005, 249, 1155-1184].

Disclosed herein, in one embodiment of the invention, are the surprising results obtained when ligand design focused on the importance of electronic effects when employing various para substituents (R—) in relatively less active bpy ligands, as shown in Scheme 2 and whose CV's are reported in Table 1. These compounds were known but they had never been considered as ligands for transition metal complexes for controlled polymerizations.

Scheme 2: Dormant-Active Equilibrium in ATRP, illustrating change in complex structure, with para-substituted (R-bipyridine ligands.

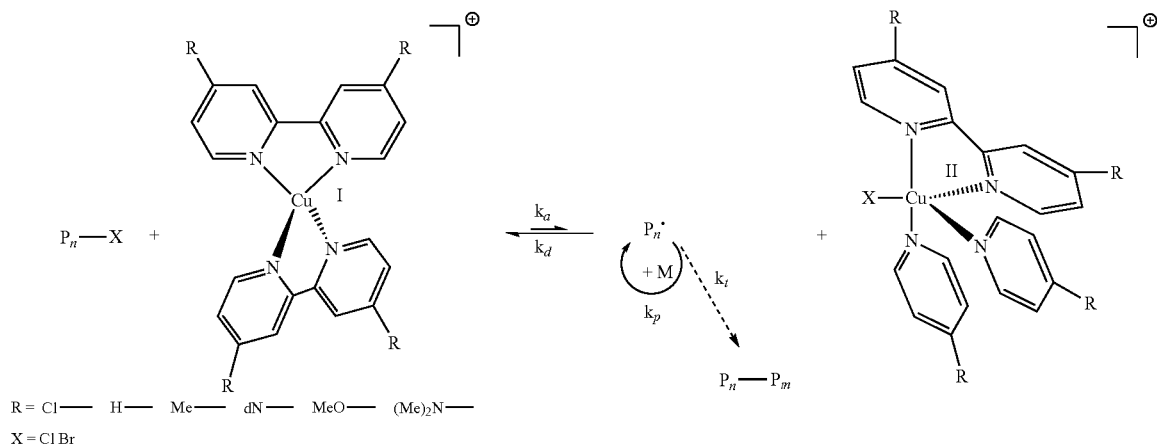

R = Cl— H— Me— dN— MeO— (Me)₂N—
X = Cl Br

A series of bipyridine derivatives with substituents ranging from electron withdrawing groups (EWGs) exemplified by chlorine (Cl—) to electron donating groups (EDGs) exemplified by methyl (Me-), methoxy (MeO—), and dimethylamine (Me)₂N—) were evaluated as ligands for transition metals targeting ATRP. The values for the electronic effects are taken from a paper describing Hammett substituent constants and field parameters by Taft et al. [Chem. Rev. 1991, 91, 165-95, (particularly the contents of Table 1 of the cited reference)] which is herein incorporated by reference to provide a list of values for a range of sigma constants (σ) for suitable substituents; e.g. $\sigma_m$(Me-)=−0.07 (line 133 Table 1 in the reference) and $\sigma_p$(MeO—)=−0.27 (line 142 Table 1 in the review) implying higher electron releasing power relative to the unsubstituted bpy ligand. There are over 30 electron donating substituents listed in the review article including straight and branched alkyl groups (R=alkyl) including -Me, -Et, cyclopropyl, iPr, tBu, -adamantyl and —CHR₂, —C(R)₃; amines including —NH₂, —NHR, —NR₂; hydroxylamines such as —NHOH; hydrazines such as —NHNH₂; amides including —N(R)COR; ureas including —NHCONH₂, —NHCONHR, —NHCONR₂; alkoxy groups such as O—R; carbonates —CO₂⁻; boronic acid groups including —B(OH)₃ and others including —CH₂CH(OH)Me, —CH₂NH₂, NHCOOR, —CH₃Si(Me)₃—OCH₂CH₂O⁻ or —NHCH₂SO₃, all of which are suitable donor groups.

Cyclic voltammetry experiments confirmed that increased electron donating ability in the conjugated electron donating substituents resulted in increased stability of the $Cu^{II}/L$ complexes and increased polymerizations rates while still producing polymers with narrow $M_w/M_n$ values and predetermined molecular weights allowing use of parts-per-million catalyst loadings; typically inaccessible to prior art H-bpy and 4,4'-dN-bpy ligands.

TABLE 1

CV of copper based complexes formed with 4,4'-substituted bipyridine ligands.

| Entry | R | $E_{1/2}$ (V)[a] | Δ $E_p$ (mV) | Relative $K_{ATRP}$ |
|---|---|---|---|---|
| 1 | —Cl | 0.270 | 130 | $10^{-3.6}$ |
| 2 | —H | 0.055 | 110 | 1 |

TABLE 1-continued

CV of copper based complexes formed with 4,4'-substituted bipyridine ligands.

| Entry | R | $E_{1/2}$ (V)[a] | Δ $E_p$ (mV) | Relative $K_{ATRP}$ |
|---|---|---|---|---|
| 3 | —Me | −0.048 | 125 | $10^{1.8}$ |
| 4 | —dN | −0.055 | 120 | $10^{1.9}$ |
| 5 | —OMe | −0.088 | 105 | $10^{2.4}$ |
| 6 | —N(Me)₂ | −0.313 | 145 | $10^{6.2}$ |

[a]V vs. Saturated Calomel Electrode (SCE) using previously reported conditions. [*J. Am. Chem. Soc.* 2008, 130, 10702-10713.]

Other exemplary ATRP catalyst ligands that include a pyridine moiety that could incorporate additional electron donor substituents include (tris[(2-pyridyl)methyl]amine), N-(alkyl)pyridylmethanimine, 2,2':6',2"-terpyridine, N',N"-dimethyl-N',N"-bis((pyridin-2-yl)methyl)ethane-1,2-diamine, N,N,N',N'-tetrakis(2-pyridylmethyl)ethylenediamine (TPEN), and N,N,N'-tris(2-pyridylmethyl)-N'-methylethylenediamine (TPMEN) whose structures are shown in Scheme 3.

Scheme 3: Additional exemplary unsubstituted ligands that include a pyridine moiety.

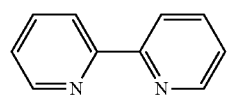

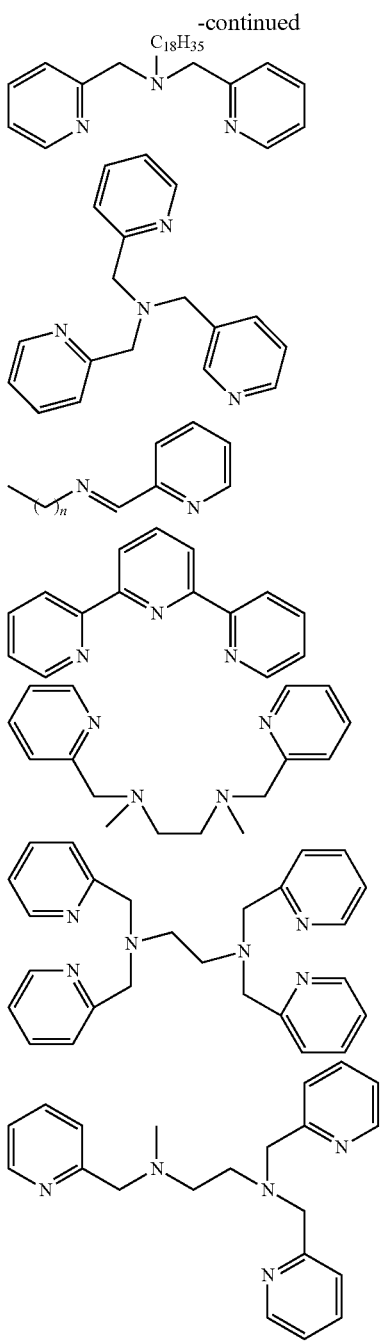

A further embodiment of the invention is provided when this concept was then applied to a set of ligands that inherently provide higher activity catalyst complexes, exemplified herein by site selected functionalization of the tetradentate tripodal (tris[(2-pyridyl)methyl]amine) (TPMA) ligand. TPMA provides a versatile scaffold for controlled site specific incorporation of units contributing additional electron donating capacity to the ligand as illustrated in Scheme 4A.

As detailed below, it was discovered that when one or more of the R-substituents on the pyridine ring ($R_1$, $R_\alpha$ or $R_\beta$) comprise electron donor substituents, the incorporated substituents on one or more of the pyridyl rings, can strongly influence the steric and electronic properties of the resulting transition metal complex. We observed considerable enhancement in the rate of polymerization when employing ligands comprising aromatic groups further comprising EDGs for the ATRP of styrenes, (meth)acrylates and other radically copolymerizable monomers. If the substituents were appropriately selected the ligands were soluble and stable in the presence of a range of solvents and an exemplary range of monomers employed for ATRP and the activity of the catalyst complex increased the value for $K_{ATRP}$ determined for the polymerization.

In most of the following examples $R_\alpha$— and $R_\beta$— are the same EDG but they could be different if desired.

Throughout this disclosure we will identify the active ligands comprising EDGs by employing the accepted abbreviation for the ligand by adding a star, such as TPMA* and noting by addition of a -number, when one or more of the pyridyl-groups comprise one or more substituents, such as TPMA*-2 for the second ligand shown in Scheme 4 B.

Scheme 4: A) Potential substituition sites in the TPMA ligand scaffold. B) Exemplary substituted tris(2-pyridylmethyl)amine ligands investigated in examples and nomenclature used for exemplary ligands prepared and discussed in examples section.

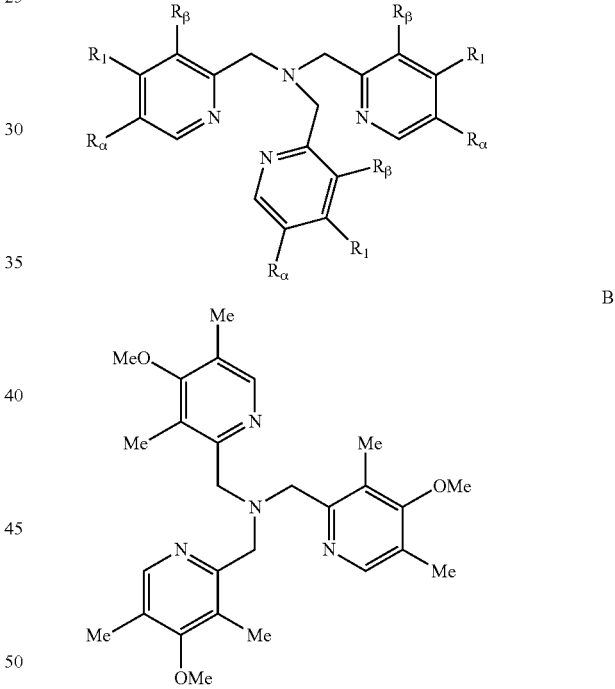

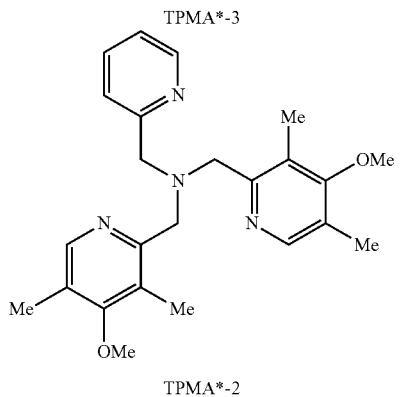

-continued

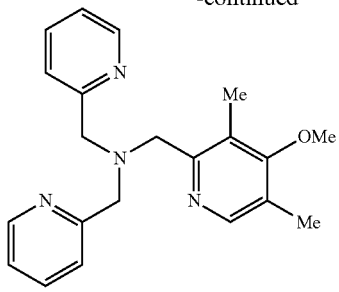

TPMA*-1

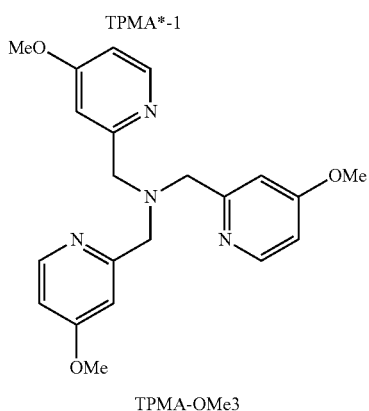

TPMA-OMe3

As noted above in Scheme 4B each aromatic ring can contain between zero, only —H atoms in the ring, to three different site selected electron donating functional groups.

One embodiment of the invention provides transition metal catalysts comprising ligands with conjugated functionality, primarily electron donating substituents, that increase the activity of the catalyst complex compared to unsubstituted ligands, i.e. ligands only with —H atoms in the ligands. The substituents are preferably in the meta- or para-positions in the pyridine unit(s) in order to reduce steric effects in the formed complex. As disclosed below copper complexes formed with ligands additionally comprising coordinated EDGs display activity in an ATRP greater than the activity of catalyst complexes without such EDGs.

In order to obtain more stable complexes, especially for Cu(I), pentadentate/hexadentate TPMEN/TPEN ligands were also examined. TPEN is supposed to provide better stability (*Helvetica Chimica Acta* 60(1): 123-140) and it was decided to combined these more complex ligands with site specific ED groups determine if it would be possible to have increased stability and sufficient high activity. The novel ligand (TPEN*, Scheme 5) was synthesized following a protocol in Scheme 5.

Scheme 5. Synthesis of TPEN*

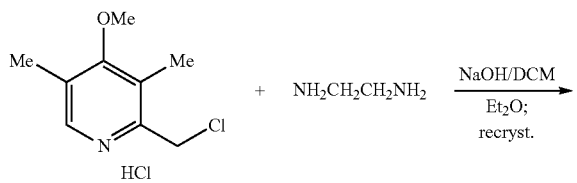

-continued

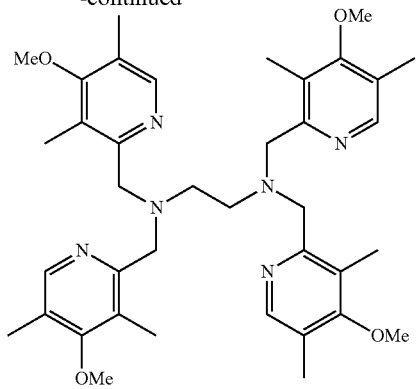

CV investigations for CuOTf$_2$/TPEN* and CuBr$_2$/TPEN* were obtained and the results are compared to literature data for TPEN and TPMEN in Table 2. The data shows the ligands with EDGs are more reducing and therefore would be expected to be more active.

TABLE 2

(A) Results of CV investigations and comparison; (B) with literature values under the same conditions.

| Complex | Ep, c vs SCE (V) | Ep, a vs SCE (V) | ΔEp vs SCE (V) | E½ vs SCE (V) |
|---|---|---|---|---|
| CuOTf$_2$/TPEN* | −0.405 | −0.303 | 0.103 | −0.354 |
| CuBr$_2$/TPEN* | −0.407 | −0.305 | 0.102 | −0.356 |
| #CuBr$_2$/TPEN | −0.205 | −0.126 | 0.070 | −0.166 |
| #CuBr$_2$/TPMEN | −0.261 | −0.171 | 0.090 | −0.216 |

Data from *Macromolecules* (2009). 42(13): 4531-4538

In addition to forming ligands for bulk or solution based ATRP site specific functionalization of a ligand can be employed to generate a ligand which is hydrophobic enough to be useful for oil in water miniemulsion polymerizations yet provides sufficiently high activity to allow the concentration of the catalyst to be reduced to the level utilized in an ARGET-ATRP, i.e. low ppm levels [*Macromolecules* 2006, 39, 39-45.] thereby providing a more environmentally lower cost procedure than the current AGET procedure. The substituents should be selected to retain/form the high level of hydrophobicity required to ensure high solubility of the catalytic species in the organic phase. In one embodiment of the invention the procedure shown in Scheme 6 was employed to synthesize a novel hydrophobic ligand, bis[2-(4-methoxy-3,5-dimethyl)pyridylmethyl]octadecylamine, identified herein as BPMODA* which is suitable for aqueous dispersed media polymerizations.

Cyclic voltammetry (CV) was used to determine the $E_{1/2}$ value of BPMODA and BPMODA*, providing values of −0.098 and −0.204 V (vs. SCE), respectively. From this correlation, it can be concluded that the supplemental electron donating substituents present on BPMODA* should increase the $K_{ATRP}$ value of $10^{-7}$ for BPMODA, to ca. $10^{-5}$ for the new ligand. The two orders of magnitude increase in $K_{ATRP}$ value causes BPMODA* to have a similar activity to TPMA. It is not obvious if CV must correlate with $K_{ATRP}$, because halidophilicity may be different but it turned out this was not the situation. Kinetic studies on the use of BPMODA*, both under traditional bulk/solution ARGET-ATRP conditions as well as ARGET-ATRP in miniemulsion will be discussed herein.

Scheme 6: Synthesis of BPMODA*

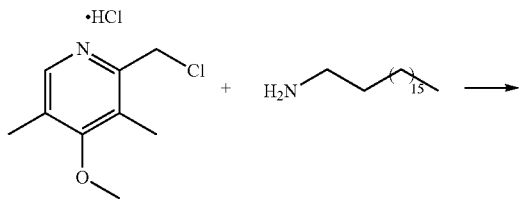

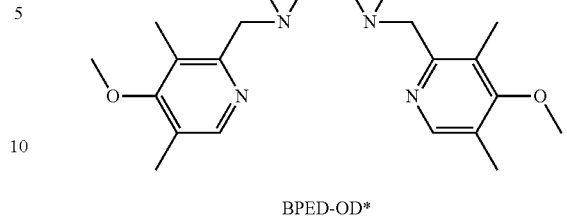

BPED-OD*

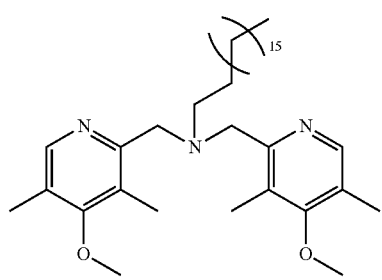

Another example of designing a ligand for a specific purpose, targeting a low catalyst concentration miniemulsion ATRP, is shown in Scheme 7. In this case the ligand is N,N'-bis(pyridin-2-yl-methyl-3-hexoxo-3-oxopropyl)ethane-1,2-diamine (BPED). BPED provides an active copper based catalyst complex that displays a $K_{ATRP}$ in the range of TPMA, for a bulk/solution ATRP [*Macromolecular Rapid Communications* 2004, 25, 632-636.] was made more hydrophobic by changing the methyl groups on the nitrogen atoms to octadecyl groups (BPED-OD), indeed other linear or branched alkyl substituents can be employed to modify the phobicity of the BPED based ligand, as with any other molecule illustrated herein. Then the activity of the hydrophobic catalyst was increased by incorporation of EDGs forming BPED-OD*.

In order to determine the effect of "anionic" donor atoms on copper and iron complexes a series of phenolate ligands were prepared. Some exemplary structures for such ligands are provided in Scheme 8. The ligands comprised phenolate moieties and aliphatic amine or pyridine donors. The pyridine based fragments of the ligands can optionally comprise electron withdrawing or electron donating ligands to adjust the activity of the formed transition metal complex in the targeted reaction. In contrast to prior work by Gibson [US 20060258867] the preferred ligands are tetradentate and do not comprise an imine moiety. The incorporation of an "anionic donor allows formation of stable transition metal by formation of a direct bond between the ligand and the selected transition metal.

Scheme 8: An exemplary series of phenolate ligands further comprising EDGs.

Scheme 7. Designing super-hydrophobic ligands for emulsion ATRP.

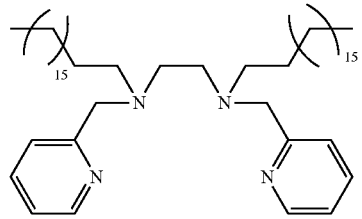

BPED-OD

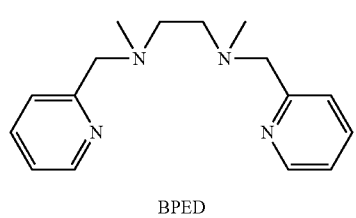

BPED

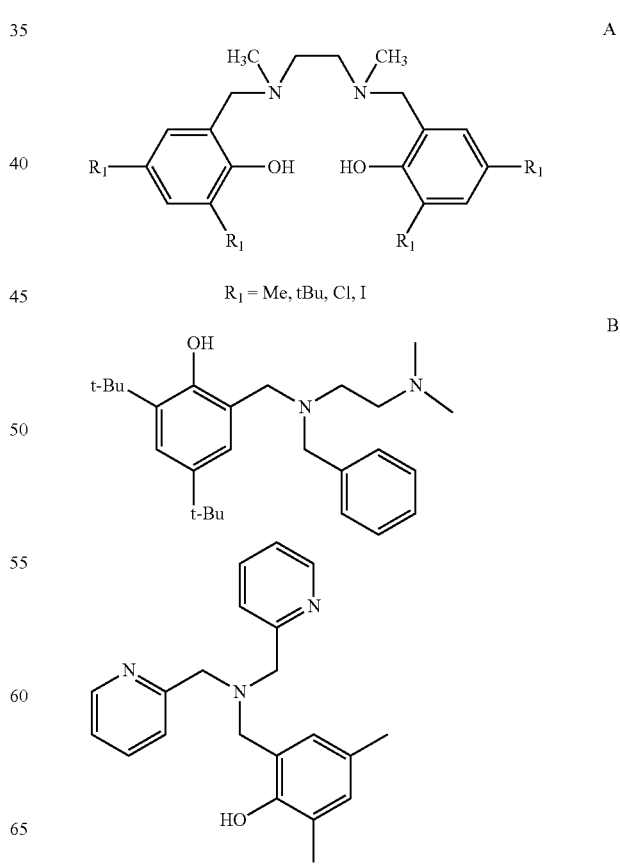

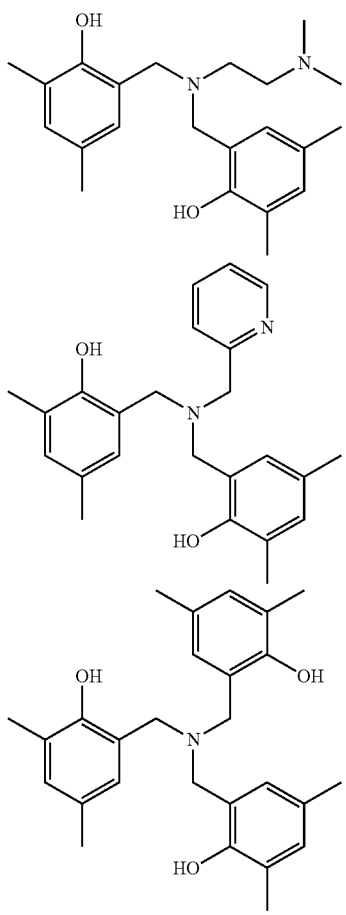

A series of bpy ligands with 4,4'-substituents ranging from electron withdrawing groups (EWGs) such as chlorine (Cl—) to electron donating groups (EDGs) including methyl, methoxy and dimethylamine (Me-, MeO—, $(Me)_2N$—) were examined as ligands for transition metals to determine if they formed catalyst complexes suitable for use in an ATRP. The X—$Cu^{II}$/R-bpy complexes should maintain a trigonal bipyramidal geometry, commonly observed for copper(II) bpy systems [New Journal of Chemistry 2002, 26, 462-468.] independent of the 4,4'-bpy substituent. Prior to conducting an ATRP, each transition metal complex was characterized using CV and the results are summarized in Table 1.

Figure 1B:
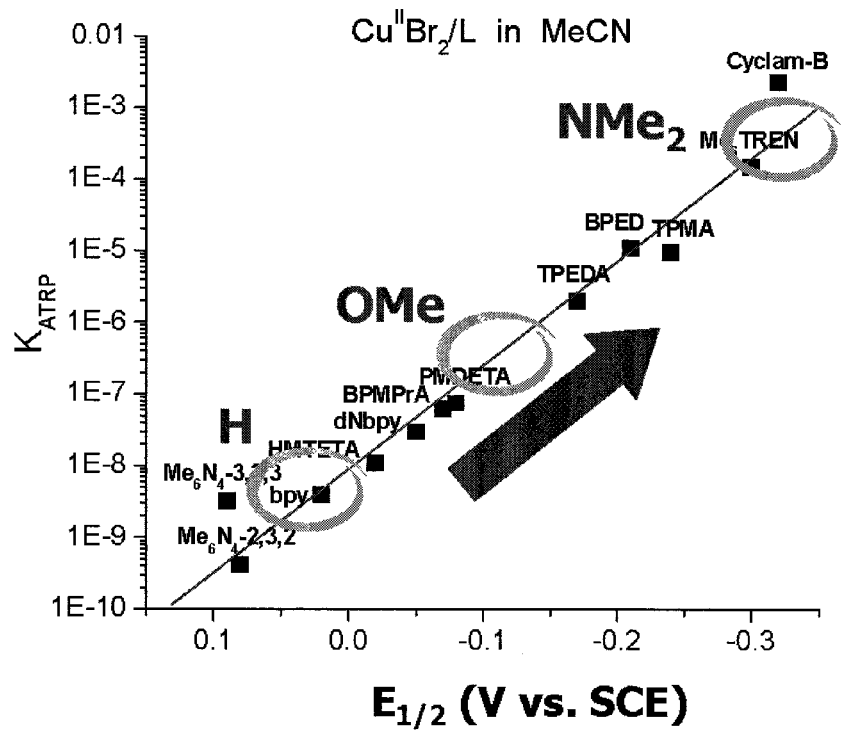
FIG. 1B illustrates a graph showing the existence of a relationship between $E_{1/2}$ and $K_{ATRP}$ for different copper based catalyst complexes.

As noted above, conducting a CV on transition metal complexes formed with the custom designed ligands provides a convenient tool to gain insight into the relative activities of metal complexes in ATRP through the correlation which exists between half-wave potentials ($E_{1/2}$) and ATRP equilibrium constants ($K_{ATRP}$). [Macromolecules 2009, 42, 6348-6360 and J. Am. Chem. Soc. 2008, 130, 10702-10713]. Table 1 provides evidence that moving to increasingly more electron donating substituents, i.e. R-(EDG)=Cl—<H—<$CH_3$-<MeO-<$(Me)_2N$—, in the 4,4'-positions of the bipyridyl ligands leads to formation of copper catalyst complexes with progressively more negative $E_{1/2}$ values. More negative $E_{1/2}$ values correspond to more stable $Cu^{II}$/L complexes, and therefore result in larger $K_{ATRP}$ values. Surprisingly, simply changing the 4,4'-substituents on the pyridine moiety from a hydrogen atom to a donating $(Me)_2N$— functional group produced a 370 mV shift in the $E_{1/2}$ value, FIG. 1A, which is equivalent to a $10^6$ fold increase in $K_{ATRP}$, FIG. 1B. This $E_{1/2}$ value for 4.4'-$(Me)_2N$-bpy is similar to the value obtained with one of most currently active copper based ATRP complexes, a complex formed with $Me_6TREN$ as the ligand.

Figure 2A:
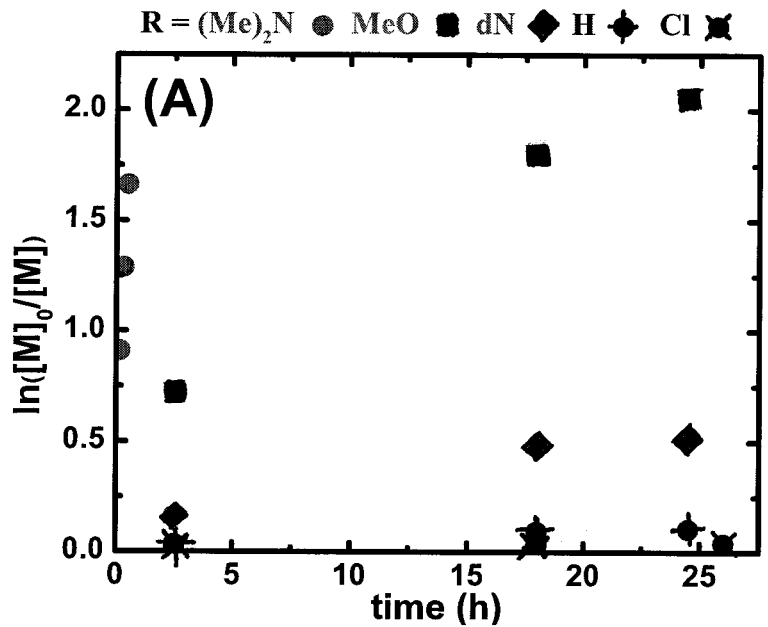
FIG. 2A illustrates a first-order kinetic plot and FIG. 2B illustrates evolution of $M_n$ and $M_w/M_n$ versus conversion for ATRP reactions conducted with various R-bpy ligands. Polymerizations were conducted with 5.55 M MA in 50 (v/v) % DMSO at 60° C. using the molar ratios of reagents: [MA]:[EBiB]:[R-bpy]:[CuBr]:[CuBr$_2$]=200:1:2: 0.9:0.1.
Figure 2B:
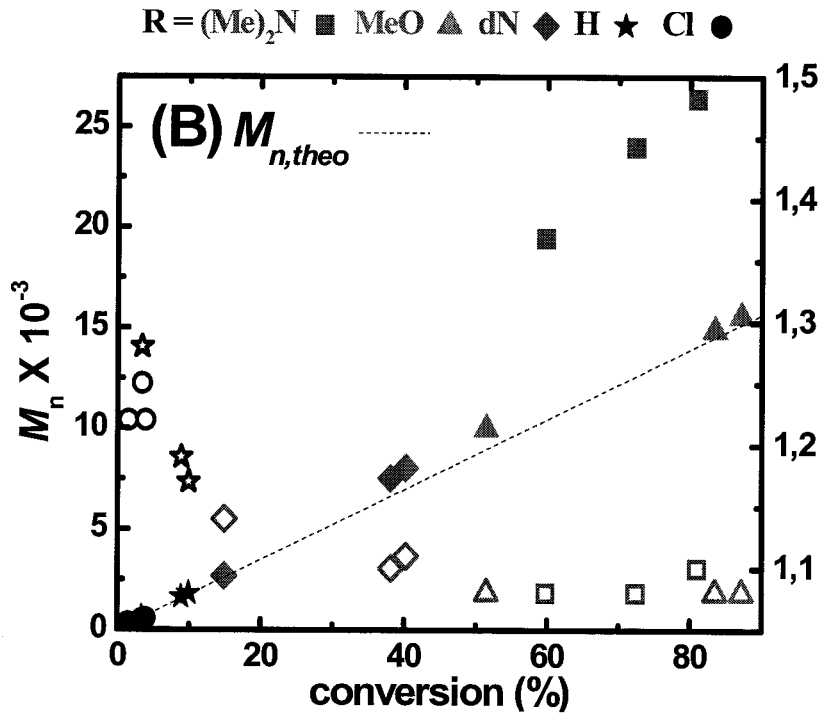

To test this hypothesis a series of polymerizations were conducted under traditional ATRP conditions, as summarized in the caption of FIG. 2, varying only the R-functionality in the R-bpy ligand. When these differently substituted R-bpy ligands were employed for an ATRP we observed considerable enhancement of the rate of an ATRP when employing ligands with EDGs for the polymerizations of acrylates. The strongly donating R-bpy ligands resulted in the formation of catalyst complexes that provided a significant rate enhancement and controlled polymerizations utilizing ppm catalyst loadings; typically inaccessible to H-bpy and dN-bpy ligands During each polymerization monomer conversion, number average molecular weight ($M_n$), and the molecular weight distribution ($M_w/M_n$) were monitored as the polymerization progressed, FIGS. 2A and B, to confirm that "controlled" reactions were being conducted.

The fastest polymerization was observed with the ligand comprising the most strongly electron donating substituent, i.e. $(Me)_2N$—, followed by MeO— and dN—, and the slowest rates of polymerization were observed with H— and the electron withdrawing Cl— substituents, FIG. 2A. As one transitioned from H-bpy to 4,4'-MeO-bpy and 4,4'-$(Me)_2N$-bpy ligands, respectively, a rate enhancement of 100× and 400× was observed. Monomer conversions >80% were accomplished in ca. 17 h and 0.5 h with 4,4'-MeO-bpy and 4,4'-$(Me)_2N$-bpy, respectively, whereas the prior art H-bpy and dNbpy ligands required nearly a day to reach only ca. 40% conversion. Furthermore, the 4,4'-R-bpy ligands comprising EDGs provided polymers that exhibited all the characteristics of polymers prepared in a well-controlled polymerization: a linear increase in $M_n$ with conversion, and $M_w/M_n$ values ≥1.15, FIG. 2B.

However, the most active 4,4'-$(Me)_2N$-bpy ligand resulted in production of polymer samples with higher molecular weight, $N_{n,gpc}$>>$M_{n,theo}$, presumably from the very high reactivity expected for a catalyst complex generating high initial radical concentrations and hence increasing the number of early termination events thereby reducing the concentration of functional initiators while increasing the concentration of the deactivator complex to a sufficient degree to control the reaction.

CV and normal ATRP experiments revealed that selective incorporation of EDGs on bpy dramatically influenced the polymerization behavior and confirmed an increase in the $K_{ATRP}$. Ligands with larger $K_{ATRP}$ values should provide higher absolute concentrations of the deactivator, [$Cu^{II}$/L], in dilute conditions, permitting a CLRP even in the presence of ppm catalyst concentrations. Currently, highly active $Me_6TREN$ and TPMA ligands must be employed when ppm catalyst concentrations are desired, because complexes with low activity ligands, e.g. bpy, have been shown to be ineffective when present at low concentrations due to generation of an insufficient concentration of the deactivator complex [$Cu^{II}$/L]. Previous literature accounts have shown polymerizations conducted with low concentrations of bpy, or other low activity ligands, result in the preparation of polymers with broad $M_w/M_n$ when polymerizing styrenes, methacrylates, and acrylates. Therefore, these newly identified and highly active 4,4'-R-bpy ligands were investigated for their ability to form copper based catalyst complexes that could maintain CLRP behavior with ppm concentrations of catalyst.

Table 3 summarizes a variety of polymerizations using copper wire as a supplementary activator and reducing agent (SARA) ATRP [Macromolecules 2010, 43, 9682-9689; ACS Macro Lett. 2012, 1, 1308-1311.] with R-bpy ligands in a series of experiments designed to study the influence of the R-group on the [$Cu^{II}$], the [$Cu^{II}/L_2$], and monomer; i.e. MA and MMA. The first investigation compared the level of control attained with bpy based ligands containing dN—, MeO—, and ($Me_2$)N-4,4'-substituents at 500 ppm of [$Cu^{II}$].

to 100 ppm of $Cu^{II}$, entries 3, 5, and 6 in Table 3. In this series, the concentration of ligand was always twice that of the copper (Cu/L is used rather than $Cu/L_2$ for nomenclature consistency). As [Cu/L] was decreased, the polymerization rate also decreased, as evidenced in Table 3, entries 3, 5, and 6 at 2 hours, the conversion of monomer was 78, 55, and 48% for 500, 200, and 100 ppm of [$Cu^{II}/L$], respectively. Similar behavior was previously observed in literature when using SARA ATRP of MMA and MA. [Macromol. 2010, 43, 9682-9689 and Macromol. 2011, 44, 811-819.] In addition, higher [$Cu^{II}/L$] yielded polymers with lower $M_w/M_n$ values. When the copper concentrations are reduced from 500 to

TABLE 3

ATRP of MA and MMA with ppm levels of Cu/R-bpy ligands.

| Entry | Monomer | [$Cu^{II}Br_2$] ppm/equiv. (X) | [R-bpy] (R/equiv. (Y)) | Time (h) | Conv. (%) | $M_{n,theo}$ | $M_{n,GPC}$ | $M_w/M_n$ |
|---|---|---|---|---|---|---|---|---|
| 1[a] | MA | 500/0.1 | dN/0.20 | 2.0 | 24 | 4 115 | 11 200 | 1.98 |
|  |  |  |  | 7.0 | 62 | 10 692 | 16 500 | 1.76 |
| 2[a] | MA | 500/0.1 | MeO/0.20 | 2.0 | 35 | 6 026 | 8 930 | 2.39 |
|  |  |  |  | 5.0 | 74 | 12 706 | 16 800 | 1.64 |
| 3[a] | MA | 500/0.1 | ($Me)_2$N/0.20 | 1.0 | 54 | 9 332 | 11 300 | 1.17 |
|  |  |  |  | 2.0 | 78 | 13 464 | 16 530 | 1.12 |
| 4[a] | MA | 50/0.01 | ($Me)_2$N/0.20 | 0.5 | 58 | 10 004 | 13 800 | 1.44 |
|  |  |  |  | 1.5 | 83 | 14 360 | 20 000 | 1.25 |
| 5[a] | MA | 200/0.04 | ($Me)_2$N/0.08 | 2.0 | 55 | 9 470 | 13 000 | 1.35 |
|  |  |  |  | 5.0 | 78 | 13 396 | 16 950 | 1.28 |
| 6[a] | MA | 100/0.02 | ($Me)_2$N/0.04 | 2.0 | 49 | 8 402 | 12 050 | 1.71 |
|  |  |  |  | 6.0 | 77 | 13 258 | 17 750 | 1.46 |
| 7[b] | MMA | 100/0.02 | dN/0.04 | 6.0 | 52 | 10 676 | 12 050 | 1.20 |
| 8[b] | MMA | 100/0.02 | MeO/0.04 | 6.0 | 59 | 12 097 | 13 570 | 1.25 |
| 9[b] | MMA | 100/0.02 | ($Me)_2$N/0.04 | 6.0 | 54 | 10 976 | 13 670 | 1.28 |
| 10 | MMA | 20/0.004 | ($Me)_2$N/0.08 | 52 | 32 | 6 522 | 8 500 | 1.41 |

[a][MA]:[EBiB]:[R-bpy]:[CuBr2] = 200:1:X:Y with 5 cm copper wire in 50 (v/v) % DMSO at 25° C.
[b][MMA]:[EBPA]:[R-bpy]:[CuBr2] = 200:1:X:Y with 1 cm copper wire in 50 (v/v) % 3:1 anisole:DMSO mixture at 60° C.

Similar to the observation with normal ATRP, SARA ATRP conducted with 500 ppm of $Cu^{II}$ showed that increasing the electron donating contribution from the EDG in the 4,4'-substituents resulted in higher rates of polymerizations; entries 1, 2, and 3 at 2 hours. Furthermore, polymers of similar $M_n$ had lower $M_w/M_n$ values were obtained when more active catalysts were used for the polymerizations; entries 1 (7 h), 2 (5 h), and 3 (2 h). In particular, the medium activity exhibited by the prior art 4,4'-dN-bpy ligand provided a $M_w/M_n$ value >1.7, (entry 1 (7 h)) whereas the newly employed 4,4'-($Me)_2$N-bpy provided a polymer displaying a $M_w/M_n$ value of 1.12. Lower $M_w/M_n$ values are generally obtained with ligands that provide catalyst complexes generating larger values for $K_{ATRP}$ because they provide higher [$Cu^{II}/L$], which increases the rate of deactivation resulting in fewer monomer additions during each activation-deactivation cycle.

After establishing that the 4,4'-($Me)_2$N-bpy was the most effective bpy based ATRP ligand under highly dilute conditions, the lower concentration limit was probed by varying the initial [$Cu^{II}$] and [$Cu^{II}/L$]. Entries 3-4 in Table 3 present results from reactions conducted under identical polymerization conditions except with a 10 fold difference in the initial [$Cu^{II}$]. A rapid polymerization occurred with only 50 ppm [$Cu^{II}$], reaching >80% conversion in 1.5 h, while maintaining $M_w/M_n$ values <1.3. It should be noted that between these two experiments the concentration of ligand remained constant and only the concentration of $Cu^{II}$ was decreased.

In a separate series of polymerizations, the concentration of $Cu^{II}$ and ligand were systematically decreased, from 500

100 ppm, compare entry 3 (2 h) and 6 (6 h), the $M_w/M_n$ values changed from 1.12 to 1.46 at similar conversion values of 80%.

The later series of experiments, Table 3 entries 7-10, were intended to probe the ability of R-bpy ligands to catalyze the polymerization of MMA utilizing ppm concentrations of catalyst. Different polymerization conditions were used for MMA, including use of a mixed solvent system, higher reaction temperatures, and a more active initiator, i.e. ethyl-α-bromophenylacetate (EBPA). The higher reaction temperature was used to increase the rate of polymerization. As shown in entries 7, 8, and 9, three different ligands were employed using 100 ppm of copper catalyst. In each case similar conversion values, molecular weights, and $M_w/M_n$ values were obtained and each of the R-bpy ligands proved to be capable of catalyzing the ATRP process and provided polymers with low $M_w/M_n$ values with only 100 ppm of $Cu^{II}$/L. The studies were then extended to a 20 ppm ATRP system employing most active ($Me)_2$N-bpy ligand, Table 3, entry 10. The resulting polymerization was slow, reaching only 32% conversion in 52 h, and had a slightly higher $M_w/M_n$ value of 1.41 compared to the more successful 100 ppm system.

Another ligand comprising a pyridyl based unit is TPMA and several derivatives of TPMA were synthesized based on the TPMA scaffold shown in Scheme 4A by varying substituents, $R_1$—, $R_α$— and $R_β$—. A novel procedure for the synthesis of tris[{4-methoxy-3,5-dimethyl})-2-pyridyl]methyl]amine, shown in Scheme 9, which will be identified as TPMA*-3, see Scheme 4 B, in the following exemplification of the effect of designing highly active catalysts specifically for an ATRP. Each pyridine moiety in TPMA*-3 contains three EDG's, two Me- in the meta-positions and one MeO— substituent in the para-position was developed. The negative Hammett sigma constants (σ) of the selected EDGs; $\sigma_m$(Me-)=−0.07 and $\sigma_p$(MeO—)=−0.27 imply high electron releasing power relative to unsubstituted TPMA ligand.

Scheme 9: Overall scheme for the synthesis of TPMA*-3.

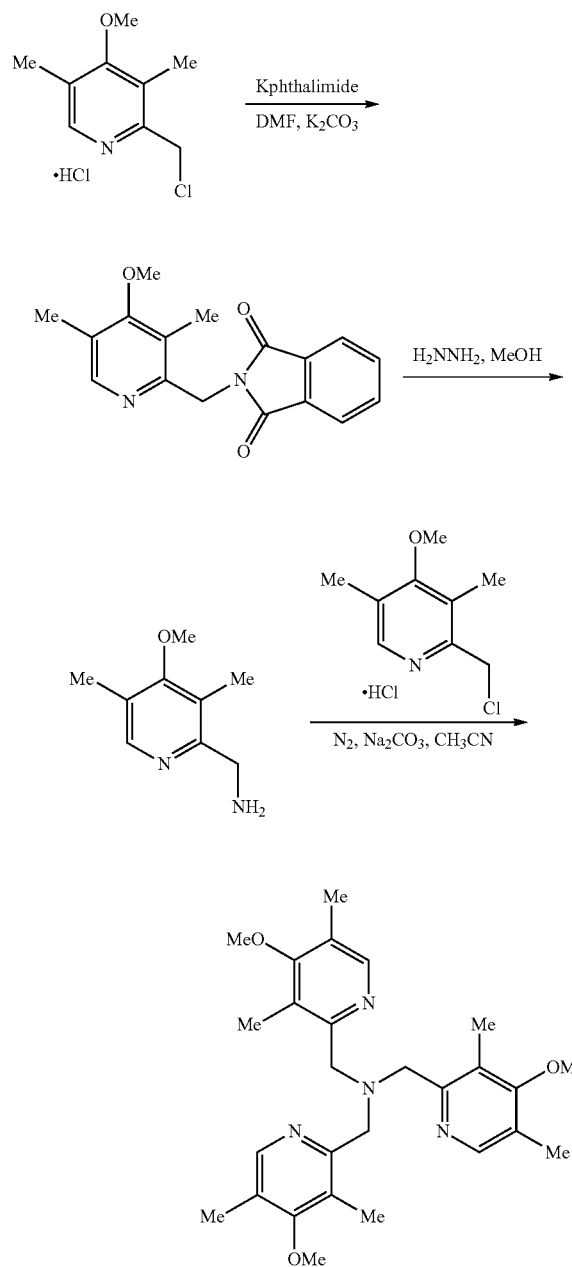

Three other novel derivatives of TPMA, see Scheme 4 B, were successfully synthesized for comparison with TPMA*-3 and procedures for their synthesis are presented in Schemes 10 to 12. The procedure for the preparation of the para-dimethylamine-substituted derivative is shown in Scheme 13.

Scheme 10: Procedure employed for the syntheses of TPMA-OMe.

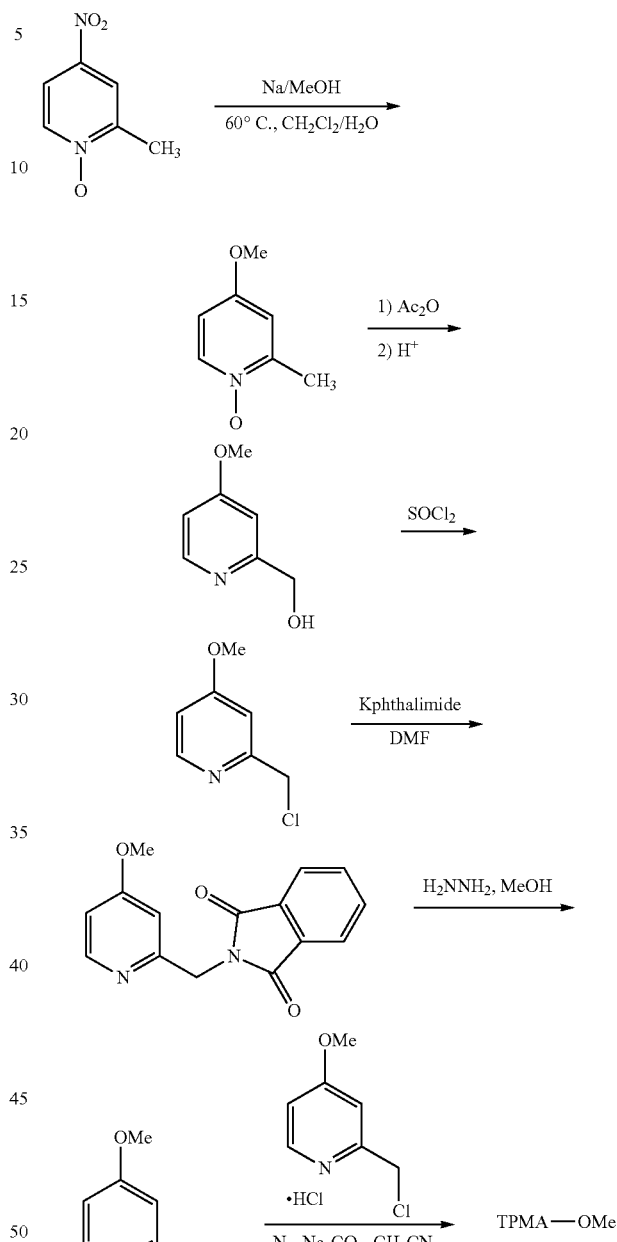

Scheme 11: Procedure employed for the sythesis of TPMA*-1.

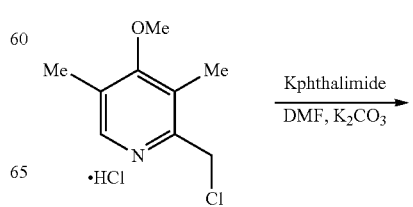

-continued

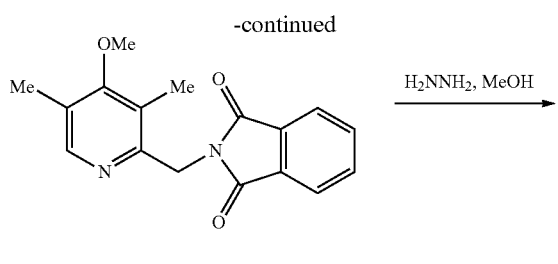

compared to TPMA in an ATRP. These synthetic procedures for the synthesis of novel ligands and the enhanced activity of the catalyst complexes formed between such ligands and various transition metals provide industrially viable methods for preparation of catalysts for numerous homo- and heterogeneous catalytic procedures including atom transfer radical addition (ATRA), atom transfer radical cyclization, atom transfer radical coupling, ATRP, and a variety of other redox based catalytic reactions.

Scheme 13. Overall procedure employed for synthesis of TPMA-NMe2.

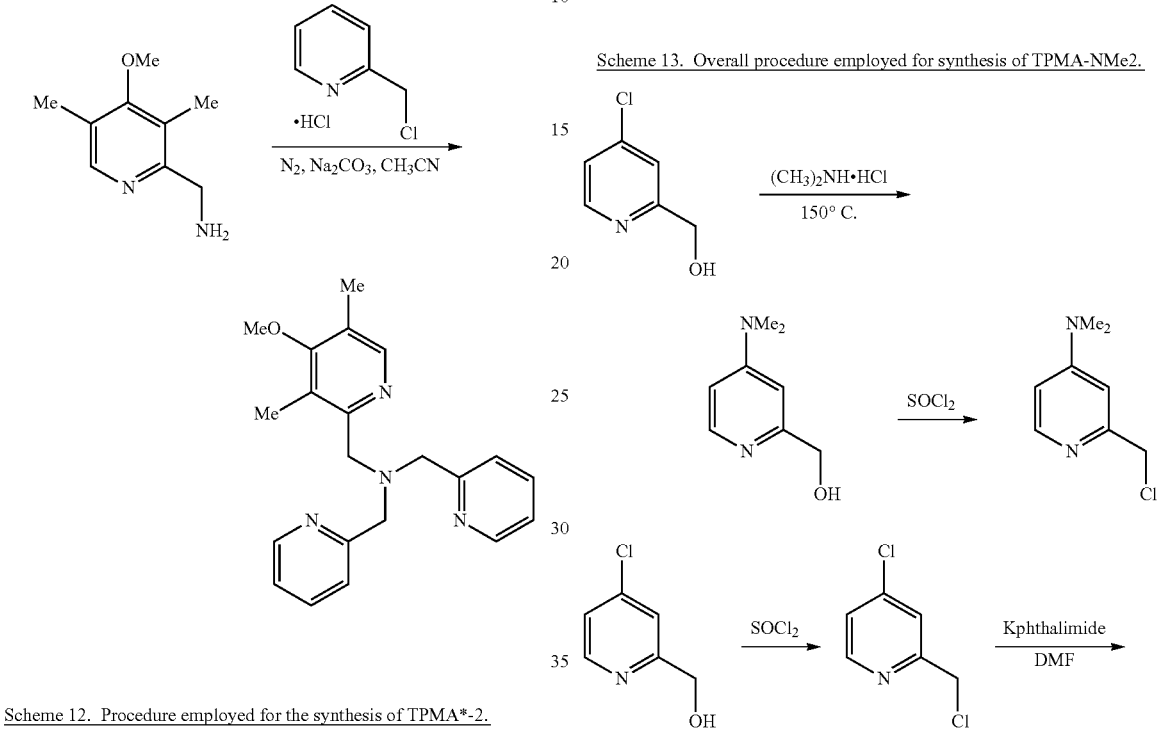

Scheme 12. Procedure employed for the synthesis of TPMA*-2.

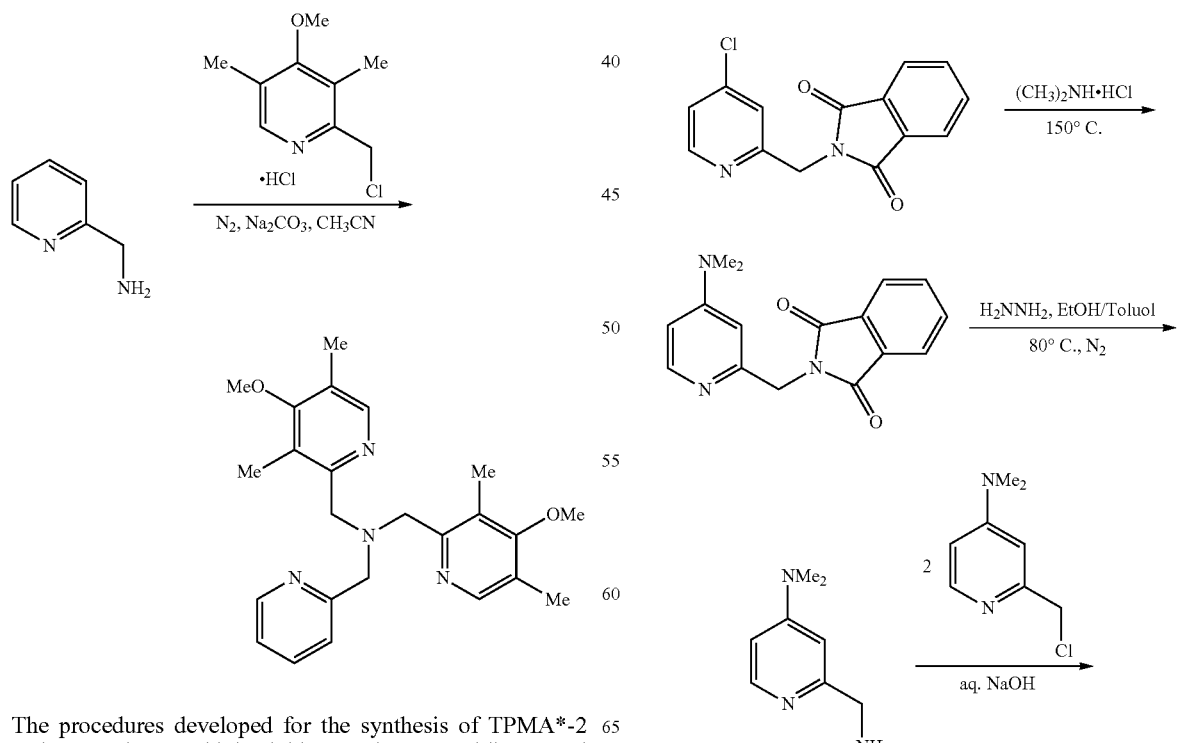

The procedures developed for the synthesis of TPMA*-2 and TPMA*-1 are high yield procedures providing novel ligands that displayed a significant increase in activity

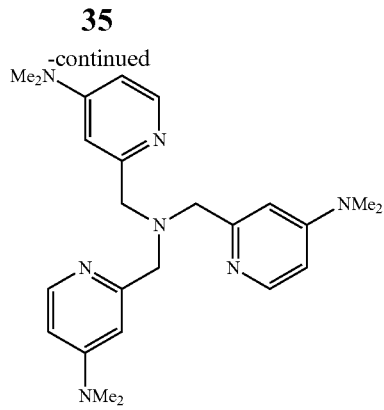

As detailed in the experimental section a series of catalyst complexes were prepared based on the ligands shown above and the parameters that provide information on the rate and control of an ATRP were determined. The results are provided in the Table 4.

TABLE 4

Summary of parameters obtained for the TPMA family.

| | TPMA | TPMA*-1 | TPMA*-2 | TPMA*-3 | TPMA-OMe-3 |
|---|---|---|---|---|---|
| $E_{1/2}$ (CuOTf$_2$/L) in V[a] | 0.020 | −0.057 | −0.110 | −0.150 | −0.082 |
| $E_{1/2}$ (CuBr$_2$/L) in V[a] | −0.240 | −0.311 | −0.357 | −0.420 | −0.373 |
| $\beta^{II}/\beta^{I}$ (Bromide)[b] | $2.5 \times 10^4$ | $2.0 \times 10^4$ | $8.3 \times 10^4$ | $3.6 \times 10^4$ | $1.5 \times 10^4$ |
| $\beta^{II}/\beta^{I}$ (Ligand)[b] | $3.2 \times 10^{17}$ | $6.5 \times 10^{18}$ | $5.1 \times 10^{19}$ | $2.4 \times 10^{20}$ | $1.7 \times 10^{19}$ |
| Estimated increase in $K_{ATRP}$ compared to TPMA (CV) | 1 | $10^{1.2}$ | $10^2$ | $10^3$ | $10^{2.2}$ |
| $K_{ATRP}$[c] | $3.2 \times 10^{-7[d]}$ | $5 \times 10^{-6}$ | $4.7 \times 10^{-5}$ | $5 \times 10^{-4}$ | $1.7 \times 10^{-5}$ |
| $k_a$[c] [M$^{-1}$ s$^{-1}$] | (3.8)[d] 250 | 900 | 4100 | 8400 | 2500 |

[a]T = 25° C., MeCN, [Cu(OTf)$_2$] = [TPMA derivative] = [1 mM]; Electrolyte: [TBAPF$_6$] = 0.1M;
[b]calculation after ref. Macromolecules 2010, 43, 9257]
[c]measured by stopped-flow (BJ): [MBP] as initiator, T = 25° C., MeCN; $K_{ATRP} = (m/2k_t)^{1/2}$ with $k_t$ = 2.5 × 10$^9$ M$^{-1}$ s$^{-1}$(determined theoretically in ref. Macromolecules 2010, 43, 9257);
[d]literature values from ref. J. Am. Chem. Soc. 2008, 130, 10702.

In addition to characterizing the structure of the ligands by spectral analysis, electrochemical characterizations of the corresponding Cu-complexes were carried out. Redox potentials of the Cu complexes can be easily assessed by cyclic voltammetry, in addition ESI measurements, which confirmed the coordination complex structure of the catalyst in MeCN solution. The half potential of CuBr/TPMA*-3 is significant more negative ($E_{1/2}$=−0.420 V vs SCE) than that measured for CuBr/TPMA ($E_{1/2}$=−0.24 V vs SCE), which was previously considered to provide one of the more active catalyst complexes for an ATRP. Indeed the calculated $K_{ATRP, TPMA*-3}$ in comparison with the normal CuBr/TPMA system $K_{ATRP, TPMA*-3}$=10×$K_{ATRP, TPMA}$; meaning a copper complex formed with the ligand should be a thousand times more active in an ATRP. Furthermore, the relative stability constant for TPMA*-3 and the bromine derivative are: TPMA*-3-$\beta^{II}/\beta^{I}$=2.4×10$^{20}$; bromine-$\beta^{II}/\beta^{I}$=3.6×10$^4$ respectively.

While the half potential of CuBr/TPMA-OMe-3 is significant more negative ($E_{1/2}$=−0.373 V vs SCE and $E_{1/2}$=−0.094 V vs Fc+/Fc), than the CuBr/TPMA system in comparison to CuBr/TPMA*-3 ($E_{1/2}$=−0.420 V vs SCE) the potential is less negative and therefore the CuBr/TPMA-OMe-3 catalyst is slightly less reducing and expected to provide a lower activity catalyst complex. From this data the calculated $K_{ATRP, TPMA-OMe-3}$ in comparison with the normal CuBr/TPMA system is $K_{ATRP, TPMA-OMe-3}$=10$^{2.2}$× $K_{ATRP, TPMA}$ and the relative stability constant for TPMA-OMe-3 and the bromine derivative are: TPMA-OMe-3-$\beta^{II}/\beta^{I}$=1.7×10$^{19}$; bromine-$\beta^{II}/\beta^{I}$=8.3×10$^4$, indicating that stable active catalyst complexes are formed. Another "unsubstituted" ligand that should provide similar activity to TPMA but with increased steric effects which may be advantageous in terms of lower rearrangement energies when going from Cu$^{II}$ to Cu$^{I}$, which should give better control and faster rate is the quinoline based equivalent of TPMA, tris(2-quinolinylmethyl)amine, which can be named TQMA. The reducing capacity of a complex comprising this ligand can also be determined from CV as peak-to-peak separations (ΔEp) should be close to Nernstian values. The increased steric interaction should also prevent transition metal induced side reactions, e.g. reaction with other Cu complexes like disproportionation in polar solvents. The quinoline equivalent of TPMA was synthesized using the procedure shown in Scheme 14. The reaction product did require purification.

Scheme 14: Preparation of TQMA.

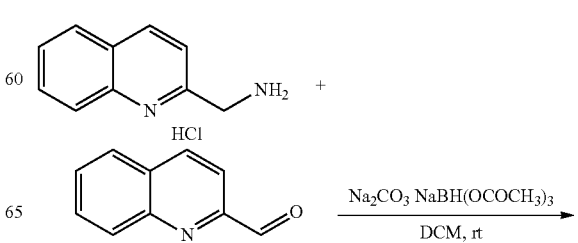

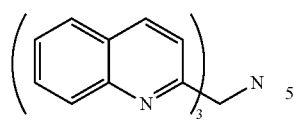

Intermediate structures such as bis(2-quinolylmethyl)pyridyl-2-methylamine (BQPA), Scheme 15, with two quinoline rings and one pyridyl ring would also provide suitable foundations for EDG substitution.

Scheme 15: Bis(2-quinolylmethyl)pyridyl-2-methylamine

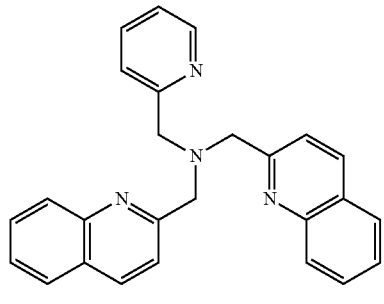

BQPA

A series of mixed phenolate/amine ligands were prepared in order to examine the effect the presence of "anionic" donor atoms will have on copper and iron complexes. The ligands were selected to comprise phenoxy moieties and aliphatic amine or pyridine donors. Exemplary non-limiting examples of ligands falling in this class are shown below.

Scheme 16: Exemplary mixed phenolate and amine ligands

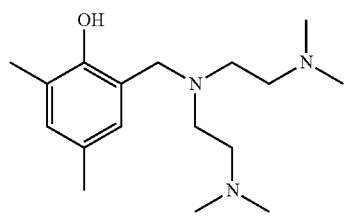

1

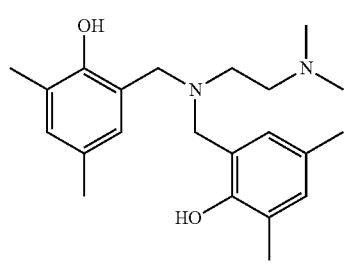

2

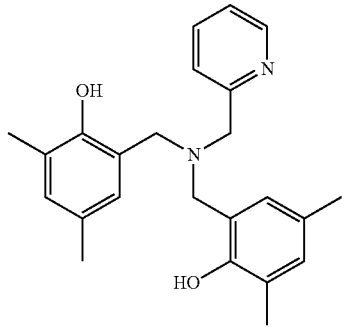

3

4

CV's were carried out on the iron complexes formed with ligands 2 and 3 in Scheme 16 vs Fc/Fc$^+$ providing $E_{1/2}$ values=−790 mV and −770 mV respectively which indicates that active complexes for redox based reactions were formed. A tBu-Salan complex, Scheme 16, was formed and the CV indicated a more active catalyst complex with an $E_{1/2}$ value=−960 mV which is much more reducing than reported values of (−410-440 mV) for other iron complexes employed by Pintauer for ATRA reactions [*Inorg. Chem. Acta* 2012, 382, 84].

Scheme 17: tBu-Salan complex

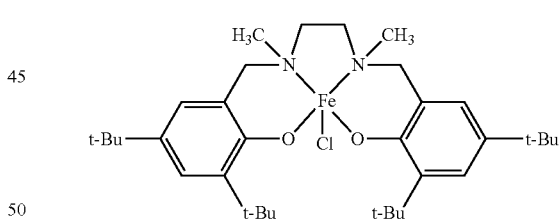

One embodiment of the invention provided by this initial series of exemplary ligands provides a rational design of ligands that provide a powerful tool to manipulate and improve the activity of catalyst complexes in transition metal catalyzed ATRP. In a series of exemplifying examples discussed below it is clearly shown that the site selective introduction of electron donating substituents into ligands greatly enhance the catalytic activity of the resulting copper based catalyst complexes in ATRP. CV measurements confirmed that incorporation of EDGs resulted in an increased stability of the Cu$^{II}$/L complexes. This resulted in increased polymerizations rates for catalyst complexes formed with ligands with EDG substituents on the aromatic ring, while still producing polymers with narrow $M_w/M_n$ values and pre-determined molecular weights, optionally with ppm concentration of catalysts in the polymerization medium.

A further demonstration of utility is exemplified by using ATRP procedures that utilize parts-per-million catalyst loadings for polymerization of radically (co)polymerizable monomers with highly active R-bpy ligands while producing polymers with low $M_w/M_n$ values under mild reaction conditions.

EXAMPLES AND DISCUSSION OF EXAMPLES

Chemicals.

MA (99%, Aldrich) and MMA (99%, Aldrich) were passed through a column filled with basic alumina prior to use. Copper(II) bromide ($Cu^{II}Br_2$, 99.999%, Aldrich), copper(I) bromide ($Cu^IBr$, 99.999%, Aldrich), copper wire (dia.=0.5 mm, 99.9%, Alfa Aesar), ethyl α-bromoisobutyrate (EBiB, 98%, Aldrich), ethyl α-bromophenylacetate (EBPA, 97%, Aldrich), tetrabutylammonium hexafluorophosphate (NBu4PF6, ≥98%, Aldrich), 2,2'-bipyridyne (H-bpy, ≥99%, Aldrich), 4,4'-dimethyl-2,2'-bipyridyne (Me-bpy, 99%, Aldrich), 4,4'-dimethyloxy-2,2'-bipyridyne (MeO-bpy, 97%, Aldrich), 4,4'-dichloro-2,2'-bipyridyne (Cl-bpy), and 4,4'-dinonyl-2,2'-bipyridyne (dN-bpy, 97%, Aldrich) were used as received. 4,4'-(Dimethylamino)-2,2'-bipyridine (($Me)_2N$-bpy) was synthesized according to literature procedures. All the other reagents and solvents were purchased at the high available purity and used as received.

Instrumentation.

All cyclic voltammograms (CV) were measured at 25° C. with a Gamry Reference 600 potentiostat. Solutions of $CuBr_2$/R-bpy (1.0/2.0 mM) were prepared in dry solvent containing 0.1 M $NBu_4PF_6$ as the supporting electrolyte. Measurements were carried out under a $N_2$ atmosphere at a scanning rate (v) of 0.1 V s$^{-1}$, using a glassy carbon disk and platinum wire as the working and counter electrode, respectively. Potentials were measured versus a SCE reference electrode (Gamry) equipped with a 0.1 M $NBu_4PF_6$ salt bridge to minimize $Cl^-$ ion contamination of the analyte. Gel permeation chromatography (GPC) was used to determine number average molecular weight ($M_n$) and $M_w/M_n$ values. The GPC was conducted with a Waters 515 HPLC Pump and Waters 2414 Refractive Index Detector using PSS columns (Styrogel 102, 103, 105 Å) in tetrahydrofuran (THF) as eluent at a flow rate of 1 mL/min at 35° C. The column system was calibrated with 12 linear polystyrene (PSt, $M_n$=376~2,570,000) and 12 linear poly(methyl methacrylate) (PMMA, $M_n$=800~2,570,000) standards.

Characterization.

Figure 3A:
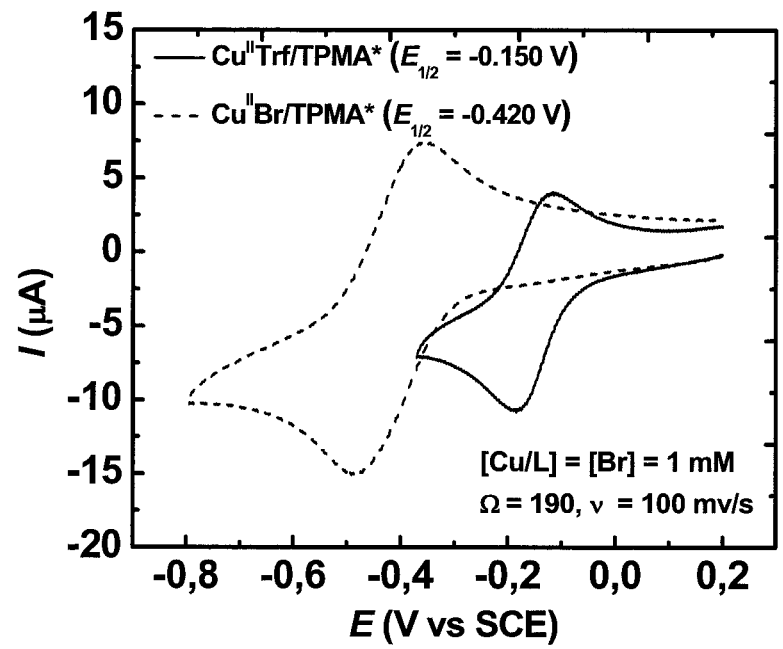
FIG. 3A displays the effect of different counterions and FIG. 3B shows the effect of an added ATRP initiator.
Figure 3B:
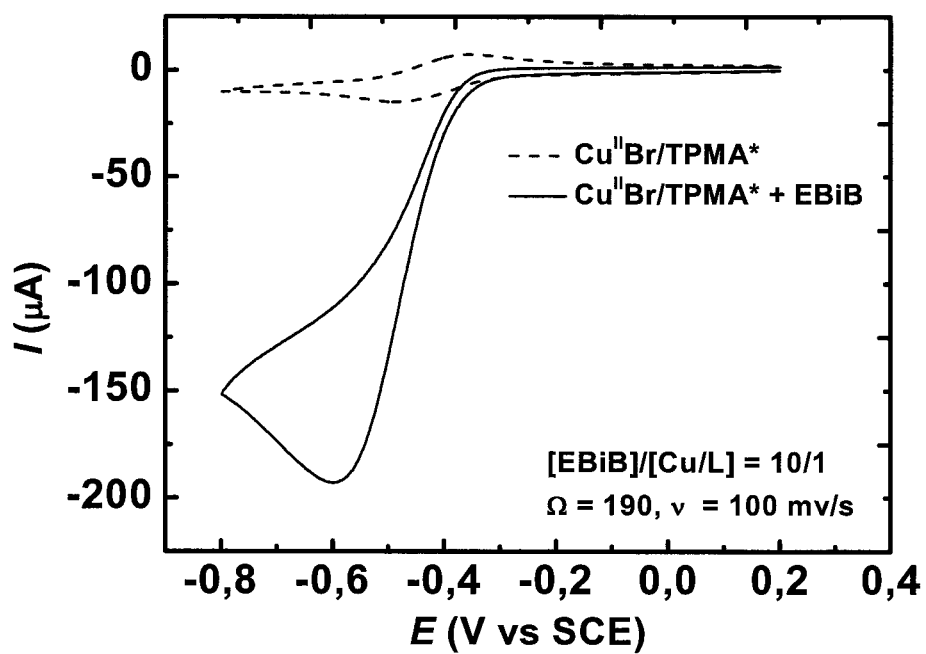

Cyclic voltammetry (CV) is a convenient method to evaluate the catalytic potential of a spectrum of TPMA* ligands in comparison with TPMA ligands. In FIG. 3, the correlation between half-wave potentials ($E_{1/2}$) and $K_{ATRP}$ suggests the novel Cu/TPMA*-3 complex will be highly active. Halidophilicity ($K_{Halido}$) (donor-acceptor formation of the $Cu^{II}$—X bond from $Cu^{II}$ and $X^-$) is indicated by the shift of the CV to more negative E values, FIG. 3A, compare solid line to dashed line, and refers directly to $K_{ATRP}$, in addition the stability constants ($\beta^{II}/\beta^I$) can be calculated from the standard potentials; e.g. the values for TPMA*-3 and bromine are $2.4 \times 10^{20}$ and $3.6 \times 10^4$ respectively. A standard initiator, ethyl α-bromoisobutyrate (EBriB), was utilized to estimate the catalytic potential of the novel catalyst system. FIG. 3B presents the resulting catalytic response against the saturated calomel reference electrode (SCE). The prospective activity of the CuBr/TPMA*-3 system and the $E_{pc}$ of the system with EBriB compared to unsubstituted TPMA can be estimated from the difference of the cathodic peak potential ($E_{pc}$) of (eq 2) as $K_{ATRP}$ basically depends only on halidophilicity ($K_{Halido}$) and on electron transfer ($K_{ET}$).

$$E_{1/2}(CuBr_2/L(V\ vs.\ SCE)) \sim \log(K_{Halido}/K_{ET}) \qquad (2)$$

In addition, a direct comparison of catalytic activity for TPMA and TPMA*-3 was also performed against Ag/AgI reference electrode and confirmed the high activity.

Conversion of monomer was determined with known concentrations of polymers in THF. Absolute values of PMA may be calculated utilizing universal calibration as reported in literature. $^1$H NMR spectra were obtained in d-chloroform using a Bruker 300 MHz spectrometer with a delay time of 3 seconds.

Example 1

Figure 4:
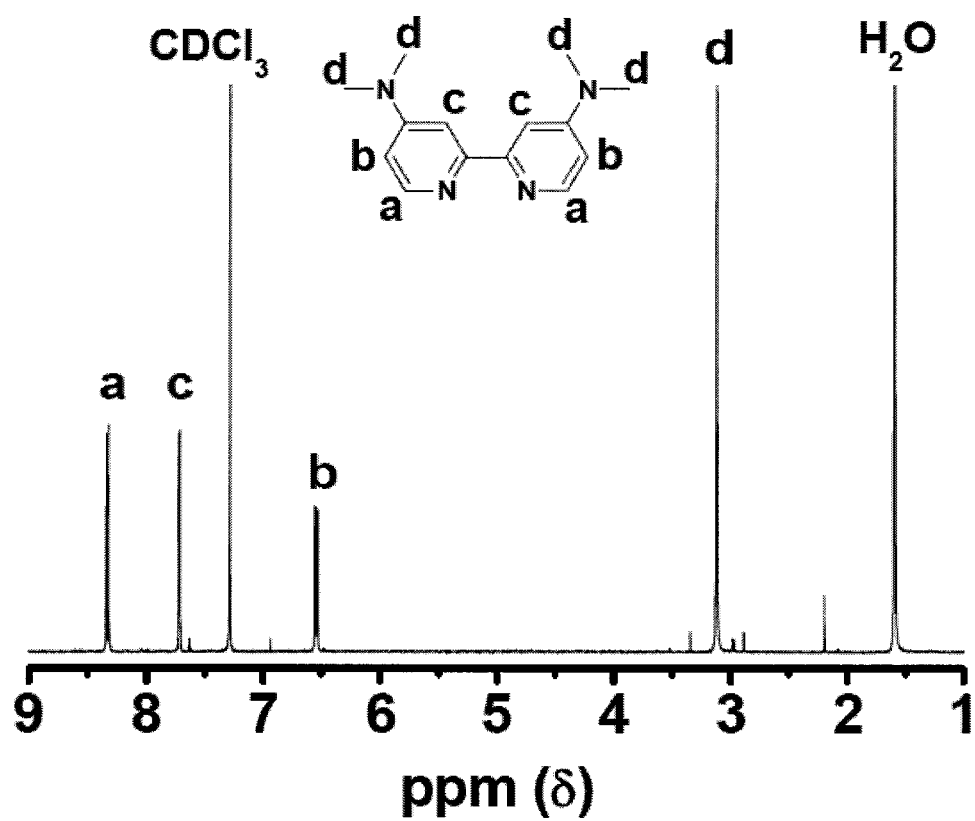
FIG. 4: Displays the NMR spectrum of 4,4'-(dimethylamino)-2,2'-bipyridine.

Synthesis of 4,4'-(Dimethylamino)-2,2'-Bipyridine 4,4'-(Dimethylamino)-2,2'-bipyridine (4,4'-($Me)_2N$-bpy) was prepared in a five step synthesis as shown in Scheme 18. A copy of the $^1$H NMR of the final product is provided in FIG. 4 and the peaks assigned. $^1$H NMR (CDCl$_3$) δ 3.12 (s, 12H), 6.54 (dd, 2H), 7.72 (d, 2H), 8.33 (d, 2H). $^1$H NMR spectra were obtained for all other exemplary ligands discussed herein and the spectra confirmed the expected structures of the ligands.

Scheme 18: Synthesis of 4,4'-($Me_2N$)-bpy.

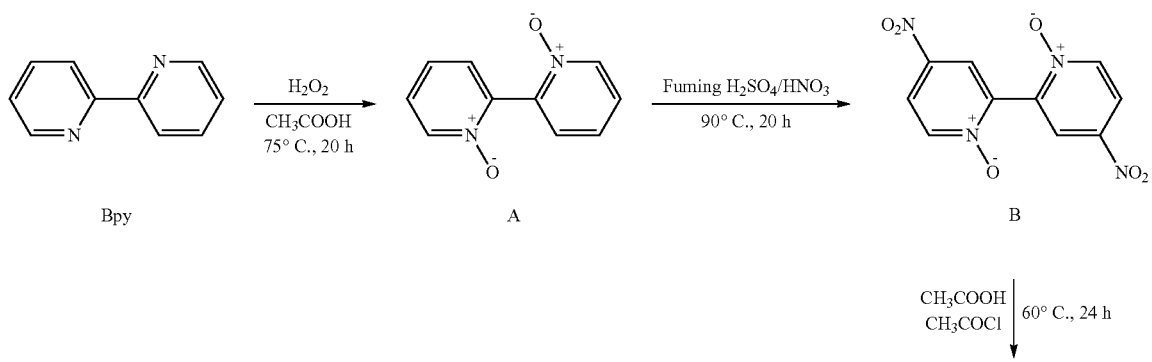

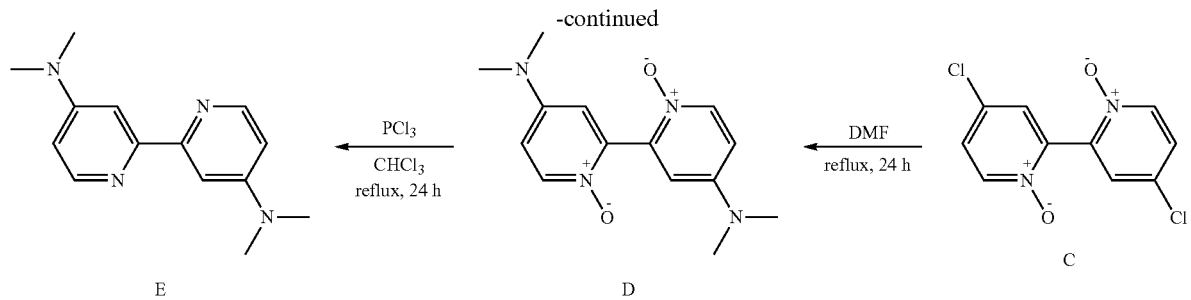

Example 2

Synthesis of Derivatives of TPMA

2A) Synthesis of TPMA*-3

Step 1) Synthesis of 2-Phthalimidomethyl-4-methoxy-3,5-dimethyl-pyridine 3.32 g 2-Chlormethyl-4-methoxy-3,5-dimethyl pyridine hydrochloride was dissolved in 30 ml anhydrous DMF. 1.08 g Potassium phthalimide was added and the solution was stirred for 5 minutes. After the addition of $K_2CO_3$ the mixture was heated under nitrogen at 85° C. for 19 h and then a sample was analyzed by GC-MS. The solution was allowed to cool to room temp. and an off white solid precipitated of solution after adding saturated $NaHCO_3$. The solid was filtered, redissolved in $CH_2Cl_2$, dried over $MgSO_4$ and concentrated in vacuo to give 1.51 g of the pure product as a white solid. $^1H$ NMR and $^{13}C$ NMR confirmed synthesis of the product.

Step 2) Synthesis of 2-Aminomethyl-4-methoxy-3,5-dimethylpyridine

Anhydrous hydrazine (932.8 mg, 30.54 mmol) was added under a $N_2$ atmosphere to a stirred solution of 2-phthalimidomethyl-4-methoxy-3,5-dimethyl-pyridine (1.51 g, 5.099 mmol) in 50 mL (anhydrous: EtOH/toluene=2/1). The mixture was heated to 85° C. for 24 h during which time a white precipitate was formed. After cooling to room temperature the remaining solvent was removed under high vacuum and the residue was dissolved in 46 mL of 40% KOH. After extraction with $CH_2Cl_2$ the solution was dried over $MgSO_4$ and solvent removed to give a quantitative yield of a pale yellow oil (845 mg), which was confirmed to be pure by GC-MS (EI). Afterwards the product was reacted directly with 2-chloromethyl-4-methoxy-3,5-dimethylpyridine hydrochloride. MS (EI) confirmed synthesis of the product.

Step 3) Tris[{(4-methoxy-3,5-dimethyl)-2-pyridyl}methyl]amine (TPMA*-3)

2.66 g of the amine (0.016 mol) and 7.125 g of the chloride (0.0321 mol) (see Scheme 10) and 8.5 g of $Na_2CO_3$ were added to a two necked flask and dissolved in 300 mL HPLC grade acetonitrile. 3 mg of TBABr was added to the stirred solution under nitrogen. The mixture was heated to reflux, T=82° C., under nitrogen then after 48 h samples were taken for mass spectroscopy and TLC. The mixture was allowed to cool to room temperature and poured into 150 mL 1 M NaOH. After extraction with $CH_2Cl_2$, 3 times, the combined organic fractions were dried over $MgSO_4$, filtered and the solvent was evaporated under reduced pressure to give 6.177 g of the crude product as an orange/brown solid. Purification over alumina (MeOH:EtOAc=5:95) gave 3.06 g (41% yield) of a pure yellowish solid whose structure was confirmed by $^1H$ NMR.

2B) Synthesis of TPMA-OMe-3 Derivative, Scheme 10

Step 1) 4-Methoxy-2-picoline N-oxide

4-Nitro-2-picoline N-Oxide (11.30 g, 73.3 mmol) was solved in 450 mL of MeOH. 1.9 g Na (83.2 mmol) was dissolved in 150 mL MeOH and added to the reaction mixture. The mixture was stirred at 60° C. until the reaction was completed (monitored by GC-MS; ~3 h). Afterwards the solution was allowed to cool to room temperature and the volatile organic solvent was evaporated. The methanol was removed by rotary evaporation and the product was dissolved $CH_2Cl_2$. The extract was washed with a saturated aqueous solution of $NaHCO_3$ and dried over $MgSO_4$. 5.98 g (58.7% yield) of a yellowish oil was obtained. $^1H$ NMR confirmed the purity of the product.

Step 2) 2-Hydroxymethyl-4-methoxypyridine

4-Methoxy-2-picoline N-oxide (926 mg, 6.65 mmol) was solved in 20 mL acetic anhydride and was heated reflux and stirred overnight. After the mixture was allowed to cool to r.t. it was neutralized (pH≥9) with saturated $Na_2CO_3$ solution. The brown solution was extracted with $CH_2Cl_2$ three times and $CH_2Cl_2$ was removed by rotary evaporation. The remaining residue was dissolved in an aqueous solution of ~1.2 M HCl (20 mL) and the mixture was heated to 70° C. for 3 h. After cooling to r.t. the mixture was neutralized with saturated $Na_2CO_3$ solution and extracted three times with $CH_2Cl_2$ and dried over $K_2CO_3$. After removal of the volatile compounds 760 mg of a crude brown product were obtained. The crude product was purified by column chromatography (silica, 10% MeOH/90% $CH_2Cl_2$) to give 462 mg (=50%) of the product. $^1H$ NMR and $^{13}C$ NMR confirmed synthesis.

Step 3) 2-Chloromethyl-4-methoxypyridine 5.91 g (49.7 mmol) Thionylchloride was slowly added to a stirred solution of 5.47 g (39.3 mmol) 2-hydroxymethyl-4-methoxypyridine in 150 mL $CH_2Cl_2$. The reaction mixture was allowed to stir overnight and aqueous $Na_2CO_3$ was slowly added until the pH=8-9. The aqueous phase was extracted three times with $CH_2Cl_2$ and the combined organic layer dried over $MgSO_4$ and $CH_2Cl_2$ removed in vacuo. The brownish crude product was purified via column chromatography over silica gel (50% ethyl acetate/50% hexane) to give 3.92 g (63.5%) of clean product confirmed by $^1$H NMR.

Step 4) 2-Phthalimidomethyl-4-methoxypyridine

Potassiumphthalimide (2.167 g, 11.7 mmol) was added to a solution of 1.85 g 2-chlormethyl-4-methoxy-pyridine (11.7 mmol) in 50 ml anhydrous DMF then the solution was stirred for 5 minutes. $K_2CO_3$ (3.236 g, 23.4 mmol) was then added to the mixture and the reaction was heated under nitrogen at 85° C. for two days and the reaction was followed by GC-MS. After complete consumption of the starting material the solution was allowed to cool to room temperature and a white solid precipitated when adding saturated $NaHCO_3$. The off white solid was filtered, resolved in $CH_2Cl_2$, dried over $MgSO_4$ and concentrated in vacuo to give an off-white solid. $^1$H NMR confirmed product synthesis.

Step 5) 2-Aminomethyl-4-methoxypyridine 1.13 g of 2-Phthalimidomethyl-4-methoxypyridine (4.2 mmol) was dissolved in a mixture of toluene/ethanol (15 mL/30 mL) in a three-necked flask and degassed with $N_2$. Anhydrous hydrazine was added dropwise to the solution then the mixture was heated under reflux overnight. The next day the reaction mixture was allowed to cool to room temperature and the remaining solvent was removed by evaporation. Then 50 mL 40% KOH was added to the mixture and then extracted with $CH_2Cl_2$ (3 times), dried over $MgSO_4$, filtered, and the remaining solvent evaporated to give quantitative yield of the crude product, which is directly used afterwards. $^1$H NMR (300 MHz, $CDCl_3$) δ ppm: 8.370 (d, J=5.7 Hz, 1H), 6.825 (d, J=2.6 Hz, 1H), 6.687 (dd, J=5.7 Hz, J'=2.6 Hz, 1H), 3.929 (s, 2H), 3.851 (s, 3H); 1.700 (s, br, 2H).

Step 6) Tris((4-methoxy)-2-pyridyl)methyl-amine (TPMA-OMe-3)

0.582 g of 2-aminomethyl-4-methoxypyridine (4.2 mmol) and 1.327 g (8.4 mmol) of the corresponding chloride and 2.231 g of $Na_2CO_3$ (21.1 mmol) were added to a two necked flask and dissolved in 80 mL HPLC grade $CH_3CN$. 3 mg of TBABr was then added to the stirred solution under nitrogen. The mixture was heated to reflux for two days. The mixture was allowed to cool to room temperature and poured into 50 mL 1 M NaOH. After extraction with $CH_2Cl_2$ (3 times), the combined organic fractions were dried over $MgSO_4$, filtered and the solvent was evaporated under reduced pressure to give a crude brown colored product. The crude product was purified with column chromatography (silica gel, gradient starting from $CH_2Cl_2$:MeOH=97:3) to give 0.788 g (49.4%) of product whose structure was confirmed by $^1$H NMR.

2C) Synthesis of TPMA-NMe$_2$-3 Derivative
Scheme 13

Step 1) 2-Hydroxymethy-4-dimethylaminopyridine

Dimethylamine hydrochloride (17.12 g, 0.21 mol) and NaOH (7.875 g, 0.195 mol) were added to a solution of 2-hydroxymethyl-4-chloropyridine (6 g, 0.042 mol) in 20 mL $H_2O$ in a pressure tube. The mixture was heated to 150° C. for 48 h. Afterwards the solvent was removed by evaporation under high vacuum. The remaining residue was extracted three times with $CH_2Cl_2$, and the combined extracts were dried over $MgSO_4$, filtered and the solvent was evaporated to give the crude product.

Step 2) 2-Hydroxymethyl-4-chloro-pyridine 4.377 g thionylchloride (0.0368 mol) was added dropwise to a stirred solution of 2-hydroxymethyl-4-dimethylamino-pyridine (0.0307 mol) in 150 mL dichloromethane then the mixture was stirred overnight. The next day an aqueous solution of $Na_2CO_3$ was added to the slurry of a brown solid until the pH reached 8-9. The mixture was extracted three times with $CH_2Cl_2$ and the combined extracts dried over $MgSO_4$. 3.23 g (62%%) of the crude product was obtained after removal of the solvent.

Step 3) 2-Chloromethyl-4-chloro-pyridine 11.893 g of 2-hydroxymethyl-4-chloro-pyridine (0.083 mol) was added to 90 mL $CH_2Cl_2$ and stirred at room temperature to form a clear solution. $SO_2Cl$ was then added dropwise to the solution. During the addition procedure a reddish/white precipitate appeared. After stirring overnight the suspension became orange and a solution of $Na_2CO_3$ was added to neutralize the solution and an excess was added until a pH 8-9 was attained. Afterwards the aqueous phase was extracted three times with $CH_2Cl_2$, dried over $MgSO_4$, filtered and the organic solvent was removed by rotary evaporator to give 10.908 g of the crude 2-chloromethyl-4-chloro-pyridine (0.0673 mol) 81.3% yield.

Step 4) 2-Phthalimidomethyl-4-chloropyridine

Potassium phthalimide (21.822 g, 0.1178 mol) was added to a stirred solution of 2-chloromethyl-4-chloro-pyridine (10.908 g, 0.0673 mol) in anhydrous DMF and then the mixture was degassed via bubbling with nitrogen. The mixture was stirred at 88° C. for 50 h under nitrogen. Afterwards the solution was cooled down to room temperature and additional DMF was added to precipitate the product out of saturated $NaHCO_3$ solution. The precipitate was filtered, air dried and dissolved in dichloromethane (DCM). After drying over $MgSO_4$ and removal of the organic solvent a crude white product were obtained. The product was further purified by column chromatography with silica gel.

Step 5)
2-Phthalimidomethyl-4-dimethylaminopyridine 17.86 g of 2-Phthalimidomethyl-4-chloropyridine, 0.22 mol of $(CH_3)_2NH.HCl$ and 40 mL water were added to a pressure tube. Then 8.76 g NaOH (0.22 mol) was added in one lot then the pressure tube was sealed and heated with stirring to 150° C. After 48 h the mixture was allowed to cool to room temperature and the water was removed under high vacuum. $^1$H NMR showed the crude product had some impurities but was directly used in the next step.

Step 6) 2-Aminomethyl-4-dimethylaminopyridine

The crude reaction mixture of 2-phthalimidomethyl-4-dimethylaminopyridine was dissolved in 250 mL MeOH to give a brown clear solution. 4 mL of anhydrous hydrazine were added to this solution and the resulting mixture was heated to reflux under nitrogen overnight. Afterwards the reaction was cooled to room temperature and the reaction mixture was extracted three times with DCM, dried over MgSO$_4$. The DCM was removed by rotary evaporator to give a brownish crude product (730 mg, 13.5%). A second extraction was carried out the next day to give an additional 220 mg (4.1%) of a yellow/brownish product whose structure was confirmed by $^1$H NMR.

2D) Synthesis of TPMA*-2, Scheme 12

Bis-(4-methoxy-3,5-dimethyl-pyridin-2-ylmethyl)-pyridin-2-ylmethyl-amine 1.46 g 2-Picolylamine (13.5 mmol), 6.0 g 2-chloromethyl-4-methoxy-3,5-dimethyl pyridine hydrochloride (27 mmol) and 7.25 g of Na$_2$CO$_3$ were added to a two necked flask and dissolved in 200 mL HPLC grade CH$_3$CN. Then, 3 mg of TBABr were added to the stirred solution under nitrogen. The mixture was heated to reflux and the progress of the reaction was followed by mass spectroscopy and TLC over a 48 h time frame. The mixture was allowed to cool to room temperature and poured into 150 mL 1 M NaOH. After extraction with CH$_2$Cl$_2$ (3 times), the combined organic fractions were dried over MgSO$_4$, filtered and the solvent was removed under reduced pressure to give an orange/brown crude product (m=6.177 g). Purification was carried out be passing a solution of the crude product in a mixture of MeOH:EtOAc=5:95 over alumina resulting in 4.9 g (89%) of a pure yellow oil whose structure was confirmed by $^1$H NMR, $^{13}$C NMR and MS (ESI) m/z: 407.2 [M+H]$^1$.

2E) Synthesis of TPMA*-1, Scheme 11

Step 1) 2-Phthalimidomethyl-4-methoxy-3,5-dimethyl-pyridine 1.55 g 2-Chlormethyl-4-methoxy-3,5-dimethyl pyridine hydrochloride was dissolved in 30 ml anhydrous DMF then 1.08 g of potassium phthalimide was added and the solution was stirred for 5 minutes. After the addition of K$_2$CO$_3$ the mixture was heated under nitrogen at 85° C. for 19 h as the progress of the reaction was followed by GC-MS. The solution was allowed to cool to room temperature and a white solid precipitated after adding saturated NaHCO$_3$. The off white solid was filtered, resolved in CH$_2$Cl$_2$, dried over MgSO$_4$ and concentrated in vacuo to give 1.54 g (75%) of a white solid whose structure was confirmed by $^1$H NMR, $^{13}$C NMR and MS (EI): 298.1 (18), [M+H]$^1$ 297.1 (100), 296.3 (22).

Step 2) 2-Aminomethyl-4-methoxy-3,5-dimethylpyridine

Anhydrous hydrazine (932.8 mg, 30.54 mmol) was added to a stirred solution of 2-phthalimidomethyl-4-methoxy-3,5-dimethyl-pyridine (1.51 g, 5.099 mmol) in 50 mL (anhydrous: EtOH/toluene=2/1) under N$_2$. The mixture was heated to 85° C. for 24 h during which time a white precipitate was formed. After cooling to room temperature the remaining solvent was removed under high vacuum and the residue was dissolved in 46 mL of 40% KOH. After extraction with CH$_2$Cl$_2$ the product was dried over MgSO$_4$ to give a pale yellow oil (quantitative yield 845 mg), which was confirmed to be pure by GC-MS (EI). Afterwards the product was reacted directly with 2-Chloromethyl-4-methoxy-3,5-dimethylpyridine hydrochloride. MS(EI) m/z: 167(100) [M+H]$^+$, 166(52), 165(16), 151(48), 149(41), 138 (22), 136(10), 123(14), 122(25), 121(16), 120(10), 119(17), 107(13), 106(16), 94(14), 92(14), 77(12).

Step 3) (4-Methoxy-3,5-dimethyl-pyridin-2-ylmethyl)-bis(pyridin-2-ylmethyl)-amine (TPMA*-1)

1.53 g of 2-aminomethyl-4-methoxy-3,5-dimethylpyridine (0.0092 mol), 3.014 g 2-chloromethyl-4-methoxy-3,5-dimethylpyridine hydrochloride (0.0184 mol) and 4.9 g of Na$_2$CO$_3$ were added to a two necked flask and dissolved in 300 mL HPLC grade CH$_3$CN. Then 3 mg of TBABr were added to the stirred solution under nitrogen. The mixture was heated to reflux (T=82° C.) under nitrogen and the progress of the reaction was followed by mass spectroscopy and TLC over 48 h. The mixture was allowed to cool to room temperature and poured into 150 mL 1 M NaOH. After extraction with CH$_2$Cl$_2$ (4 times), the combined organic fractions were dried over MgSO$_4$, filtered and the solvent was evaporated under reduced pressure to give an orange/brown crude product (m=3.24 g). Purification was accomplished by passing a solution of the crude product in a mixture of MeOH:EtOAc=5:95 over alumina to yield 2.6 g (81%) of a pure yellowish oil whose structure was confirmed by $^1$H NMR, $^{13}$C NMR and MS (ESI) m/z: 349.2 [M+H]$^1$.

Characterization

Electrochemical Analysis of TPMA* Catalyst Complexes.

The experimental and calculated data and comparison with TPMA are summarized in Table 4 and illustrated FIG. 3. First the CV of the Cu(OTf)$_2$ complex formed with TPMA*-3 ligand was measured in a 1:1 ratio (solid line) followed by addition of tetrabutylammonium bromide (TBABr) as Br source (dashed line), FIG. 3A. Finally the initiator EBiB (=ethyl 2-bromoisobutyrate) was added (black line), FIG. 3B. Known literature data was used for comparison with the unsubstituted TPMA ligand. Table 4 shows that the relative stability constants constantly increase from TPMA<TMPA*-1<TPMA-OMe<TPMA*-2<TPMA*-3 indicating an increasingly stronger stabilization of the Cu$^{II}$ oxidation state. Remarkably the activity of Cu/TPMA* is three orders of magnitude higher then for normal Cu/TPMA, previously one of the most active ATRP catalysts. The catalyst complex was expected to be too active for a "normal" ATRP therefore polymerization of butyl acrylate was conducted under low catalyst conditions.

Stopped Flow Measurement of K$_{ATRP}$.

With the development of more and more active ligands, it is necessary at some point to go to faster and faster time-resolved spectroscopic techniques in order to obtain accurate values for k$_a$ and K$_{ATRP}$ which is required for transition metal complexes formed with these novel ligands as predicted by non-time resolved techniques such as CV. Stopped flow techniques are the only way to determine the speed of very fast thermally-initiated bimolecular reactions. All measured K$_{ATRP}$ values are summarized in Table 5.

TABLE 5

Values measured for $K_{ATRP}$ with copper complexes formed with different ligands

| Ligand | TPMA | TPMA | TPMA*-1 | TPMA*-2 | TPMA*-3 | TPMA-OME | Me$_6$TREN |
|---|---|---|---|---|---|---|---|
| Solvent | MeCN | MeCN | MeCN | MeCN | MeCN | MeCN | DMSO |
| Initiator | EBiB | MBP | MBP | MBP | MBP | MBP | MBP |
| $k_t$ | $2.5E^9$ | $3.5E^9$ | $3.5E^9$ | $3.5E^9$ | $3.5E^9$ | $3.5E^9$ | $0.8E^9$ |
| $K_{ATRP}$ | $8E^{-6}$ | | $1.8E^{-6}$ | $2E^{-5}$ | $5E^{-4}$ | $8E^{-6}$ | $2E^{-4}$ |
| Tang[a] | $9E^{-6}$ | $3.2E^{-7}$ | | | | | $3E^{-6}$ (MeCN) |

[a]Values from Tang et al. *J. Am. Chem. Soc.* 2006, 128, 1598-1604.

Determination of Values for $k_a$.

Figure 5:
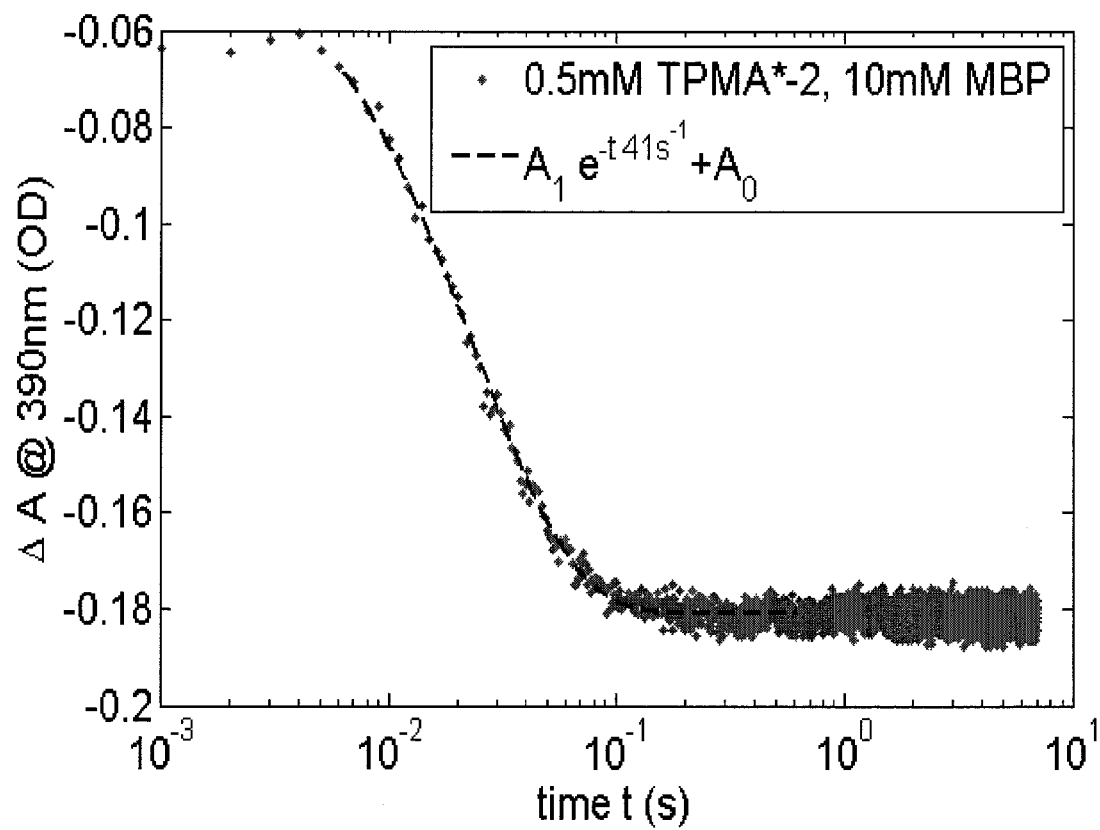
FIG. 5. Shows stopped flow measurement of $k_a$ using TPMA*-2 ligand.
Figure 6A:
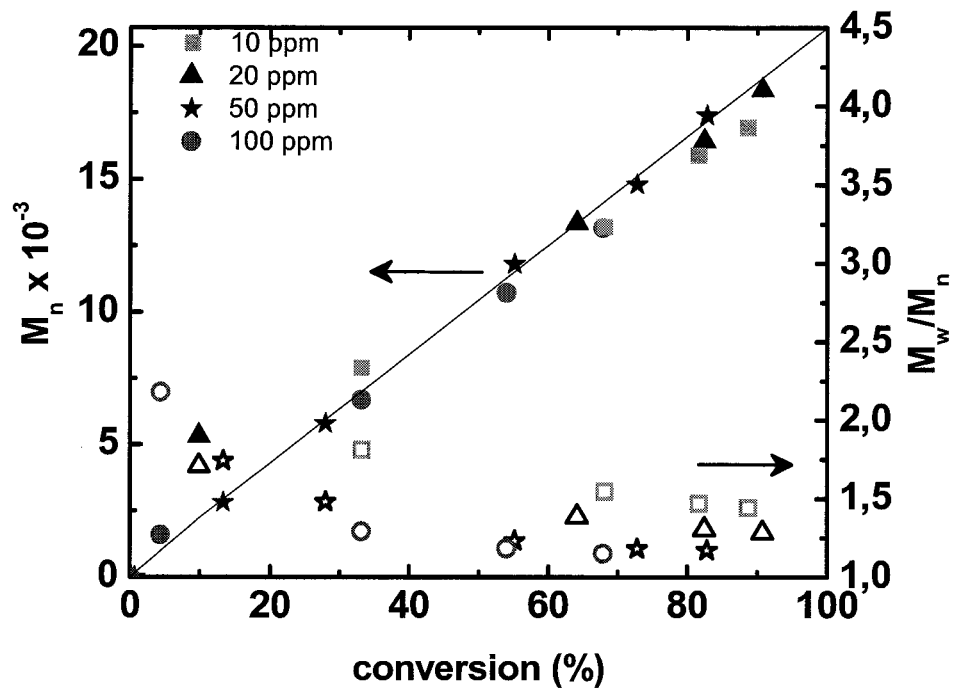
FIG. 6A shows the relationship between conversion (%), molecular weight ($M_n$), and molecular weight distribution ($M_w/M_n$).
Figure 6B:
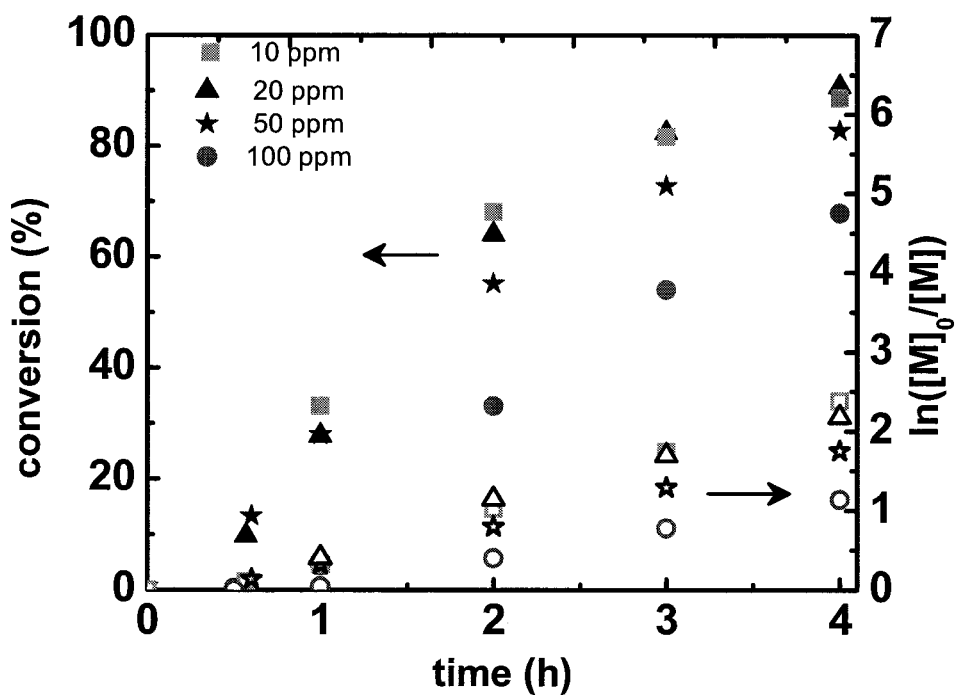
FIG. 6B shows the relationship between reaction time, conversion (%) and first-order kinetics plot (ln([M]$_0$/[M]).

When measuring $k_a$, one syringe was filled with Cu$^I$/L and 20 fold excess TEMPO. The second syringe was filled with RX, usually a 10 or 20 fold excess compared to the Cu$^I$/L. A typical result of the measurement is provided in FIG. 5 which shows very good mono-exponential behavior. The following values were obtained for $k_a$ with substituted TPMA ligands (Table 6). One can see that $K_{ATRP}$ is not only influenced by a changes in $k_a$ but also by $k_d$ for the TPMA* series. It seems that there is a factor of 4 increase in activity and a factor of 1.5 to 4 decrease in $k_d$.

TABLE 6

Measured $k_a$ Values

| | TPMA | TPMA | TPMA*-1 | TPMA*-2 | TPMA*-3 | TPMA-OME | Me$_6$TREN |
|---|---|---|---|---|---|---|---|
| Solvent | MeCN | MeCN | MeCN | MeCN | MeCN | MeCN | DMSO |
| Initiator | EBiB | MBP | MBP | MBP | MBP | MBP | MBP |
| $k_t$ | $2.5E^9$ | $3.5E^9$ | $3.5E^9$ | $3.5E^9$ | $3.5E^9$ | $3.5E^9$ | $0.8E^9$ |
| $K_{ATRP}$ | $8E^{-6}$ | | $1.8E^{-6}$ | $2E^{-5}$ | $5E^{-4}$ | $8E^{-6}$ | $2E^{-4}$ |
| Tang | $9E^{-6}$ | $3.2E^{-7}$ | | | | | $3E$ (MeCN) |
| $k_a$ | 1000 | 125 | 500 | 2100 | 8400 | 1200 | 660 |
| $k_a$ Tang | 31.2 | 3.8 | | | | | 227 (MeCN) |
| $k_d$ | $1.2E^8$ | $3.9E^8$ | $2.7E^8$ | $1E^8$ | $1.7E^7$ | $1.5E^8$ | $3.3E^6$ |

Example 3

ATRP with Low Concentrations of Catalyst with Designed Ligands

3A) ICAR ATRP with Various Members of the TPMA* Family of Ligands

In light of the expected high rate of polymerization and based on PREDICI® simulation, ICAR ATRP appeared to be a very promising approach for a well controlled ATRP with the novel catalyst Cu/TPMA*-3. Conditions for the polymerizations were taken from PNAS 2006, 103, 15309-15314. The ratio of reagents used in each reaction were: [BA]:[EBiB]:[AIBN]:[TPMA*-X]:[CuCl$_2$]=[160]:[1]:[0.2]:[0.03]:[0.008], with [BA]=5.88M, 20% (v/v) anisole with the ratio of Cu:TPMA*-X held constant=1:3.75, conversion was determined by $^1$H-NMR, and the reactions were conducted at T=60° C. Table 7 summarize all data obtained for the ICAR ATRP experiments at 50 ppm catalyst loading.

TABLE 7

ICAR ATRP of BA conducted with 50 ppm catalyst loading for TPMA and all TPMA* derivatives listed in Schemes 6 and 7:

| Ligand[a] | Conv.(4 h) [%] | Time [h] | $M_{n, theo}$[b] | $M_{n, GPC}$ | $M_w/M_n$ |
|---|---|---|---|---|---|
| TPMA | 38 | 4 | 8000 | 8230 | 1.67 |
| TPMA*-1 | 87.5 | 4 | 18150 | 18800 | 1.32 |
| TPMA*-2 | 82.9 | 4 | 17200 | 17650 | 1.17 |

TABLE 7-continued

ICAR ATRP of BA conducted with 50 ppm catalyst loading for TPMA and all TPMA* derivatives listed in Schemes 6 and 7:

| Ligand[a] | Conv.(4 h) [%] | Time [h] | $M_{n, theo}$[b] | $M_{n, GPC}$ | $M_w/M_n$ |
|---|---|---|---|---|---|
| TPMA*-3 | 82.8 | 4 | 17200 | 17400 | 1.17 |
| TPMA-OMe-3 | 50.3 | 4 | 10500 | 11700 | 1.19 |

[a]Conditions: [BA]:[EBiB]:[AIBN]:[TPMA*-X]:[CuCl$_2$] = [160]:[1]:[0.2]:[0.03]:[0.008], [BA] = 5.88M, 20% (v/v) anisole, the Cu:TPMA*-X = 1:3.75 ratio was held constant, conversion was determined by $^1$H-NMR, T = 60° C.
[b]$M_{n, theo}$ = [M]/[I] × conv. × $M_{Monomer}$ + $M_{Initiator}$.

The results clearly show that the level of control, evaluated by breadth of $M_w/M_n$, increased as the activity of the catalyst systems increased. TPMA*-3 gave the best control with 50 ppm catalyst loading. The measured $M_w/M_n$ was reduced as one transitioned from TPMA to TPMA*-3 and correlation between $M_{n,theo}$ to $M_{n,exp}$ increased. TPMA-OMe-3 differed from TPMA*-2 in terms of conversion (Δ=30%) and $k_{app}$ (0.298 hr$^{-1}$ vs 0.455 hr$^{-1}$), which would be expected from very similar estimated $K_{ATRP}$ (TPMA*-2)=100 and $K_{ATRP}$ (TPMA-OMe3)=120 (compared to TPMA). These results correlate well with the values for the polymerization rate constants determined by stopped flow measurements. A series of ICAR ATRP reactions were then conducted with 10 ppm catalyst (Table 8).

TABLE 8

ICAR ATRP at 10 ppm catalyst loading.

| Ligand[a] | Conv. [%] | Time [h] | $M_{n,theo}$[c] | $M_{n,GPC}$ | $M_w/M_n$ | $k_{app}$ [hr$^{-1}$] |
|---|---|---|---|---|---|---|
| TPMA | 86.1 | 3 | 17900 | 27300 | 3.1 | — |
| TPMA*-1 | 92.1 | 4 | 19100 | 21700 | 1.54 | 0.75 |

TABLE 8-continued

ICAR ATRP at 10 ppm catalyst loading.

| Ligand[a] | Conv. [%] | Time [h] | $M_{n,theo}$[c] | $M_{n,GPC}$ | $M_w/M_n$ | $k_{app}$ [hr$^{-1}$] |
|---|---|---|---|---|---|---|
| TPMA*-2 | 88.2 | 4 | 18300 | 21100 | 1.53 | 0.57 |
| TPMA*-3 | 88.7 | 4 | 18400 | 16900 | 1.44 | 0.59 |
| TPMA-OMe3 | 87.8 | 4 | 18200 | 18500 | 1.52 | 0.64 |

[a]Conditions: [BA]:[EBiB]:[AIBN]:[TPMA*-X]:[CuCl$_2$] = [160]:[1]:[0.2]:[0.006]:[0.0016], [BA] = 5.88M, 20% (v/v) anisole, the Cu:TPMA*-X = 1:3.75 ratio was held constant, conversion was determined by $^1$H-NMR, T = 60° C.;
[b]$M_{n,theo}$ = [M]/[I] × conv. × $M_{Monomer}$ + $M_{Initiator}$.

Reactions conducted with 10 ppm catalyst loading more clearly show the differences between the ligands than reactions conducted with 50 ppm catalyst. While pseudo first order kinetic plots gave similar values for the rates of polymerization, the $M_{n,exp}$ vs $M_{n,theo}$ analysis reveals a certain discrepancy and slight differences can be detected in $M_w/M_n$ with the results with TPMA*-3 providing the narrowest value indicating the highest level of control at this low level of catalyst.

3B) ARGET ATRP with TPMA*-3

The first attempt to conduct an ARGET polymerization of butyl acrylate (nBA) in anisole (20% v/v) (Conditions from *Angew. Chem.* 2006, 118, 4594-4598) was performed with a catalyst loading of 50 ppm copper. Cu$^{II}$Cl$_2$ was used as the copper source with an excess of TPMA*-3 ligand (Cu:TPMA*-3=1:3.75). The ratio of reagents were: [nBA]:[EBiB]:[Sn(EH)$_2$]:[TPMA*-3]:[CuCl$_2$]=[160]:[1]:[0.1]:[0.03]:[0.008]. The concentration of [BA] was 5.88M (5 mL scale) and the polymerization was performed at 60° C. (Table 9, entry 1). The result showed a fast well controlled polymerization. A polymerization carried out under "normal" ATRP conditions with TPMA as ligand resulted in a maximum of 71% conversion after 22 h, however a lower PDI=1.16 was observed for the ARGET ATRP with TPMA*-3. Therefore the system was further optimized to achieve both a fast polymerization and lower polydispersity. First the temperature was reduced to 40° C. whereas all other parameters were held constant then the amount of reducing agent was decreased.

TABLE 9

ARGET ATRP of nBA and MA with Sn(EH)$_2$ as reducing agent and SARA with Cu(0).

| Entry[a] | [M] | [Sn(EH)$_2$] | Cat. Loading[b] [ppm] | T [° C.] | t[min] | Conv. [%] | $M_{n,GPC}$ | $M_{n,theo}$[c] | $M_w/M_n$ |
|---|---|---|---|---|---|---|---|---|---|
| 1 | 160 | 0.1 | 50 | 60 | 1260 | 80 | 16600 | 16400 | 1.16 |
| 2[d] | 160 | 0.1 | 50 | 60 | 1260 | 60 | 14410 | 12300 | 1.12 |
| 3 | 160 | 0.2 | 100 | 60 | 310 | 72 | 11000 | 15800 | 1.15 |
| 4 | 160 | 0.2 | 100 | 60 | 1260 | 91 | 20100 | 18900 | 1.09 |
| 5 | 160 | 0.1 | 50 | 40 | 1260 | 70 | 16020 | 14600 | 1.18 |
| 6 | 160 | 0.05 | 50 | 60 | 1260 | 72 | 16300 | 14900 | 1.16 |
| 7 | 2000 | 0.1 | 50 | 60 | 2730 | 27 | 29500 | 70500 | 1.29 |
| 8[e] | 200 | n.d. | n.d. | 25 | 70 | 44 | 8380 | 7590 | 1.49 |
| 9[e] | 200 | n.d. | n.d. | 25 | 120 | 54 | 10850 | 9290 | 1.19 |
| 10[d,e] | 200 | n.d. | n.d. | 25 | 120 | 44 | 9110 | 7570 | 1.44 |

[a]ARGET ATRP conditions:[nBA]:[EBiB]:[Sn(EH)2]:[TPMA*]:[CuCl2] = 160:1:0.1:0.03-0.06:0.008-0.016, [nBA] = 5.88M, 20% (v/v) anisole, conversion was determined either by $^1$H-NMR or gravimetry.
[b]molar ratio of CuCl$_2$ to monomer;
[c]$M_{n,theo}$ = [M]/[I] × conv. × MWMonomer + MWInitiator;
[d]TPMA was used instead of TPMA*;
[e]SARA ATRP conditions were changed to: [MA]:[MBP]:[TPMA*] = [200]:[1]:[0.1], [MA] = 7.4M, with Cu(0) wire (d = 1 mm) 33.3% (v/v) DMSO, T = 25° C.,
n.d. = not defined.

Under ARGET conditions the Cu/TPMA*-3 catalyst showed a major increase in reactivity compared to normal TPMA, Table 9, entries 1 and 2. Increasing the amount of reducing agent and catalyst to 0.2 equivalents and 100 ppm respectively, conversion increased to 91% and excellent correlations of experimental ($M_{n,exp}$) and theoretical molecular weights ($M_{n,theo}$) were achieved. In addition with only 50 ppm of catalyst and only 0.05 equivalents of Sn(EH)$_2$, 72% conversion was observed with controlled radical polymerization behaviour.

The novel catalyst system shows its full potential when targeting higher degrees of polymerization, Table 9, entry 7. The Cu/TPMA*-3 catalyst complex achieved a conversion of 30% polybutylacrylate with narrow polydispersity, in contrast to the currently most active ARGET system, based on Cu/Me$_6$TREN, which showed no conversion. However, lower $M_{n,exp}$ than $M_{n,theo}$ implies that a certain amount of chain transfer occurred during the reaction. Thus, Cu(0) wire was utilized as reducing agent and supplementary activator, SARA ATRP.

3C) SARA ATRP

The results of SARA reactions carried out according to previously reported conditions [*Macromolecules* 2012, 45, 78-86] are provided in Table 9, entries 8-10. Again, the polymers prepared with the TPMA*-3 based catalyst gave, in addition to higher conversion, significantly better control over molecular weight distributions (compare $M_w/M_n$ (TPMA*-3)=1.19 to $M_w/M_n$ (TPMA)=1.44).

3D) eATRP

A series of eATRP reactions of BA with 100 ppm catalyst loading were performed. The applied potential ($E_{app}$) was chosen to be 80 mV past the cathodic peak potential ($E_{pc}$). [BA]/[EBiB]/[TPMA*]/[$Cu^{II}(OTf)_2$]/[TBABr]=300/1/0.03/0.03/0.03. Controlled-potential electrolysis experiments were carried out with a PARC 263A potentiostat in a thermostated three-electrode cell using both platinum (Pt) disk (3 mm diameter, Gamry) and Pt gauze (100 mesh, geometrical area ~2.5 cm$^2$, Alfa Aesar) working electrodes. An Ag/AgI/I$^{-[6]}$ and Pt mesh were used as the reference and counter electrodes, respectively. The electrolysis experiments were carried out in a divided cell, using a glass frit and a salt bridge made of methylcellulose gel saturated with $Et_4NBF_4$ to separate the cathodic and anodic compartments. All experiments were performed at 25° C. During electrolysis, the cathodic compartment was maintained under vigorous magnetic stirring and an $N_2$ atmosphere. Prior to each experiment, the working Pt disk electrode was polished with a 0.25-µm diamond paste and sonicated in ethanol. The electrochemical cell was first charged with supporting electrolyte (1.603 g TBAClO$_4$) and then put under a slow $N_2$ flow. After 15 minutes of purging, 13 mL of BA, 10 mL of DMF, 0.18 mL of a 0.05 M solution of $Cu^{II}$/TPMA*/TBABr (equimolar), and 45 µL of neat EBiB were added to the electrochemical cell. Samples were withdrawn periodically for $^1$H NMR and GPC analysis for conversion, and molecular weight and distribution determination, respectively. There was a longer inhibition period with TPMA*-3 but the actual polymerization was faster and $M_{n,GPC}$ was closer to $M_{n,theor}$.

Example 4

Application Cu/TPMA*-3 Targeting High DP

An ARGET ATRP targeting a DP=2000 was conducted with 10 ppm Cu/TPMA* and a ratio of reagents: [BA]:[EBiB]:[Sn(EH)$_2$]:[$Cu^{II}Cl_2$]:[TPMA*/Me$_6$TREN]=[2000]:[1]:[0.1]:[0.02]:[0.075] in anisole 20% (v/v) and T=60° C. The results of ARGET ATRP reactions conducted with ligands TPMA*-3 and Me$_6$TREN are shown in Table 10 and demonstrate that the TPMA*-3 based catalyst complex provided a controlled polymerization while the Me$_6$TREN catalyst was not active in such dilute conditions.

TABLE 10

Comparison of ARGET ATRP reactions targeting high degrees of polymerization with two active ligands.

| | Time (h) | Conv.(NMR) [%] | $M_{n,GPC}$ | $M_{n,theo}$ | PDI |
|---|---|---|---|---|---|
| TPMA*-3 | 45.5 | 27.4 | 29500 | 70500 | 1.29 |
| TPMA*-3 | 79.6 | 29.2 | 29700 | 75000 | 1.34 |
| Me$_6$TREN | 79.6 | 18.6 | No polymer | No polymer | No polymer |

Example 5

Polymerization of N-VinylPyrrolidone with the Cu/TPMA*-3 System

5A) ICAR ATRP

The conditions selected for ICAR ATRP of N-Vinylpyrrolidone (NVP) employed a mole ratio of reagents: [NVP]:[MClP]:[AIBN]:[Cu]:[TPMA*-3]=[100]:[1]:[0.2]:[0.02]:[0.04]. Polystyrene standards were used for the GPC and provided the following information, after 6 hr conversion was 55.9% and the polymer had a polydispersity of 1.37. Continuing the reaction for 21 hr provided 94.4% conversion and a polymer with a polydispersity of 1.18.

5B) Normal ATRP

NVP polymerization with the Cu/TPMA*-3 system under normal ATRP conditions were also examined as it seemed to be the better match for a less active monomer such as NVP. The conditions selected for the normal ATRP of NVP were the following: [NVP]:[MCP]:[Cu(I)]:[Cu(II)]:[TPMA*-3]= [100]:[1]:[0.2]:[0.02]:[0.22]; T=50° C., DMF (20%). Conversion was determined by $^1$H-NMR and provided a linear increase in molecular weight with conversion reaching 45% in 3 hr.

Example 6

ATRP of n-BA Using BPMODA and BPMODA* as Ligands

6A) Synthesis of BPMODA*

The procedure is shown schematically in Scheme 4 and shows the dialkylation of 1-octadecylamine (OD-NH$_2$) with 2-(chloromethyl)-3,5-dimethyl-4-pyridinyl methyl ether hydrochloride (PyCl.HCl) in the presence of a base. Pyridine hydrochloride was dissolved in water followed by addition of 5.3 N NaOH$_{aq.}$ and then a solution of octadecylamine (OD-NH$_2$) in DCM. The mixture was stirred overnight; NaOH solution was added to maintain the pH at ~8-9. Reaction progress was monitored by $^1$H NMR. After one week there was 95% conversion of starting materials, therefore, the reaction was allowed to stir for one more week allowing for higher conversion. The reaction was stopped after two weeks at >98% conversion of reactants. The organic layer was separated, washed with 15% NaOH$_{aq.}$ and dried with anhydrous MgSO$_4$ and solvent was removed. Yellowish crystals of BPMODA* were obtained. $^1$H NMR confirmed the formation of BPMODA* ligand. $^1$H NMR (300 MHz, CDCl$_3$) δ: 0.85 (t, 3H, CH$_2$Me), 1.00-1.22 (m, 30H, (CH$_2$)$_{15}$Me), 1.40 (m, 2H, CH$_2$CH$_2$(CH$_2$)$_{15}$Me), 2.04 (s, 6H, 5-Py-CH$_3$), 2.18 (s, 6H, 3-Py-CH$_3$), 2.42 (m, 2H, CH$_2$CH$_2$(CH$_2$)$_{15}$Me), 3.63 (s, 4H, 2-Py-CH$_2$), 3.67 (s, 6H, 4-Py-OCH$_3$), 8.11 (s, 2H, 5-PyH),

6B) BPMODA* for a Normal ARGET ATRP of Butyl Acrylate

Figure 7A:
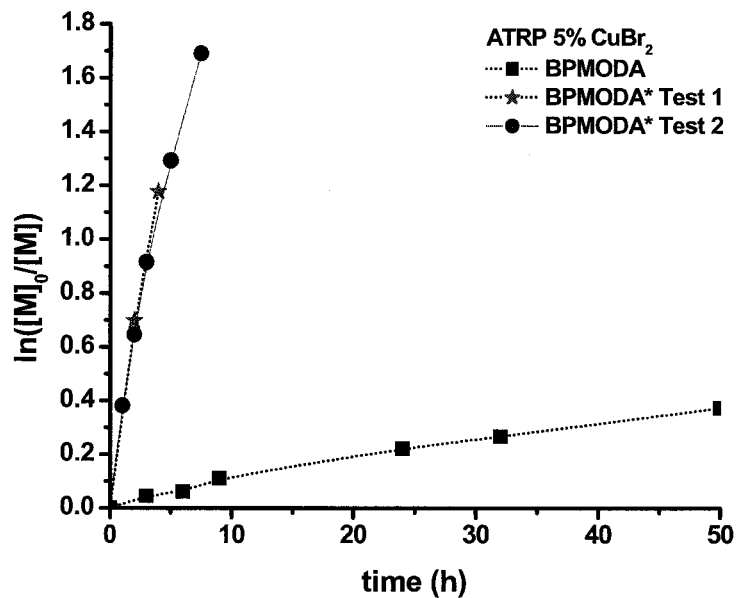
FIG. 7A illustrates a first-order kinetic plot and FIG. 7B shows evolution of molecular weight with monomer conversion for controlled polymerizations conducted with BPMODA and BPMODA* ligands.
Figure 7B:
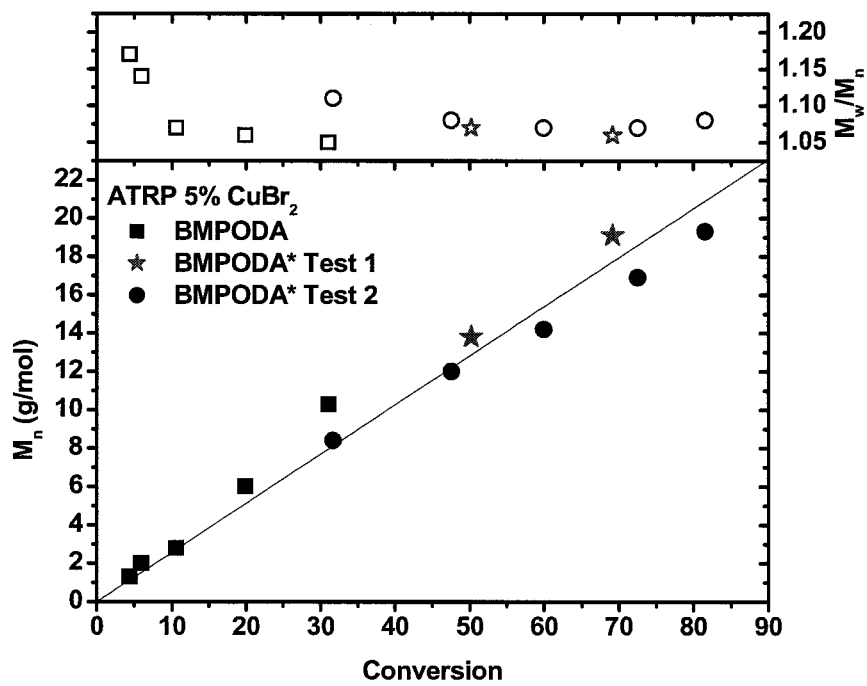

The reaction conditions are given in Table 11. From both the plots in FIG. 7 it is evident that while there is a difference in the level of control between the two polymerizations, it is small. BPMODA does show poorer initiation efficiency in comparison to BPMODA* but the polymerizations conducted with BPMODA* were faster.

TABLE 11

Reaction conditions and results for ARGET-ATRP of poly(butyl acrylate) using BPMODA and BPMODA*.

| Entry | nBA | EBiB | CuBr | CuBr$_2$ | Ligand | T(h) | Conv. | M$_{n,GPC}$ | M$_{n,Th}$ | MWD |
|---|---|---|---|---|---|---|---|---|---|---|
| BPMODA  | 200 | 1 | 0.80 | 0.20 | 1 | 48  | 0.56 | 14500 | 14 400 | 1.04 |
| BPMODA* | 200 | 1 | 0.80 | 0.20 | 1 | 24  | 0.88 | 17900 | 22 600 | 1.08 |
| BPMODA  | 200 | 1 | 0.95 | 0.05 | 1 | 50  | 0.31 | 10300 | 8 000  | 1.05 |
| BPMODA* | 200 | 1 | 0.95 | 0.05 | 1 | 7.5 | 0.82 | 19300 | 20 900 | 1.08 |
| BPMODA  | 200 | 1 | 0.99 | 0.01 | 1 | 48  | 0.63 | 12800 | 16000  | 1.13 |
| BPMODA* | 200 | 1 | 0.99 | 0.01 | 1 | 6   | 0.84 | 18400 | 21400  | 1.09 |

To gain a better perspective on the rate of polymerization differences between the ligands, normal ATRP was utilized. Three different ratios of Cu$^I$Br to Cu$^{II}$Br$_2$ were be used to determine the effect of ligand on the rates of polymerization: 80:20, 95:5, and 99:1 of CuBr:CuBr$_2$. The first polymerization tested utilized a ratio of 95:5 of CuBr to CuBr$_2$; reaction conditions are given in Table 12.

TABLE 12

Reaction conditions for ATRP of n-BA with BPMODA and BPMODA* as ligands.

| Entry$^a$ | nBA | EBiB | CuBr | CuBr$_2$ | Ligand | t (h) | Conv. | M$_{n,GPC}$ | M$_{n,Th}$ | MWD |
|---|---|---|---|---|---|---|---|---|---|---|
| BPMODA  | 200 | 1 | 0.95 | 0.05 | 1 | 50 | 0.31 | 10300 | 8000  | 1.05 |
| BPMODA* | 200 | 1 | 0.95 | 0.05 | 1 | 4  | 0.69 | 19100 | 17700 | 1.06 |

$^a$Polymerization conducted in 20% anisole at 60° C.

As expected, the reaction with a copper complex containing the BPMODA* ligand reacted at a much faster rate than BPMODA. The reaction with BPMODA as ligand reached 30% monomer conversion in 50 h, while the complex containing BPMODA* reached nearly 70% monomer conversion in only 4 h. Regardless of time, both polymers showed linear first-order kinetics and narrow molecular weight distributions. These results correlate with the K$_{ATRP}$ values obtained from the CV.

6C) Miniemulsion ATRP

Partition experiments were conducted to confirm that the Cu/BPMODA* complex remained in the organic layer in the presence of water and it was determined that even at low concentrations of Cu the bulk of the copper remained in the organic layer. The conditions employed for the miniemulsion polymerization are reported in Table 13.

TABLE 13

Reaction conditions for miniemulsion ARGET-ATRP of n-BA with BPMODA and BPMODA* as ligands.

| Entry | nBA | EBiB | CuBr$_2$ (ppm) | Ligand | Ascorbic Acid (AA) |
|---|---|---|---|---|---|
| BPMODA  | 200 | 1 | 0.01 (100) | 0.1 | 0.2 |
| BPMODA* | 200 | 1 | 0.01 (100) | 0.1 | 0.2 |

[Brij98]/[Hexadecane] = 2.3/3.6 wt % vs n-BA; 20% solid content; T = 80° C.

Figure 8A:
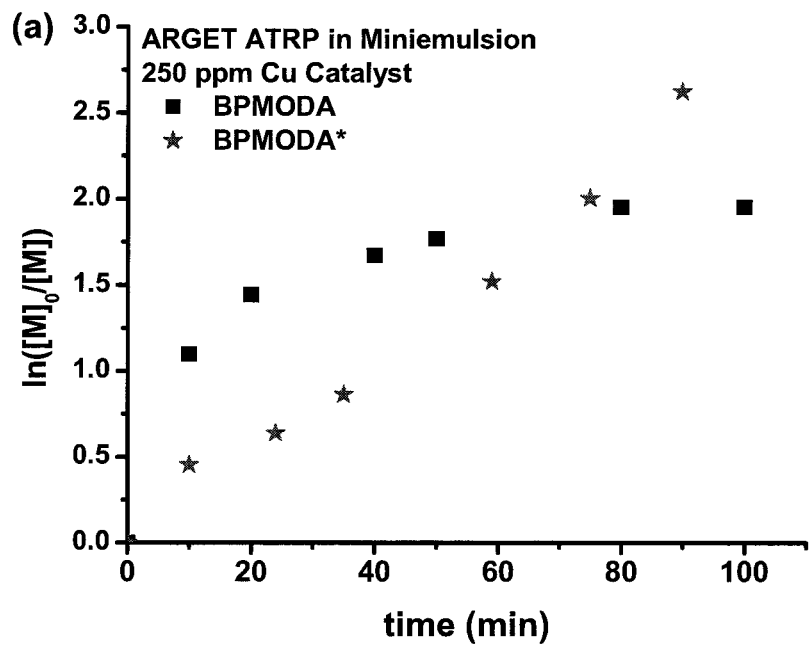
FIG. 8A illustrates a first-order kinetic plot and FIG. 8B shows evolution of molecular weight and $M_w/M_n$ with conversion for ARGET miniemulsion ATRPs of n-BA with catalysts formed with BPMODA and BPMODA*. $^a$[n-BA]:[EBiB]=200:1, [Brij98]/[Hexadecane]=2.3/3.6 wt % vs n-BA, T=80° C.
Figure 8B:
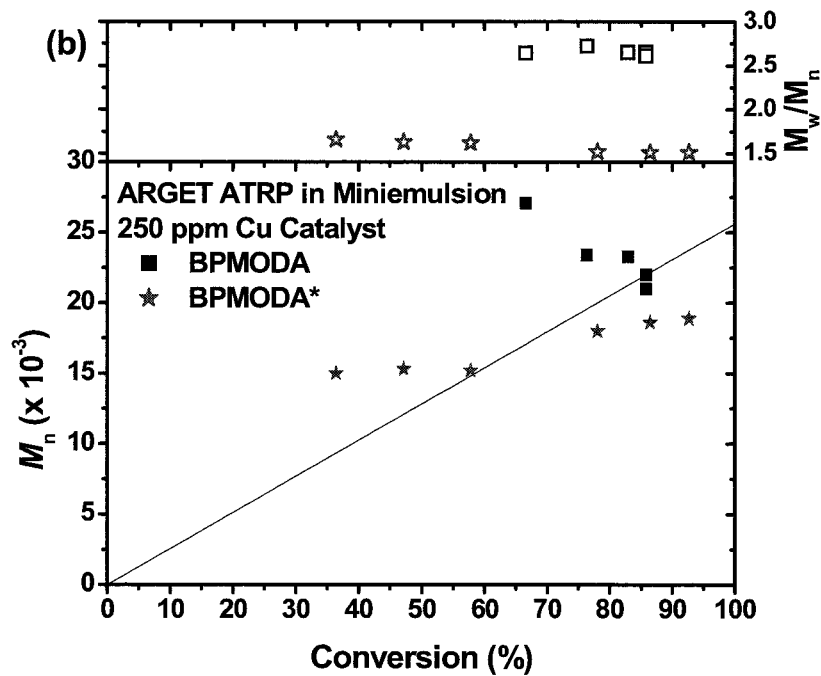
Figure 10:
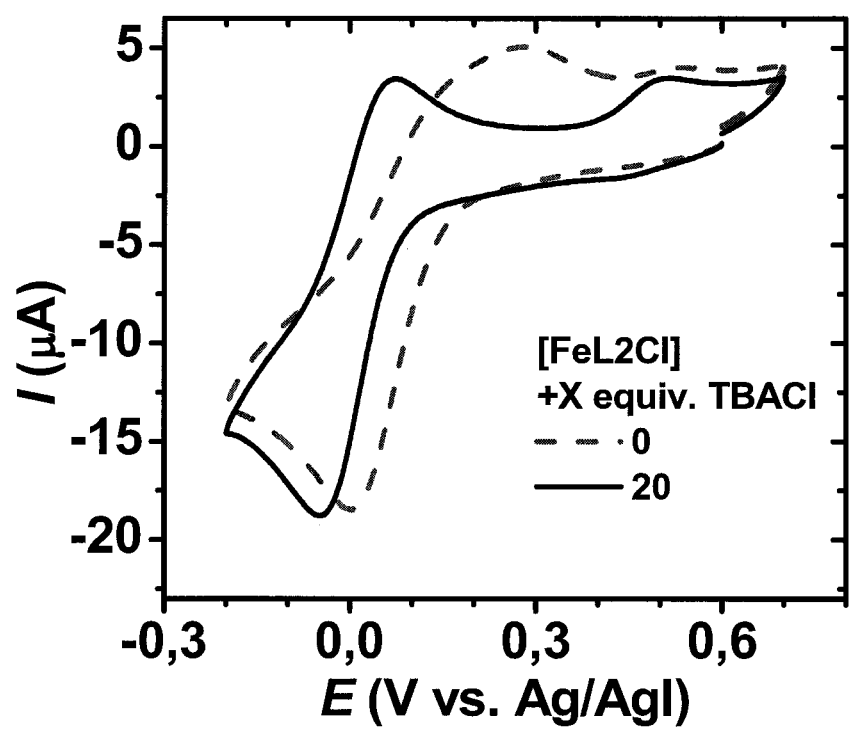
FIG. 10. Illustrates the effect of addition of TBACl on CV.

Miniemulsions at low copper concentrations were carried out, both BPMODA and BPMODA* were tested at 250 ppm of catalyst. FIG. 8 demonstrates that BPMODA was unable to afford a well controlled polymerization at this catalyst concentration. Neither the kinetics nor the molecular weight grew linearly with time and monomer conversion, respectively. After 40 min of reaction time, the kinetic plot leveled off, indicating the polymerization had died; M$_w$/M$_n$ values were broad throughout the polymerization. On the other hand, BPMODA* showed linear first order kinetics, M$_{n,GPC}$ values which correlated to M$_{n,th}$ values and narrow molecular weight distributions at all monomer conversions. To test the limit of BPMODA*, one more miniemulsion was carried out (Entry 3, Table 14) which utilized 100 ppm of CuBr$_2$/BPMODA* catalyst. Unfortunately, this polymerization was not well controlled. The experimental M$_n$ values are significantly above the theoretical values and the M$_w$/M$_n$ values are very broad. While this polymerization was uncontrolled it indicates the conditions have to be tuned to afford more control; such as lower polymerization temperatures, increased ligand/copper ratio, and decreased catalyst/ascorbic acid ratios or slow addition of the reducing agent.

weights by GPC. A series of heterogeneous polymerizations conducted over a range of catalyst concentrations (2000-250

TABLE 14

ARGET ATRP of n-BA in miniemulsions with BPMODA and BPMODA*.[a]

| Entry[b] | CuBr$_2$ (ppm) | Ligand | AA | Conv.[c] | $M_{n,th}$ | $M_{n,GPC}$ | $M_w/M_n$[d] | $M_w/M_n$[e] |
|---|---|---|---|---|---|---|---|---|
| 1 | 0.05 (250) | 0.05 | 0.025 | 0.88 | 22 000 | 21 000 | 2.64[f] | 2.61 |
| 2* | 0.05 (250) | 0.05 | 0.025 | 0.93 | 23 800 | 18 900 | 1.66 | 1.51 |
| 3* | 0.02 (100) | 0.02 | 0.01 | 0.92 | 23 700 | 85 100 | 3.52 | 4.28 |

[a][n-BA]:[EBiB] = 200:1, [Brij98]/[Hexadecane] = 2.3/3.6 wt % vs n-BA, T = 80° C.;
[b]entries labeled with (*) used BPMODA*, all others used BPMODA;
[c]determined by gravimetry;
[d]monomer conversion <45% unless otherwise noted;
[e]$M_w/M_n$ values of final polymer sample.
[f]monomer conversion = 66%.

Though AGET ATRP (catalyst ~2000 ppm) with BPMODA in miniemulsion is common and well-studied, it was important to compare the newly synthesized ligand ppm) with BPMODA* consistently resulted in polymerizations with increased control throughout the polymerizations, Table 15.

TABLE 15

A(R)GET ATRP of n-BA in miniemulsion with BPMODA and BPMODA*.[a]

| Entry[b] | CuBr$_2$ (ppm) | Ligand | AA | Conv.[c] | $M_{n,th}$ | $M_{n,GPC}$ | $M_w/M_n$[d] | $M_w/M_n$[e] |
|---|---|---|---|---|---|---|---|---|
| 1 | 0.4 (2000) | 0.4 | 0.2 | 0.55 | 14 100 | 15 300 | 2.69 | 1.23 |
| 2* | 0.4 (2000) | 0.4 | 0.2 | 0.54 | 13 800 | 13 500 | 1.54 | 1.15 |
| 3 | 0.2 (1000) | 0.2 | 0.1 | 0.87 | 22 400 | 18 000 | 2.49 | 1.60 |
| 4* | 0.2 (1000) | 0.2 | 0.1 | 0.54 | 14 000 | 14 000 | 1.62 | 1.18 |
| 5 | 0.1 (500) | 0.1 | 0.05 | 0.87 | 22 300 | 18 500 | 1.61 | 1.48 |
| 6* | 0.1 (500) | 0.1 | 0.05 | 0.84 | 21 600 | 18 200 | 1.45 | 1.33 |
| 7 | 0.05 (250) | 0.05 | 0.025 | 0.88 | 22 000 | 21 000 | 2.64[f] | 2.61 |
| 8* | 0.05 (250) | 0.05 | 0.025 | 0.93 | 23 800 | 18 900 | 1.66 | 1.51 |

[a][n-BA]:[EBiB] = 200:1, [Brij98]/[Hexadecane] = 2.3/3.6 wt % vs n-BA, T = 80° C.;
[b]entries labeled with (*) used BPMODA*, all others used BPMODA;
[c]determined by gravimetry;
[d]monomer conversion <45% unless otherwise noted;
[e]$M_w/M_n$ values of final polymer sample.
[f]monomer conversion = 66%.

under identical conditions, after which the catalyst concentration was systematically lowered until ARGET ATRP conditions were reached.

An example of the procedure used for AGET ATRP in miniemulsion procedure formulated with 2000 ppm of CuBr$_2$/BPMODA catalyst and targeted DP=200 is given as follows; see Table 15 for specific reaction conditions. CuBr$_2$ (17 mg, 0.078 mmol) and BPMODA (17.4 mg, 0.078 mmol) were dissolved in n-BA (5.0 g, 39.1 mmol) in a round bottom flask at 60° C. to form a solution of the copper complex. The solution was then cooled to room temperature prior to dissolving the initiator EBiB (26 μL, 0.195 mmol) and hexadecane (0.14 mL, 0.826 mmol) in the solution. A 5 mM solution of Brij 98 in deionized water (20.2 mL) was added to the organic n-BA solution and the mixture subjected to sonication in an ice bath; Heat Systems Ultrasonics W-385 sonicator; output control set at 8 and duty cycle at 70% for 1 min. The resulting stable miniemulsion was purged with nitrogen for 30 min. A predeoxygenated aqueous solution of ascorbic acid (AA), 0.7 mL, containing 6.9 mg AA, was injected into the miniemulsion over a period of 3 min to activate the catalyst and start the polymerization. Samples were taken periodically to measure the conversion gravimetrically and to determine the number-average molecular Linear first order kinetics were observed for both ligands when 2000 ppm of catalyst was utilized. Both polymerizations exhibited $M_{n,GPC}$ values which strongly correlated the $M_{n,th}$ values as well as low $M_w/M_n$ values although BPMODA* affords polymers with significantly lower $M_w/M_n$ values at low monomer conversion. As the concentration of catalyst was lowered, similar trends were seen. At both 1000 and 500 ppm of catalyst, BPMODA* resulted in polymerizations with lower $M_w/M_n$ values at all monomer conversions. In an attempt the find the "lower limit" for each ligand, the catalyst concentrations were reduced even further. 250 ppm of catalyst resulted in very different polymerizations for each ligand. The first order kinetic plot can be seen in FIG. 8, which shows that the kinetic plots for BPMODA are not linear at this concentration. The plot levels off, indicating the polymerization has stopped. The number average molecular weight does not grow linearly with monomer conversion and the polymerization stops at 90% conversion. Additionally, the $M_w/M_n$ values are quite high, >2.5, throughout the polymerization. However, when an identical polymerization was carried out with BPMODA*, a significant increase in control was seen. BPMODA* afforded linear first order kinetics, $M_{n,GPC}$ values which had a reasonable correlation to the theoretical values and $M_w/M_n$<1.5 throughout the polymerization. While the polymerization with BPMODA* at 250 ppm of catalyst was not ideal, it did offer much more control than the catalyst complex formed with BPMODA, indicating that a true ARGET miniemulsion ATRP is possible.

Example 7

Other Novel Ligands for ATRP Miniemulsion Polymerizations

Two ligands with structures similar to BPED, which has $K_{ATRP}$ in the same range as TPMA in bulk/solution polymerizations and provides good performance under ARGET conditions, were synthesized in a two steps process shown in the following schematic. The ligands were designed to be more hydrophobic by replacing the methyl-groups on the amines with octadecyl groups and then the activity of one potential ligand was increased by incorporation of three EDGs on the pyridine fragments present in the ligand. In the first step N,N'-ethylenebis(stearamide), (A), was reduced to N,N'-ethylenebis(octadecane), (B), using LiAlH$_4$ as a reducing agent in THF at 60° C. over an 18 h period. Next, the amine was alkylated using 2-picolyl chloride hydrochloride or 2-chloromethyl-4-methoxy-3,5-dimethylpyridine hydrochloride under basic conditions to obtain BPED-OD and BPED-OD*, respectively. All intermediates and final products were obtained in high yield and analyzed by $^1$H NMR which showed that the products were obtained in high purity.

7B) Polymerizations with BPED-OD and BPED-OD*

Bulk: ARGET ATRP of BMA with Sn$^{II}$(EH)$_2$ as a reducing agent was conducted with BPED-OD/CuCl$_2$ and BPED*-OD/CuCl$_2$. The polymerizations were carried out in 20% anisole, to assist in following conversion, at 60° C. with a targeted DP=200; conditions and results are summarized in Table 16 and compared to TPMA.

TABLE 16

ARGET ATRP (RA = Sn$^{II}$) of BMA with EBPA/BPED*-OD/CuCl$_2$, EBPA/BPED-OD/CuCl$_2$, and of nBA with EBiB/TPMA/CuBr$_2$.[a]

| Entry | Monomer | Initiator | CuX$_2$ | t (h) | Conv. | M$_{n,GPC}$ | MWD |
|---|---|---|---|---|---|---|---|
| BPED-OD | BMA | EBPA | CuCl$_2$ | 22.5 | 0.64 | 18 000 | 1.16 |
| BPED*-OD | BMA | EBPA | CuCl$_2$ | 23.5 | 0.63 | 16 700 | 1.17 |
| TPMA | nBA | EBiB | CuBr$_2$ | 5 | 0.37 | 10 500 | 1.16 |

[a] [M]:[I]:[CuX$_2$]:[L]:[Sn$^{II}$(EH)$_2$] = 200:1:0.1:0.3:0.1, T = 60° C.

All three ligands form catalysts that provide similar rates of polymerization as well as linear first-order kinetics, and experimental molecular weights which coordinate well with theoretical values. The three polymers synthesized all have narrow final molecular weight distributions near $M_w/M_n$=1.16.

Emulsion:

The partition coefficient of CuBr$_2$/BPED*-OD in nBA/Water (w/w)=30/100 was determined and showed that nearly all of the catalyst remains in the organic phase confirming that this ligand offered extremely high partition coefficients. Both ligands, BPED-OD and BPED*-OD, were tested under miniemulsion conditions. To allow for a comparison with BPMODA*, 500 ppm of catalyst was utilized when polymerizing BMA as shown in Table 17. Linear first order kinetics was observed for both ligands however, the BPED-OD based catalyst complex formed a polymer with broader molecular weight distributions while BPED*-OD afforded polymers with lower MWD values indicating that BPED*-OD can control a miniemulsion ATRP at low catalyst concentrations.

TABLE 17

AGET ATRP of n-BA with BPMODA* and BMA with BPED-OD and BPED*-OD in miniemulsion.[a]

| Entry | M | I | CuBr$_2$ (ppm) | Conv. | M$_{n,th}$ | M$_{n,GPC}$ | MWD |
|---|---|---|---|---|---|---|---|
| BPMODA* | nBA | EBiB | 0.1 (500) | 0.84 | 21 600 | 18 200 | 1.33 |
| BPED-OD | BMA | EBPA | 0.1 (500) | 0.73 | 20 600 | 21 100 | 1.54 |
| BPED*-OD | BMA | EBPA | 0.1 (500) | 0.80 | 22 900 | 18 300 | 1.23 |

[a] [M]:[I]:[CuBr$_2$]:[L]:[AA] = 200:1:0.1:0.1:0.4, [Brij98]/[Hexadecane] = 2.3/3.6 wt % vs monomer, T = 80° C.

Miniemulsion polymerizations conducted with BPED-OD and BPED*-OD with 500 ppm of catalyst indicated that BPED-OD is not active enough to afford a well controlled polymerization. Therefore the project was continued with only BPED*-OD. The catalyst was lowered to 250 ppm while maintaining a targeted DP=200. Table 18 outlines the polymerization conditions and results.

TABLE 18

AGET ATRP (RA = AA) of BMA with EBPA/DOD-BPED*/CuBr$_2$ and of nBA with EBiB/BPMODA*/CuBr$_2$ in miniemulsions.

| Entry | BMA | EBPA | CuBr$_2$ (ppm) | Ligand | AA | Conv. | $M_{n,th}$ | $M_{n,GPC}$ | MWD |
|---|---|---|---|---|---|---|---|---|---|
| BPED*-OD | 200 | 1 | 0.1 (500) | 0.1 | 0.04 | 0.80 | 22 900 | 18 300 | 1.23 |
| BPED*-OD | 200 | 1 | 0.05 (250) | 0.05 | 0.02 | 0.77 | 21 900 | 18 500 | 1.47 |
| BPMODA* | 200 | 1 | 0.05 (250) | 0.05 | 0.02 | 0.93 | 23 800 | 18 900 | 1.51 |
| BPED*-OD | 200 | 1 | 0.05 (250) | 0.05 | 0.02 | 0.51 | 14 500 | 85 000 | 1.32 |

*[Brij98]/[Hexadecane] = 2.3/3.6 wt % vs monomer, T = 80° C.;

BPED*-OD offers linear first-order kinetics at both catalyst concentrations. In general the polymerizations proceeded in the same manner, although slightly more control was afforded with the increased concentration of catalyst.

Example 8

Additional New Ligands

8A) Tris(2-quinolinylmethyl)amine (TQMA) was synthesized because it should exhibit similar activity to TPMA but with increased steric effects which may be advantageous in terms of lower rearrangement energies when going from Cu$^{II}$ to Cu$^{I}$, thereby providing better control and faster rate. The procedure is summarized in Scheme 15. The increased activity of the complexes can be determined as peak-to-peak separations (ΔEp) from CV and should be close to Nernstian value. It should also prevent other side reactions (e.g. reaction with other Cu complexes like disproportionation).

First, 2-(aminomethyl)quinoline was stirred with Na$_2$CO$_3$ and TBABr in 75 mL DCM for 1 h. Triacetoxyborohydride was weight in a vial and added to the solution and stirred for 20 min. Finally the aldehyde was added. The reaction colour changed from light brown over green to red brown. The mixture was stirred overnight. After 21 h the reaction is quenched with sodium bicarbonate solution and stirred for an additional hour. The mixture was extracted with EtOAc three times and the combined organic layer dried over MgSO$_4$ and the solvent was evaporated to give a deep red crude product (m=1.612 g). $^1$H-NMR analysis shows impurities with EtOAc and suggests some impurities in the aromatic region. ESI-MS revealed the major compound is the correct product.

8B) Synthesis of N,N-Dimethyl-N',N'-bis(2-hydroxy-3,5-dimethylbenzyl)ethylenediamine

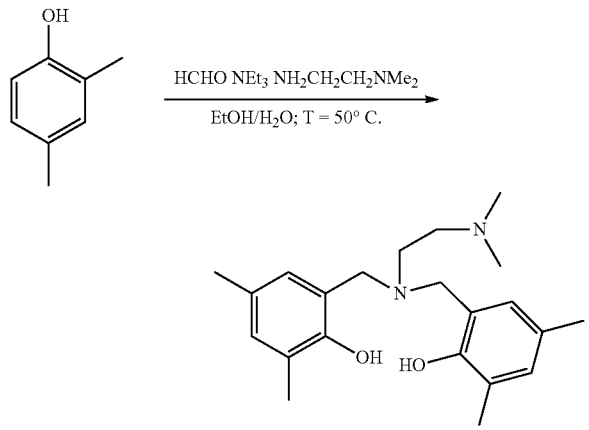

As indicated in scheme 16, it was envisioned that EDGs could be introduced into other potential ligand structure to change the activity of a catalyst formed with a transition metal in a polymerization reaction. In aqueous formaldehyde (37%, 3.26, 0.040 mol) solution of N,N-dimethylethylenediamine (1.00 g, 0.011 mol) and triethylamine (V=0.500 ml, 0.004 mol) as catalyst was added to a solution of 2,4-dimethylphenol (3.0 g, 0.025 mol) in 15 mL EtOH and 3 mL water. The resulting solution was kept in a water bath (50° C.) for 47 h. The colourless crystals formed were filtered, washed with cold MeOH (2×10 ml) and dried. Yield 2.76 g (70.4%). $^1$H-NMR was in agreement with the structure of the ligand. Complexes were formed with Fe(OTf)$_2$ and FeCl$_3$ and CV values indicated they were active ATRP catalysts.

8C) 2,4-dimethyl-6-bis(2-(diethylamino)-ethyl)aminomethylphenol

N,N,N',N'-Tetraethyldiethylenetriamine (38.86 mmol) and paraformaldehyde (38.86 mmol) were weighed into a 100 mL Schlenk flask. The mixture was stirred and heated to 80° C. for 2 h under nitrogen. Afterwards a solution of 2,4-dimethylphenol (39 mmol) in 25 mL anhydrous MeOH was added and the solution stirred under reflux for 24 h. After filtration of the reaction mixture and concentration of the solution in vacuo the product was obtained as dark yellow oil, 12.241 g (90.1%). No further purification before the next step was necessary.

Example 9

Linear Salan Iron Complexes and Tripodal Phenolate Iron Complexes

A series of phenolate ligands were prepared in order to determine the effect "anionic" donor atoms on the reducing power of copper and iron complexes. As noted above, and shown in Schemes 16 and 17, the ligands should consist out of phenolate moieties and aliphatic amine or pyridine donors. The corresponding iron complexes, Scheme 18, were prepared and CV analysis of the complexes were carried out. The CVs are shown in FIG. 8 and showed the most negative E$_{1/2}$ in comparison to the other tripodal ligands and [X][FeCl$_4$]$^-$ species, Table 19.

Scheme 18.
Overview of the structure of synthesized iron complexes with
linear tert-Bu salan and tripodal bisphenolate ligands.

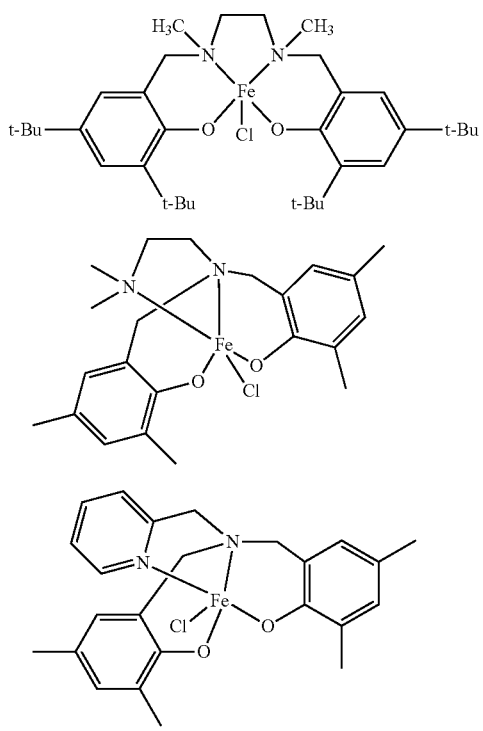

TABLE 19

Comparison of $E_{1/2}$ values of synthesized
iron complexes with literature.

| Ligand | $E_{1/2}$ vs SCE [mV] | $E_{1/2}$ vs Fc/Fc$^+$ [mV] |
| --- | --- | --- |
| C1 | −570 | −960 |
| C2 | −400 | −790 |
| C3 | −380 | −770 |
| [FeCl$_4$]$^{−[a]}$ | — | ~(410–440) |

[a]from Ref: Eckenhoff, W. T.; Biernesser, A. B.; Pintauer, T. *Inorg Chim Acta* 2012, 382, 84.

The addition of TBACl show an interesting trend in the measured CV's, the iron redox couple becomes more and more reversible, FIG. 9. Especially the aniodic oxidation from $Fe^{2+}$ to $Fe^{3+}$ is affected, whereas the cathodic reduction does not change significantly. This is true for both complexes (salan+tripodal complexes). To sum up increasing the chloride concentration in the mixture improves the reformation of the deactivator [$Fe^{3+}$LCl]. Initially one observed poor deactivation in an ATRP polymerization with these ligands but the addition of a salt with the same halogen counterion increased the rate of deactivation and improved PDI of the formed polymer.

Example 10

Use for TPEN* Ligand for ICAR ATRP of BA

The conditions were as follows: [BA]/[TPEN*]/[EBiB]/[AIBN]/[CuCl$_2$]=160/0.006/1/0.2/0.0016, BA:Anisole 4:1, T=60° C., 10 ppm CuCl$_2$. The reaction yielded polymer with a linear increase in conversion vs. time reaching 90 conversion after 4.5 h. while using only 10 ppm of Cu(II).

We claim:

1. A catalyst complex for a redox-based atom transfer radical addition reaction, an atom transfer radical coupling reaction or a controlled radical polymerization reaction, the catalyst complex comprising:
   a transition metal; and
   a ligand comprising from 2 to 6 heteroatom containing groups that bond to or chelate with a transition metal, wherein at least one of the heteroatom containing groups comprises a structure selected from a nitrogen containing heteroaromatic ring, wherein the heteroaromatic ring further comprises one or more electron donating substituents;
   wherein the ligand has a structure selected from the group consisting of (4-methoxy-3,5-dimethyl-pyridin-2-ylmethyl)-bis(pyridin-2-ylmethyl)-amine (TPMA*-1), bis(4-methoxy-3,5-dimethyl-pyridin-2-ylmethyl)-pyridin-2-ylmethyl-amine (TPMA*-2), tris[(4-methoxy-3,5-dimethyl)-pyrid-2-ylmethyl]amine (TPMA*-3), (4-methoxy-pyridin-2-ylmethyl)-bis(pyridin-2-ylmethyl)-amine (TPMA-OMe), bis(4-methoxy-pyridin-2-ylmethyl)-pyridin-2-ylmethyl-amine (TPMA-OMe-2), tris((4-methoxy)-pyridin-2-yl)methy)l-amine (TPMA-OMe-3), (4-(N,N-dimethylamino)-pyridin-2-ylmethyl)-bis(pyridin-2-ylmethyl)-amine (TPMA-NMe$_2$), bis(4-(N,N-dimethylamino)-pyridin-2-ylmethyl)-pyridin-2-ylmethyl-amine (TPMA-NMe$_2$-2), tris(4-(N,N-dimethylamino)-pyridin-2-yl)methyl)-amine (TPMA-NMe$_2$-3), bis((4-methoxy-3,5-dimethyl)-pyrid-2-ylmethyl)-octadecylamine (BPMODA*), N,N'-bis((4-methoxy-3,5-dimethyl)-pyrid-2-yl)methyl-octadecyl) ethylenediamine (BPED*-OD), N,N,N',N'-tetra[(4-methoxy-3,5-dimethyl)-pyrid-2-yl)methyl] ethylenediamine (TPEN*), N-methyl-N,N',N'-tris[(4-methoxy-3,5-dimethyl)-pyrid-2-yl)methyl] ethylenediamine (TPMEN*), N,N-dimethyl-N',N'-bis(2-hydroxy-3,5-dimethylbenzyl)ethylenediamine, and 2,4-dimethyl-6-bis(2-(diethylamino)-ethyl)aminomethylphenol; and
   wherein the ligand forms the catalyst complex with the transition metal.

2. The catalyst complex according to claim 1, wherein the transition metal is copper or iron.

3. The catalyst complex according to claim 1, wherein the catalyst complex catalyzes a controlled radical polymerization reaction.

4. The catalyst complex according to claim 3, wherein the controlled radical polymerization reaction is selected from an atom transfer radical polymerization (ATRP), a reverse ATRP, an SR&NI ATRP, an ICAR ATRP, a RAFT polymerization, a SARA ATRP, an e-ATRP, an AGET ATRP or an ARGET ATRP.

5. The catalyst complex according to claim 1, wherein the catalyst complex has a catalyst activity that is greater than or equal to 100 times the activity of a catalyst complex comprising a transition metal and a ligand wherein the aromatic ring or heteroaromatic ring does not comprise an electron donating substituent.

6. The catalyst complex according to claim 1, wherein the ligand is selected so that the catalyst complex is at least partially soluble in a liquid reaction medium.

7. The catalyst complex according to claim 6, wherein the liquid reaction medium is a bulk medium, a hydrophilic liquid reaction medium or a hydrophobic liquid reaction medium.

8. The catalyst complex according to claim 6, wherein the liquid reaction medium is an aqueous liquid reaction medium.

9. The catalyst complex according to claim 6, wherein the liquid reaction medium is a biphasic reaction medium wherein the catalyst complex is at least partially soluble in a dispersed hydrophilic phase or a dispersed hydrophobic phase of the biphasic reaction medium.

10. The catalyst complex according to claim 1, wherein the transition metal forms the catalyst complex with one or more ligands.

11. A catalyst complex for a redox-based atom transfer radical addition reaction, an atom transfer radical coupling reaction or a controlled radical polymerization reaction, the catalyst complex comprising:
   a transition metal; and
   a ligand comprising from 2 to 6 heteroatom containing groups that bond to or chelate with a transition metal, wherein at least one of the heteroatom containing groups comprises a structure selected from a nitrogen containing heteroaromatic ring, wherein the heteroaromatic ring further comprises one or more electron donating substituents;
   wherein the ligand further comprises one or more electron withdrawing groups on one or more of the or heteroaromatic ring.

12. The catalyst complex according to claim 11, wherein the transition metal is copper or iron.

13. The catalyst complex according to claim 11, wherein the catalyst complex catalyzes a controlled radical polymerization reaction.

14. The catalyst complex according to claim 13, wherein the controlled radical polymerization reaction is selected from an atom transfer radical polymerization (ATRP), a reverse ATRP, an SR&NI ATRP, an ICAR ATRP, a RAFT polymerization, a SARA ATRP, an e-ATRP, an AGET ATRP or an ARGET ATRP.

15. The catalyst complex according to claim 11, wherein the catalyst complex has a catalyst activity that is greater than or equal to 100 times the activity of a catalyst complex comprising a transition metal and a ligand wherein the aromatic ring or heteroaromatic ring does not comprise an electron donating substituent.

16. The catalyst complex according to claim 11, wherein the ligand is selected so that the catalyst complex is at least partially soluble in a liquid reaction medium.

17. The catalyst complex according to claim 16, wherein the liquid reaction medium is a bulk medium, a hydrophilic liquid reaction medium or a hydrophobic liquid reaction medium.

18. The catalyst complex according to claim 16, wherein the liquid reaction medium is an aqueous liquid reaction medium.

19. The catalyst complex according to claim 16, wherein the liquid reaction medium is a biphasic reaction medium wherein the catalyst complex is at least partially soluble in a dispersed hydrophilic phase or a dispersed hydrophobic phase of the biphasic reaction medium.

20. The catalyst complex according to claim 11, wherein the transition metal forms the catalyst complex with one or more of the ligand molecules.

* * * * *